United States Patent [19]

Bowditch et al.

[11] 4,202,034

[45] May 6, 1980

[54] ADAPTIVE CONTROLLER FOR OCEAN CHARACTERISTIC MEASUREMENT SYSTEM

[75] Inventors: Philip N. Bowditch, Cohasset; John M. Dahlen, Duxbury; John F. McKenna, Jr., Gloucester; John T. Shillingford, Jr., Milton; Frank J. Siraco, Malden; William E. Toth, Bolton, all of Mass.

[73] Assignee: The Charles Stark Draper Laboratory, Inc., Cambridge, Mass.

[21] Appl. No.: 934,334

[22] Filed: Aug. 16, 1978

[51] Int. Cl.² .................................................. B63G 8/14
[52] U.S. Cl. .................................... 364/420; 9/8 R; 73/170 A; 114/326; 364/556
[58] Field of Search ............. 364/420, 556; 73/170 A, 73/300–303, 185, 189; 9/8 R, 8 P; 114/16 E, 25, 312, 326, 331; 102/14; 61/69 R

[56] References Cited

U.S. PATENT DOCUMENTS

| 3,257,672 | 6/1966 | Meyer et al. | 102/14 |
| 3,590,635 | 7/1971 | Duing | 73/170 A |
| 3,927,562 | 12/1975 | Hickey, Jr. | 73/170 A |
| 3,952,349 | 4/1976 | Erath et al. | 9/8 R |
| 3,983,750 | 10/1976 | Kirkland | 73/170 A |
| 4,020,677 | 5/1977 | Doddington et al. | 73/170 A |
| 4,034,190 | 7/1977 | White | 364/420 |
| 4,044,611 | 8/1977 | Kaname et al. | 73/170 A |

OTHER PUBLICATIONS

Van Leer et al., "The Cyclesonde: An Unattended Vertical Profiler for Scalar and Vector Quantities in the Upper Ocean"; Deep Sea Research, Pergamon Press, 1974, vol. 21, pp. 385–400.

*Primary Examiner*—Errol A. Krass
*Attorney, Agent, or Firm*—Kenway & Jenney

[57] ABSTRACT

A system for measuring ocean characteristics. The system includes a sensor assembly and an associated means to control the system buoyancy to achieve cyclic ascent and descent at controlled speeds, either along a mooring line or free-drifting. Buoyancy control is provided by a pump assembly including two rolling diaphragm-sealed, low friction displacement pistons driven by a high torque d.c. motor operated at low speed. There are four functional groups of data gathering instrumentation. The first group measures horizontal water transport, and includes sensors for current (flow velocity), system azimuth, system tilt, and vertical velocity. The second group provides a determination of salinity, and includes sensors for conductivity, temperature and pressure. The third group monitors conditions within the system, and includes sensors for internal temperature and humidity. The fourth group monitors conditions utilized in the buoyancy control, and includes sensors for pressure (depth and depth rate) and piston position. A programmed microprocessor configuration provides overall operational control for the system.

8 Claims, 22 Drawing Figures

| FLAGS | | | | WRITE-PULSE POLARITIES | | | | INTERRUPT ENABLES | | | |
|---|---|---|---|---|---|---|---|---|---|---|---|
| ENCON/ | XR PAR | SPARE | FIL GAP | SPARE | x | ANALOG MUX | x | BUSY | DACH1 | BOT LINE | TOP LINE |

1

NONE ENABLED

INITIALIZE TO 4040₈

*Fig. 7G*

| 0 SENSE LEVEL | | | | 4 SENSE POLARITY | | | | 8 | | | 11 |
|---|---|---|---|---|---|---|---|---|---|---|---|
| UART | | REC RPT | TIME TICK | UART | | REC RPT | TIME TICK | x | x | x | x |
| DR | TBRE | | | DR | TBRE | | | | | | |

ALL EDGE-TIGGERED  ↑ ↑ ↓ ↓

INITIALIZE TO 0300₈

*Fig. 7H*

| FLAGS | | | | WRITE-PULSE POLARITY | | | | INTERRUPT ENABLES | | | |
|---|---|---|---|---|---|---|---|---|---|---|---|
| SPARE | REC REQ | SPARE | XR DATA | UART | x | EXR | x | UART | | REC RPT | TIME TICK |
| | | | | | | | | DR | TBRE | | |

0   1

ALL ENABLED

INITIALIZE TO 0057₈

*Fig. 7I*

ADAPTIVE CONTROLLER FOR OCEAN CHARACTERISTIC MEASUREMENT SYSTEM

REFERENCE TO RELATED APPLICATIONS

This application is related to our U.S. patent application Ser. No. 934,014 and 934,495, filed on even date herewith.

BACKGROUND OF THE INVENTION

This invention relates to oceanographic instrumentation and more particularly, to a system for cyclically measuring ocean characteristics between two levels.

Data gathering of oceanographic parameters has increased in recent years. Primarily, the prior art has utilized moored current meters to gather data representative of currents, as well as moored meters for temperature and other ocean characteristics. Time series recording to these data has been generated from fixed instruments on taut-wire moorings in the deep ocean and on continental shelf and slope locations. However, it has been observed that with the conventional current and other characteristic monitoring systems, long-term measurement in the near-surface region of the open ocean has been particularly difficult, particularly when data gathering has been taken within 200 meters of the surface. The data has exhibited gross dynamic errors introduced by the surface wave field. This upper ocean region is particularly important in studies since the dynamics are based on energy transfer between the atmosphere and the deep ocean. In addition, a significant amount of the horizontal transport of heat momentum takes place in that region.

The energy in horizontal currents is contained mainly is low frequency motions, with geostropic, tidal, and inertial motions accounting for the great bulk of the energy. In view of this relative low frequency of the parameter changes, unattended vertical profilers with periodic sampling have been developed in the prior art for monitoring certain scaler and vector quantities in the upper ocean. As an example of the prior art, U.S. Pat. No. 3,952,349 to Erath, et al. discloses a variable buoyancy device for automatically cycling an object, or platform having instrumentation, between upper and lower limits. This variable buoyancy device utilizes control of mean density to provide the cyclic vertical motion. The density control is accomplished by means of an inflatable bladder which is used together with a compressed gas supply and valve assembly to change the displacement of the system. In operation, the bladder is alternately inflated to control the buoyancy to be negative at a preselected low external pressure, and discharged into the ocean to control the buoyancy to be positive at a preselected high external pressure. Consequently, the instrumentation package coupled to the buoyant device cycles between the specified pressure points in the ocean. However, for long-term missions, this form of buoyancy control requires a relatively large bulk and mass apparatus particularly for gas storage.

It is an object of the present invention to provide an improved system for measuring ocean parameters.

It is another object of the present invention to provide an improved system for measuring ocean parameters, including a compact means for sustaining cyclic vertical motion throughout long-term immersion.

SUMMARY OF THE INVENTION

Briefly, the present invention provides a system for measuring ocean characteristics. The system includes a sensor assembly mounted on a platform, and an associated means to control the platform buoyancy. Buoyancy control is provided by a pump assembly including seawater displacement pistons and associated cylinder assemblies for trimming the near neutrally buoyant platform. As used herein, the term platform denotes a module or assembly which contains characteristic measuring sensors and other related instrumentation, including buoyancy control instrumentation. The platform may be closed or open. In some forms of the invention, the displacement pistons include a rolling diaphragm seal to establish a water-tight seal between the pistons and the associated cylinder. A system further includes an actuator for selectively translating the pistons between two points in the associated cylinder assemblies so that the buoyancy may be trimmed as a function of the piston position. A torque motor may be used in conjunction with ball screw and ball nut assemblies to actuate the pistons. In the preferred form of the invention, two pistons are utilized, however, in alternative configurations, differing numbers of pistons may be used.

In conjunction with this buoyancy control system, an adaptive controller may be utilized in accordance with the present invention, to provide a programmable control of the system buoyancy so that the platform may be cycled in an ascent and descent mode at controlled speeds, either along a mooring line or free-drifting. The adaptive control may be responsive to various ocean characteristics outside the platform, such as may be detected by sensors for such parameters as pressure, temperature, salinity, and acoustic properties. Alternatively, the ascent and descent control signals may be generated on a time basis. The control in some forms of the invention may be a programmed microprocessor. Furthermore, the adaptive controller in accordance with the invention may be utilized in conjunction with alternative ocean parameter profiling systems known in the prior art.

In accordance with another aspect of the present invention, ocean currents may be measured in deep water or alternatively in relatively shallow water, with substantially no effect from surface wave fields. In accordance with this aspect of the invention, a neutrally buoyant platform is provided with a current sensor in a manner whereby the platform is relatively free to move in the vertical direction in response to pressure waves from the surface wave field. In some forms of this invention, the platform may be constrained to motion along a mooring line, for example, by roller assemblies affixed to the upper and lower portions of the platform. In various forms of the invention, an inertial reference system may be utilized in conjunction with a computer to generate signals representative of the ocean current. In some forms of the invention, the computer includes means for resolving the current signals into orthogonal components.

BRIEF DESCRIPTION OF THE DRAWINGS

The foregoing and other objects of this invention, the various features thereof, as well as the invention itself, may be more fully understood from the following description, when read together with the accompanying drawings in which:

FIGS. 7A-7I show the data format for input/output instructions used in the ECS of FIG. 4;

DESCRIPTION OF THE PREFERRED EMBODIMENT

1. General Description

Figure 1:
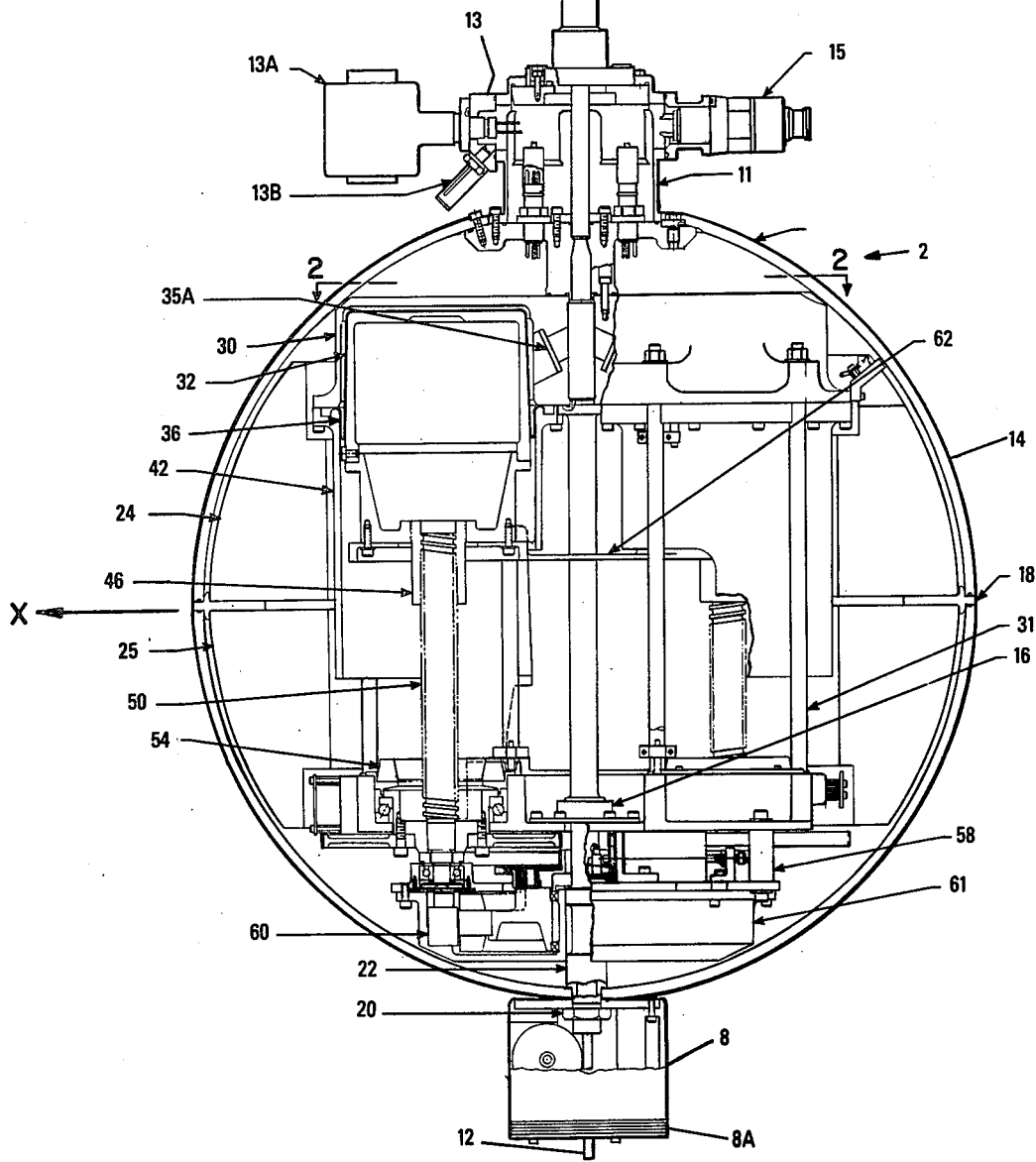
FIGS. 1 and 2 show, partially in cutaway form, an exemplary embodiment of the present invention.
Figure 2:
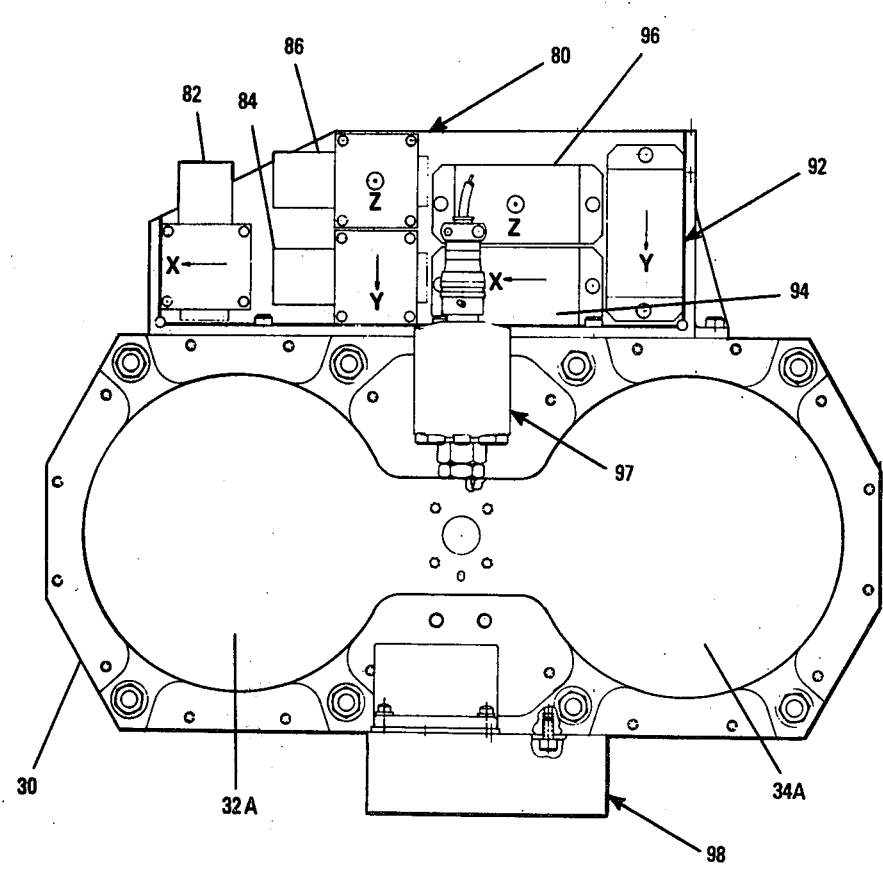

FIGS. 1 and 2 show the general assembly for the ocean characteristic monitoring system 1 of the present invention, shown in reference to a cartesian coordinate system, with the X and Z axes being shown in FIG. 1. The system 1 is shown in conjunction with a mooring line 12 passing along its central (Z) axis. In alternative embodiments, the system 1 may be free floating, i.e. adapted for operation without tracking a mooring line. In the present embodiment, structural members and fasteners which interface seawater are fabricated from titanium because of that material's characteristic high strength-to-weight ratio and good corrosion resistance to seawater. The housings of commercial external sensors are fabricated from type 316 stainless steel. Internal parts not exposed to seawater are made of aluminum or high strength steel.

Generally, the system 1 includes a spherical (56 cm diameter, 0.64 thick) instrumentation housing 2, and a spherical (10 cm diameter) electromagnetic current sensor assembly 4. In this embodiment, the current sensor 4 is rigidly coupled to the adjustable buoyancy housing 2. The sensor 4 is substantially free to move in the Z direction. Thus, axial motion of the mooring line 12 excited by a surface buoy, for example, is uncoupled from the sensor 4. In addition wave field pressure gradients which force oscillatory water particle motion, also force oscillatory motion of system 1 along the line 12 axis. As a result of the system axial freedom, however, the current sensor 4 sees only a small oscillatory flow component along the Z axis, and this oscillatory component is superimposed upon the larger steady component due to the ascent or descent speed of system 1. Consequently, the current flow measurements provided by sensor 4 are substantially independent of the surface wave field.

The spherical housing 2 and current sensor 4 include a conduit (1.0 cm diameter) along their polar (Z) axis which serves as a guide for the mooring line 12. Additionally, this conduit provides a path to the ocean for water ingested or expelled by the buoyancy control system (described more fully below). Roller assemblies 6 and 8 are positioned at the upper and lower ends, respectively of system 1, to provide tracking along a mooring line 0.7 cm diameter) with minimal frictional resistance.

The current sensor 4 is coupled to the upper roller assembly 6 by extension tube 9 and is coupled to a cylindrical header housing 11 by extension tube 10. The lower roller assembly 8 is directly coupled to the spherical housing 2.

The cylindrical header housing 11 couples the spherical housing 2 and the extension tube 10. Housing 11 isolates the housing 2 from possible water leaks into the current sensor 4 and provides a mount support for a sensor package 13, including an induction coil conductivity sensor 13A and a thermistor temperature sensor 13B, as well as a test plug 15 and an acoustic transducer (not shown) for underwater communication. In operation, the test plug and acoustic transducer are covered by a molded cap having the same shape as the sensor assembly 13 so that the system 1 is hydrostatically and hydrodynamically symmetrical about the polar (Z) axis. The internal components of housing 2 are also arranged for mass symmetry about this axis so that the overall system has minimal torques about that axis, thereby avoiding spurious azimuthal rotations which might otherwise be excited by the surface wave field.

The spherical housing assembly 2 is made up of spherical hemisphere sections 14 and 16 joined by an equatorial plate 18. The sections 14 and 16 are held in place by a preload nut 20 which compresses the portions 14 and 16 against an equatorial O-ring seal on plate 18. The nut 20 is tightened against a central post 22 which serves as the spine supporting internal components and also provides the conduit for the central mooring line 12. Battery packs 24 and 25 supply electrical power to system 1 and are connected to and supported by the equatorial plate 18.

In the present embodiment, the hemispheres 14 and 16 are spun titanium to produce a uniform grain structure with flow lines symmetrical to the Z axis. This grain structure reduces susceptibility to stress corrosion cracking. In other embodiments, alternative fabrication techniques may be utilized, such as explosive forming, forging, hydroforming, hot isostatic pressing and machining from a solid block.

A dual displacement piston assembly is positioned within the spherical housing 2. This system includes a pressure transducer 97 (shown in FIG. 2), a cylinder head 30, two displacement pistons 32 and 34, cylinder-to-conduit filters 35A and 35B, rolling diaphragm seals 36 and 38, cylinder skirts 42 and 44, ball nuts 46 and 48 and associated ball screws 50 and 52 and bumpers 54 and 56. Elements 34, 35B, 38, 44, 48, 52, 56 are not shown in FIG. 1.

The dual displacement piston assembly also includes a gear box 58, piston position encoder 99 (see FIG. 3) and a d.c. torque motor 60 within housing 61 (shown cut away in FIG. 1.) A torque equalization plate 62 couples the motion of the pistons 32 and 34.

FIG. 2 shows the cylinder head 39 of the present embodiment. Head 30 is fabricated from titanium and includes bores 32A and 34A for the pistons 32 and 34, respectively. A flow passage connects these bores to the axial conduit in central post 22 for providing flow paths for the drawing in or expelling of water in response to the motion of displacement pistons 32 and 34. The filters 35A and 35B prevent solid particles from contacting and damaging the rolling diaphragms 36 and 38. Rolling diaphragms 36 and 38 provide a seal between the cylinder provided by the pistons and bores and the interior of the remainder of the interior region of housing 2. Diaphragms 36 and 38 in the present embodiment are made from a fabric membrane impregnated with an elastomeric sealant. In the present embodiment, the rolling diaphragms are type no. 3-555-444 FCJ, manufactured by Bellofram, Burlington, Massachusetts. These diaphragms permit a smooth, continuous near-frictionless piston motion. Also, the diaphragms isolate the aluminum pistons 32 and 34 from the corrosive effects of seawater.

The pressure transducer 97 is also mounted on the cylinder head 30, and measures pressure at the axial conduit. The cylinder head 30 also provides mounting for an attitude reference package 80 (described below) and tape recorder 98.

The pistons 32 and 34 are driven with ball-screw and ball-nut assemblies (elements 46, 48, 50 and 52). The two ball screws have opposite hand threads, and the ball nuts are coupled with a torque-equalization plate 62, so that the reaction torques which would have been transmitted to the housing 2 are cancelled. The ball screws are steel and are one inch in diameter with ¼ inch lead.

Figure 3:
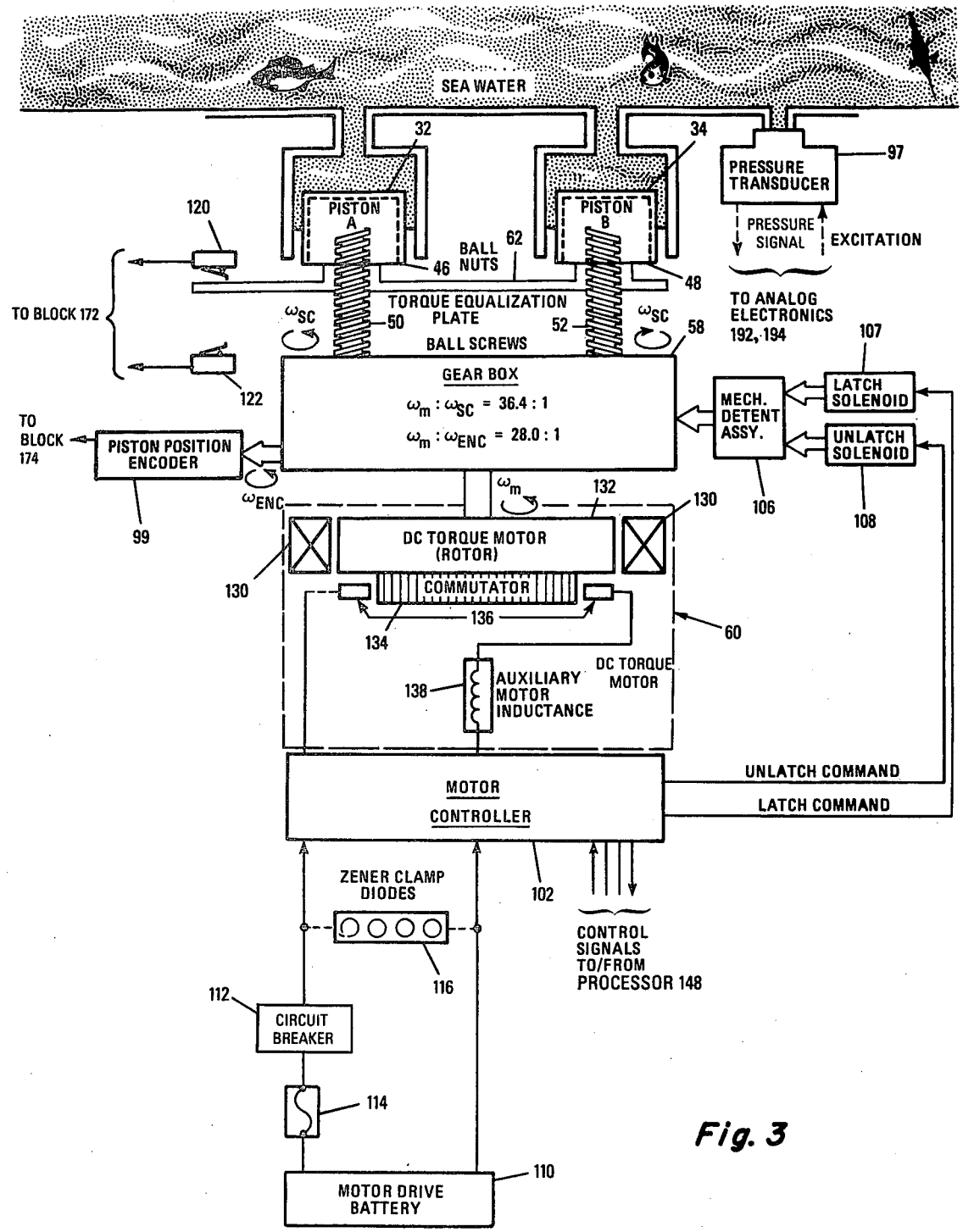
FIG. 3 shows, partially in block diagram form and partially in schematic form, the buoyancy control system for the embodiment of FIG. 1.

The ball screws are driven by the d.c. torque motor 60 through gear box 58 having a two-pass spur gear train. An idler gear is placed between two gears to provide the counter-rotations of the ball screws. The gear box 58 is composed of two aluminum plates coupled with four posts and spacer sleeves, the upper plate minimizes distortions since the piston axial reaction force is applied to the upper gear-box plate. The aluminum torque motor housing 61 is taper pinned and screwed to the lower gear-box plate. Eight steel tie rods (exemplified by rod 31 in FIG. 1) are used to couple the gear box 58 and motor assembly 60 to the cylinder head 30. The gear box 58 also houses a gear-driven piston-position encoder 99 (shown in (FIG. 3).

In the present embodiment, system 1 rides up and down the mooring line 12 (which may be, for example, a plastic-jacketed wire rope) guided by roller assemblies 6 and 8 located at the ends of the system 1. Assemblies 6 and 8 include three rollers whose axes are oriented 120 degrees apart and are staggered along the polar axis to allow passage over raised bumps or other imperfections which may exist or develop on the mooring line 12. External ballast weights 8A are shown to be attached at the outboard end of the lower-roller assembly 8.

The high torque d.c. motor 60 is operated near its maximum efficiency, low load speed range. With this motor form, together with the large rolling diaphragm-sealed, lowfriction piston assembly, a highly energy efficient operation is achieved. This combination avoids the large electrical loss and space mass requirements of a d.c.-a.c. conversion, and permits a low gear reduction ratio resulting in low gear losses and a simple gear train.

The system 1 is nominally neutrally buoyant, that is, for the total mass, the displacement is fixed (94 kilograms and 0.091 cubic meters for the present embodiment). The spherical housing 2 provides this displacement for minimum structural mass. The total water displacement capacity for the system 1 is 4080 cubic centimeters which provide for a 1 meter/second current and a drag coefficient of 0.6 with the following budget:

(1) 1170 cubic centimeters to provide for seawater density and volume changes, (2) 750 cubic centimeters to overcome friction, (3) 1500 cubic centimeters to overcome axially component of drag due to axial motion, and (4) 660 cubic centimeters to overcome the axial component of drag due to mooring line inclination.

The dual piston arrangement permits symmetrical balance packaging of the remaining components, and provides simple torque balance using one left-hand and one right-hand thread screw jack. Furthermore, the center of mass is maintained on the polar axis as water moves in and out of the cylinders.

The system 1 further includes an attitude reference package (ARP) 80 for providing signals to a control portion for resolving the body axes current components from the current sensor 4 into north and east components ARP 80. The attitude reference package 80 is positioned within the spherical housing 2 and coupled to the exterior of the cylinder head 30, as shown in FIG. 2. Two single axis magnetometers 82 and 84 provide the primary azimuth signals. These magnetometers are mounted with their input axes being orthogonal to the polar axis. A third magnetometer 86 is mounted with its sensitive axis parallel to the polar axis to provide a signal which is used in conjunction with the others to compensate for changes in the Earth's magnetic intensity vector encountered in moving the system 1 between various mooring sites.

Two single axis accelerometers 92 and 94 are mounted in ARP 80 with their input axes orthogonal to the polar axis. Accelerometers 92 and 94 provide tilt signals used to correct the primary magnetometer signals for that portion of the Earth's vertical magnetic intensity due to the tilt of the system 1. Magnetometers 92 and 94 are also used for resolving the current components into the horizontal plane when the tilt exceeds a predetermined value, such as 10 degrees. A third accelerometer 96 is mounted with its sensitive axis parallel to the polar axis.

An electronic and computer system 100 (ECS) is mounted in two sections on either side of the piston assembly within the housing 2. ECS 100 includes conditioning electronics for the sensors, power supplies, analog-to-digital conversion networks, microprocessor controller with associated memory and logic, incremental cassette tape recorder, motor controls, and test and operator equipment interface. The microprocessor controller provides programmable control of these overall systems providing current component resolution and smoothing, ascent and descent velocity control, profiling cycle control, parameter sampling rate and averaging internal control, and data formatting.

Generally, operation of the system 1 includes the following functions: sampling, processing and recording of data, and buoyancy control. These control functions are established under program control by the microprocessor controller. The method of operation will now generally be described (with more detailed description following below) by considering the various phases of a profiling cycle, starting at the bottom stop on the mooring line.

Assuming that the system 1 has been at rest at the bottom stop on the mooring line at a predetermined depth awaiting the next measurement cycle, ascent mode is initiated at an ascent start of launch, time which occurs at predetermined intervals. Since the required net buoyancy to achieve a given ascent speed is a function of the current, the system 1 first measures the average current, temperature and conductivity over a predetermined time interval (e.g. 1 minute). In this measurement, at intervals (e.g. 2 seconds), the current sensor, magnetometer, accelerometer, thermistor and conductivity transducer signals are periodically sampled, converted and processed to obtain average temperature conductivity and north and east current components.

The motor 60 is then energized to drive the pistons. Since the system 1 cannot predict liftoff in advance due to variations in seawater density, volume, friction and drag coefficients, and the like, the pressure is monitored by transducer 97 to detect liftoff. Following liftoff, the system buoyancy has a component along the mooring line just sufficient to balance the axial components of weight, friction and drag due to line inclination. The axial component of buoyancy (added by continuing to drive the pistons after liftoff) is balanced by the axial components of inertia forces and drag due to axial motion. A steady state ascent speed is a function of current and volume displacement of the pistons after detection of liftoff.

This volume displacement is monitored by the piston position encoder 99. In the present embodiment, the ascent speed is related to current and volume displacement in accordance with the following rules: if the current is less than a predetermined value (e.g. 10 centimeters/second), the motor 60 is shut down as soon as liftoff is detected (by the pressure decrease by a predetected amount (e.g. 10 mbar)). The ascent speed stabilizes shortly thereafter to a nominal value (e.g. between 11 and 15 cm/s). If the magnitude of the current $\sqrt{U^2+V^2}$, where U and V are the orthogonal components of the current in the X-Y plane, is in a predetermined range (e.g. 10-50 cm/s), the motor 60 is shutdown when the piston displacement has increased by a predetermined amount, (e.g. $[6.2\sqrt{U^2+V^2}-26]$ cm$^3$ after liftoff detection. The ascent speed thereafter stabilizes to a normal value (e.g. between 12 and 14 cm/s). For currents greater than a predetermined value (e.g. 50 cm/s), the displacement required after liftoff is some different value, for example, $[8.1\sqrt{U^2+V^2}-110]$ cm$^3$, causing the speed to stabilize in a predetermined range (e.g. 12-14 cm/s). After shutdown, the detected bottom oceanographic characteristics and the piston position are recorded on the tape recorder 98. The program control maintains the ascent speed within a prescribed deadband, and records parameter averages within prescribed depth zones. Upon entering any zone, the program controller refers to its memory for the pressure depth to the top of the zone, the ascent speed deadband limits, and the parameter sampling requirements. By way of example, the top of the first zone after liftoff may be 160 dbar, the deadband limits 10 and 16 cm/s, and the sampling period two seconds. Upon entering this zone, the parameter averaging commences and the ascent speed monitoring is performed, with the speed monitoring being achieved by monitoring pressure periodically (e.g. every thirty seconds). Whenever the indicated ascent speed is outside the established deadband, a speed change to achieve a nominal ascent speed is calculated. From that value, a volume change required to accomplish this speed change is calculated. By way of example, the following rule may relate the volume and speed changes: the volume change equals $0.63\sqrt{U^2+V^2}$ times the speed change for currents greater than a predetermined value, (e.g. as 20 cm/s), or the volume change equals 12 times the speed change for current values less than or equal to 20 cm/s, where the current value used is the most recent average current.

The motor 60 is then energized long enough to drive the pistons 34 and 36 until the desired volume change has been measured by the piston position encoder 99. While the motor 60 is energized, the characteristic averaging task is suspended, avoiding magnetic interference from the motor. Ascent speed monitoring continues, but is disregarded until a predetermined period (e.g. 15 seconds) after motor shutdown to allow time for the ascent speed to stabilize. The above procedure is continued until the pressure reaches the pressure limit (e.g. 160 dbar) when the parameter averages and piston position are recorded.

Measurements in each succeeding zone are performed in the same manner. As the surface is approached, the zones might be made progressively thinner to account for the progressively shorter vertical scales anticipated. Accordingly, the nominal ascent speed may be proportionately decreased to ensure remaining in each zone long enough to average over many of the longest surface-wave periods. Gradual reduction of ascent speed tends to occur naturally without control action if the currents increase as the system 1 approaches the surface. Also, the sampling period may be progressively shortened (e.g. initially to one second, and finally to 0.5 second) near the surface to capture the progressively shorter period oscillations encountered in the surface wave field. Since the ECS 100 consumes more power at higher sampling rates, it is generally advantageous to utilize the slowest satisfactory rate.

In the preferred embodiment, the tape recorder is adapted to record as many as 87,600 sets of zone parameters, or 10 zones/cycle at 1 cycle/hour for 1 year. By way of example, an average ascent speed of 10 centimeters/second results in completion of the measurement phase of a cycle from a 200-meter depth to the surface in just over 30 minutes. This example permits a profiling frequency of 1 cycle/hour. With ten zones, the average time per zone is 200 seconds, long enough to average over many wave periods. Furthermore, the exemplary 10 centimeter/second ascent speed biases the relative flow to approach the current probe from the top hemisphere of its field of view. This bias enhances the current sensor 4 response by moving its turbulent wake downstream from its electrodes, and by positively keeping the sensor 4 out of the wake of the spherical housing 2. This biasing of the relative flow is maintained regardless of surface wave excitation.

The above described profiling-while-ascending operation provides space-time averages, while maintaining a high degree of energy conservation. Alternatively, the system 1 can be stopped to measure at fixed levels. In the latter forms, energy may be extracted from the sea pressure while retracting the pistons. Since the motor behaves like a generator when driven by the pistons, batteries in the battery pack may be recharged while the pistons are pushed down by the sea pressure.

The descent mode is commenced upon completion of the ascent mode. A dive is performed in a manner similar to that described for liftoff, resulting in the achievement of a descent speed calculated to arrive at the bottom well in advance of the next ascent start time. The descent mode is similar to the ascent mode, except that oceanographic characteristic sensing is suspended during descent. Upon arrival at the bottom, a rest mode keeps watch, preventing inadvertent ascent due to changing conditions, while awaiting the next ascent start time.

Table 1 provides the operating range, digital resolution (least significant bit), and the smallest errors expected to be achieveable for each of the parameters processed by the preferred embodiment (described in detail in the following sections).

TABLE 1

| Parameter | Units | Range | LSB | Absolute Error (Short Term) | In-Situ Drift/Year |
|---|---|---|---|---|---|
| Current | cm s$^{-1}$ | −400 to 400 | 0.20 | >1.3, <3% of reading | 2 |
| Temperature | °C. | −5 to 35 | 0.0040 @ −5 0.033 @ 35 | 0.01 | 0.005 |
| Conductivity | mmho cm$^{-1}$ | 28 to 60 | 0.0078 | 0.01 | — |
| Pressure | d bar | 8 to 213 | 0.050 | 0.2 | 0.2 |
| Specific Force | gravity acceleration | −1 to 1 (x,y axes) 0 to 2 (z axis) | 0.00049 | 0.005 | 0.0005 |
| Magnetic Intensity | Earth's field at CSDL | −1.2 to 1.2 | 0.00059 | 0.01 | 0.0006 |
| Piston Displ. Vol. | cm$^3$ | 0 to 4360 | 1.06 | 1 | 0 |
| Recorded Time | s | 0 to 6.87 × 10$^8$ | 0.01 | — | 30 |

2. Buoyancy Control System

The buoyancy control system (BCS) is shown in schematic form in FIG. 3. The BCS provides open loop bi-directional current limited drive, and current limited dynamic braking for the dual displacement piston assembly. Primary control of the BCS is provided by a program controlled digital processor 148 (described in conjunction with ECS 100).

Generally, the buoyancy control system includes the pistons 32 and 34 as coupled by the ball nuts and ball screws (elements 46, 48, 50 and 52) and torque equalization plate 62 to the gear box 58 with the interior gear assembly. The gear assembly in box 58 is driven by the d.c. torque motor 60. Motor 60 is controlled by a microprocessor 150 (described below in conjunction with ECS 100) by way of motor controller 102. The motor controller 102 provides the directional drive signals for the motor 60 and, in addition, provides control signals to a mechanical control for the gear box 58 which includes a mechanical detent assembly 106 and associated latch solenoid 107 and unlatch solenoid 108. The directional drive and latch control signals from motor controller 102 are generated in response to control signals from the microprocessor 150 described below. The power supply for the BCS is provided by a motor drive battery 110 and associated control circuitry including circuit breaker 112, fuse 114, zener diode clamp network 116.

The torque equalization plate 62 travels between upper and lower limit switches 120 and 122, respectively, and provide relay trip control signals for a circuit breaker 112 when the plate 62 reaches predetermined extremes of motion within the housing 2. Switches 120 and 122 also provide electrical signals indicating these position limits to the processor 148. The gear box 58 also includes a mechanical coupling to the piston position encoder 99 which in turn is coupled to an interface in the processor 148. The pressure transducer 97 is electrically coupled to the analog electronics (described below in conjunction with ECS 100) so that an excitation signal triggers a response pressure signal representative of the pressure at sampling times.

In the present embodiment, the d.c. motor 60 includes a permanent magnet stator 130, loader 132, commutator 134 and brushes 136, together with an auxiliary motor inductance 138. In response to motor 60, the ball screws 50 and 52 rotate in opposite directions at an angular velocity having magnitude $w_{SC}$, the piston position encoder 99 input shaft rotates at angular velocity $w_{ENC}$ and the output angular velocity for motor 60 is $w_m$. In the present embodiment, the following relationships are utilized:

$w_m$: $w_{SC}$=36.4:1

$w_m$: $w_{ENC}$=28.0:1

In the present embodiment, the motor 60 is a permanent magnet d.c. torque motor, model 7202 with winding designation T-7202-N, manufactured by the Inland Motor Division of Kollmargen Corporation. This configuration gives a peak torque at 11 ft./lb. at 38.4 nominal armature voltage at 8.7 amps. In alternative configurations, other motors, of course, may be utilized. The present embodiment utilizes an armature voltage of 41.8 volts for a nominal sea pressure of 300 lb./in. The system provides a mechanical gear-train efficiency of 77.6%, with a motor-to-ball nut torque gain equal to 36.435:1, with the motor characteristic speed being 21.04 rad/sec with a current of 1.7 amps and motor efficiency of 75.8%. The overall drive system efficiency is 58.8%.

In operation, as described more fully below, the processor 148 dedicates four output lines for transferring control signals to motor controller 102: bit 8 (detent release, or unlatch), 9 (detent apply, or latch), 10 (drive motor on) and 11 (drive motor up or brake). In response to these output control signals, the motor controller 102 enters one of four states: (1) all elements "off", (2) dynamic brake applied, (3) drive motor up, (4) drive drive down. The motor controller 102 is a decoding network for four output bits (bits 8–11) of processor 148 to provide outputs on the control lines going to the motor 60 and to control lines going to solenoids 107 and 108. These states are decoded to control the motor 60 to be off, brake drive up or drive down. In addition the solenoids 107 and 108 are controlled to be in one of the following states: (1) both off, (2) solenoid 107 on, and 108 off (latching the pistons), (3) solenoid 107 on and 108 off (unlatching the pistons).

The mechanical detent assembly 106 is a pawl-detent mechanism used as a mechanical detent to hold the piston position once a desired position is reached. This mechanism is a mechanical latching device in both the detent and non-detent positions. Assembly 106 is cogging (i.e. detent unlatch unnecessary) for piston drive outward (uP) but self-jamming (detent unlatch required for disengagement) for piston drive inward (down).

3. Sensors

The sensors in the system 1 provide four groups of functions. The first group determines the characteristics of horizontal water transport. In this group, the following characteristics are measured:
current (flow density)
system azimuth
system tilt
vertical velocity
In operation, data derived from this functional group of operations is processed simultaneously.

The second functional group of measurements provides indication of the ocean salinity. In this group, the following characteristics are measured:
electrical conductivity
external temperature
pressure The third functional group of measurements provide an indication of condftions inside the system of housing 2 of the system 1. In this group, the following characteristics are measured:
internal temperature
humidity The fourth group provides data necessary for buoyancy control. In this group, the following characteristics are measured:
pressure (depth and depth rate)
shaft encoder (piston position)

In the present embodiment, the sensors for the first group of measurements are current sensor 4 and the attitude reference package (ARP) 80 (including the magnetometers and accelerometers). The current sensor 4 is a Marsh McBirney model 555 spherical electromagnetic current meter. This sensor is a two axis device adapted in system 1 to measure flow in a plane normal to the mooring line 12 passing through the center of the probe. The sensor 4 in the present embodiment is specially adapted to provide a through-tube, allowing the mooring line 12 to pass through the center.

In ARP 80, the accelerometers 92, 94 and 96 are force-balanced servo accelerometers consisting of a pendulum constantly restored to a normal position by a high-gain servo loop. The input axis is normal to the arm of the pendulum, and the internal servo loop restores the seismic mass of the pendulum to a null position with a torque motor proportional to current. In the present embodiment, the accelerometers are Columbia model SA701 forced balanced units for the horizontal axes, and model SA107 for the vertical axis. The magnetometers are Infinetics model MK-2b single axis magnetometers.

The sensors for the second group of measurements are conductivity sensor 13A, temperature sensor 13B and pressure transducer 97. The conductivity sensor 13A is a Plessey inductively coupled conductivity probe, type 2600-3 sensor head (with circuit board 5590). The thermal sensor 13B is a Fenwall thermistor probe, outline H65, fit to iso curve+0.5%, 0° to +35° C. The pressure transducer 97 is a BLH Type DHF bonded strain gauge pressure transducer.

The sensors for the third group of measurements are an internal thermal sensor (not shown) and a humidity sensor (not shown), both being positioned within housing 2. The internal thermal sensor is a Fenwall Model 100K iso curve oceanographic thermfstor in a H-76 housing. The humidity sensor is a Phys-Chemical Research Corporation Model PCRC-11 humidity sensor.

The sensors for the fourth group of measurements are the pressure transducer 97 and piston position encoder 99. Encoder 99 is a Litton Industries absolute position encoder, model GCC-11-13P7.

4. Electronics and Computer System

Figure 4:
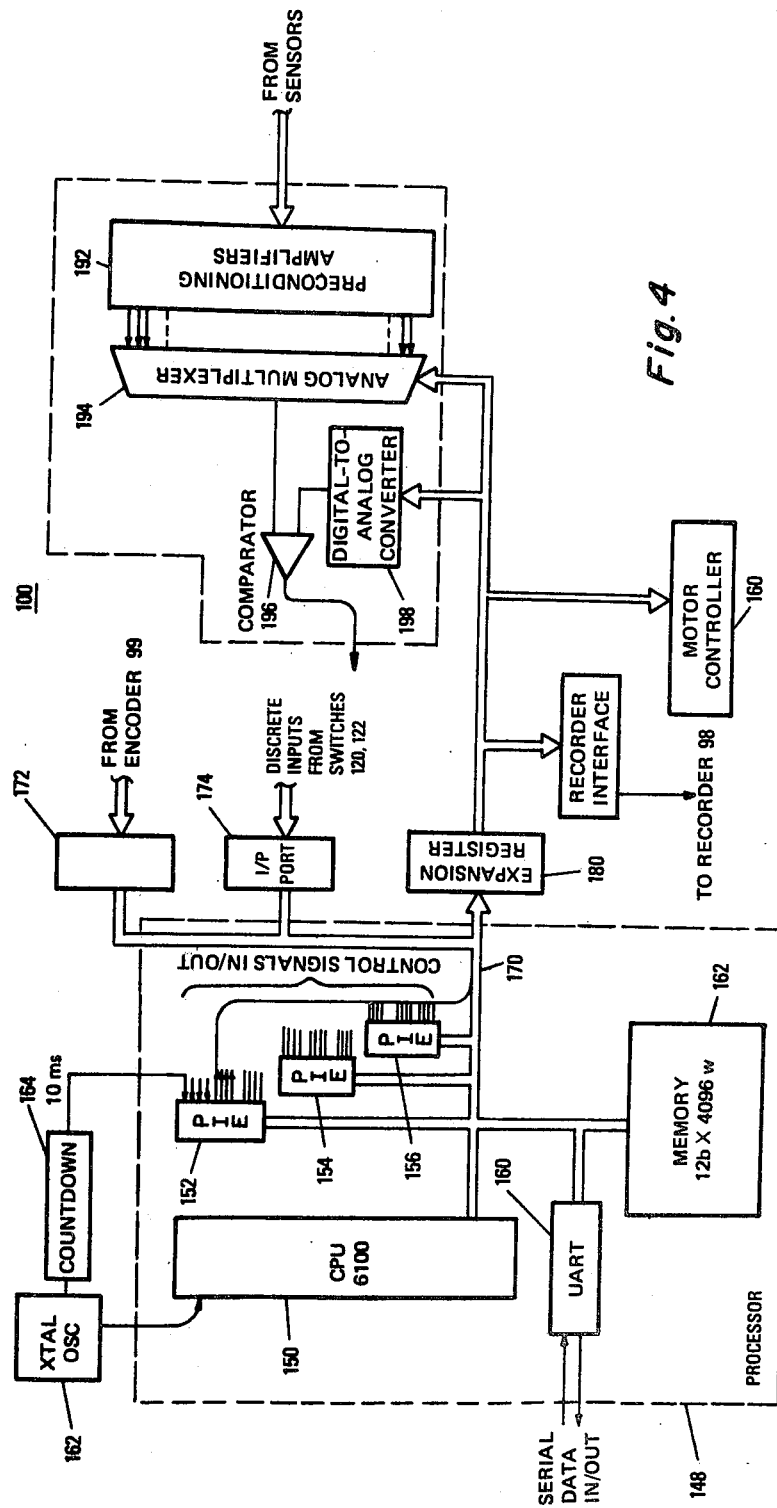
FIG. 4 shows in block diagram form, the electronics and control system (ECS) for the embodiment of FIG. 1.

The Electronics and Computer System (ECS) 100 is shown in block diagram form in FIG. 4. ECS/100 provides the following functions:
(1) Conditioning, selection, and conversion of analog sensor signals,
(2) Data formatting for recording,
(3) Timing and sequencing for all operations,
(4) Voltage regulation and switching of sensor power,
(5) Motor control,
(6) Computational capability for filtering,
(7) Component resolution and buoyancy control, and
(8) Interfaces for communication with external equipment.

In the present embodiment, the digital processor 148 of ECS 100 includes five CMOS large-scale-integrated circuits: 12-bit microprocessor (CPU) 150 (Intersil IM 6100), parallel interface elements 152, 154 and 156 (Intersil IM 6101), a universal asynchronous receiver/transmitter (UART) 160 (Intersil IM 6402) and an associated 12-bit, 4096 word memory 161.

A crystal oscillator 162 operating at 819.2 kilohertz drives a single 14-stage binary counter 164, producing timing signals and an interrupt to the interface element 152 at 10-millisecond intervals for timekeeping purposes. The same oscillator 162 provides clock pulses to the CPU 150. The parallel interface elements (PIE's) 152, 154 and 156 provide control signals to gate data between the processor 148 and the other elements of the system 1, including motor control 160. Data transfer takes place on the three-state 12-bit 'DX' bus 170. The PIE's 152, 154 and 156 also provide sense inputs which may be tested by program, or may be used to implement a full-vectored interrupt mechanism.

In the present embodiment, the UART 160 provides serial communication with external devices, such as a teletypewriter, and an acoustic data link. The bit rate is established by an externally applied clock, allowing interfacing to devices of various speeds without requiring internal changes.

Two 12-bit parallel input ports 172 and 174 are provided: one port 172 is dedicated to the piston position encoder 99, and port 174 is coupled to discrete logic signals from the limit switches 120 and 122.

Output from the processor 148 to the remainder of the ECS 100 is via a single register, denoted the expansion register 180. With this configuration, the loading on the DX lines in bus 170 is minimized and the number of transitions at the inputs to the various output registers is reduced while the DX lines in bus 170 change state many times during each instruction (for example, the bus 170 may carry the instruction address, the instruction, a memory address, and then data). The output of the expansion register 180 changes only when an output operation takes place.

The recorder 98 of system 1 includes a Sea-Data model 610 serial digital stepping recorder and a recorder interface 184. This device records 800 4-bit characters per inch on standard 0.15-inch cassettes, giving a total capacity of 9.2×10 bits for 100-bit records with appropriate synchronizing gaps.

Figure 5:
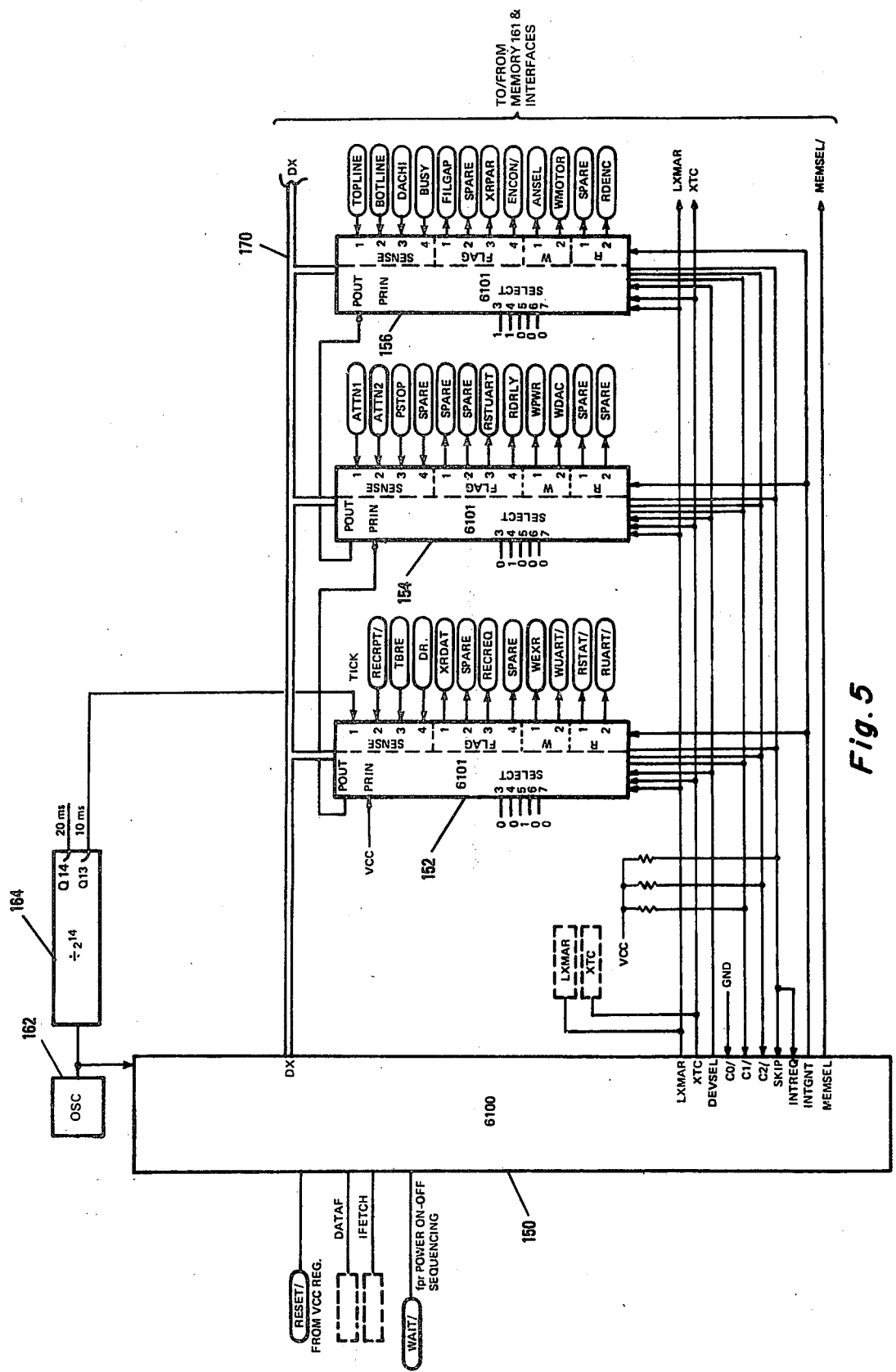
FIG. 5 shows in detailed block diagram form, the digital processor of the ECS of FIG. 4.

Details of the processor-PIE interconnections are shown in FIG. 5. Each PIE produces two read control signals, two write control signals, and four flags under program control. Each PIE also provides four sense inputs, which may be tested by skip instructions or may be used to drive the processor interrupt line. The functions of the PIE signals are listed in Table 2.

Table 3 sets forth the special input/output instructions, with references to the instruction format illustrated in FIGS. 7A-7I. For the entries in Table 3, the octal machine code for each instruction is given, followed by the mnemonic and the operation performed. Ac is the accumulator, XR is the expansion register, and V indicates the logic 'OR' operation.

As described in conjunction with FIG. 3 the motor controller 102 provides the functions of driving the motor 60 in its forward, reverse, and dynamic braking modes, and also driving the detent (latch and unlatch) solenoids 107 and 108. Commands are transferred to the controller 160 from the expansion register 180 by the signal RWMOTOR which occurs when a write motor (WM0TOR) input-output instruction is executed. Bit assignments are as follows:

Table 2

| PIE Address (Octal) | PIE Signal | Signal Name | Use |
| --- | --- | --- | --- |
| 04 | S1 | TICK | 10-ms signal from timer. |
| 04 | S2 | RECRPT/ | 12-bits-taken signal from recorder. |
| 04 | S3 | TBRE | UART transmitter ready for character. |
| 04 | S4 | DR | UART receiver has new character. |
| 04 | F1 | XRDAT | Strobe recorder data register. |
| 04 | F2 | Spare | |
| 04 | F3 | RECREQ | Recorder initiate pulse |
| 04 | F4 | Spare | |
| 04 | W1 | WEXR | Strobe expansion register. |
| 04 | W2 | WUART/ | Strobe UART transmitter buffer register. |
| 04 | R1 | RSTAT/ | Gate discrete inputs to DX. |
| 04 | R2 | RUART/ | Gate UART receiver to DX. |
| 10 | S1 | ATTN1 | Signal representing state of ATTN1 relay input. |
| 10 | S2 | ATTN2 | General-purpose input discrete. |
| 10 | S3 | PSTOP | Piston at limit. |
| 10 | S4 | Spare | |
| 10 | F1 | Spare | |
| 10 | F2 | Spare | |
| 10 | F3 | RSTUART | Drives UART reset input. |
| 10 | F4 | RDRLY | Not used. |
| 10 | W1 | WPWR | Strobe power-control register. |
| 10 | W2 | WDAC | Strobe digital-to-analog converter latch. |
| 10 | R1 | Spare | |
| 10 | R2 | Spare | |
| 14 | S1 | TOPLINE | Optional input for top-of-line sensor. |
| 14 | S2 | BOTLINE | Optional input for bottom-of-line sensor. |
| 14 | S3 | DACHI | Output of analog comparator. |
| 14 | S4 | BUSY | Tape recorder busy signal. |
| 14 | F1 | FILGAP | Tape recorder file gap command (not used). |
| 14 | F2 | Spare | |
| 14 | F3 | XRPAR | Shift recorder parameter register. |
| 14 | F4 | ENCON/ | Bias to encoder common. |
| 14 | W1 | ANSEL | Strobe analog multiplexer input latch. |
| 14 | W2 | WMOTOR | Motor controller input strobe. |
| 14 | R1 | Spare | |
| 14 | R2 | RDENC | Gate encoder to DX. |

Note:
S:sense, F:flag, R:read, W:write.

The CPU 150 executes the instruction set of the Digital Equipment Corporation PDP-8/E minicomputer. The normal instructions are described in Intersil IM6100 CMOS 12-bit Microprocessor, Intersil, Inc., August 1975.

Figure 6:
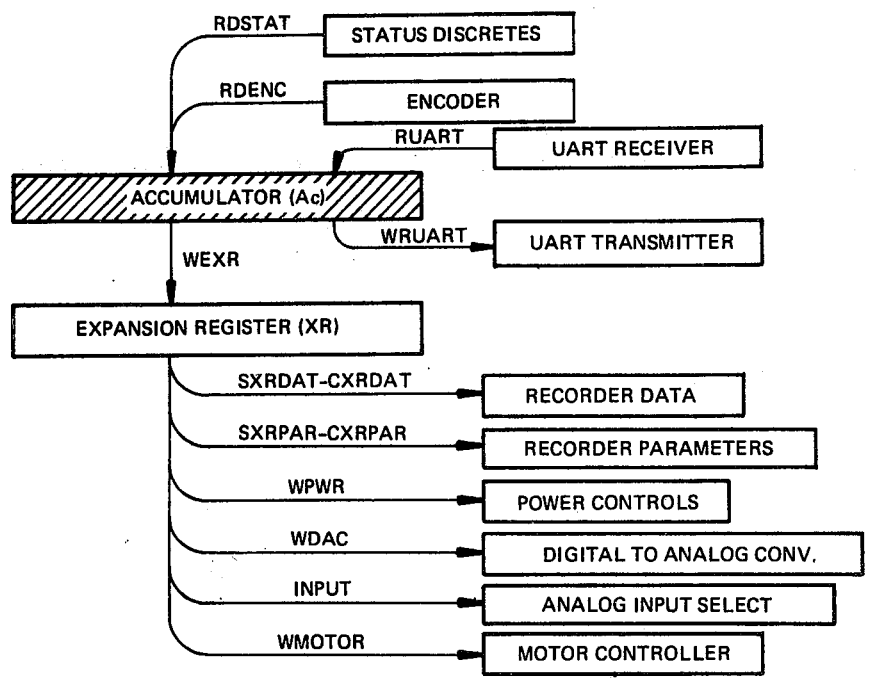
FIG. 6 illustrates the data flow in the ECS of FIG. 4.
Figure 7A:
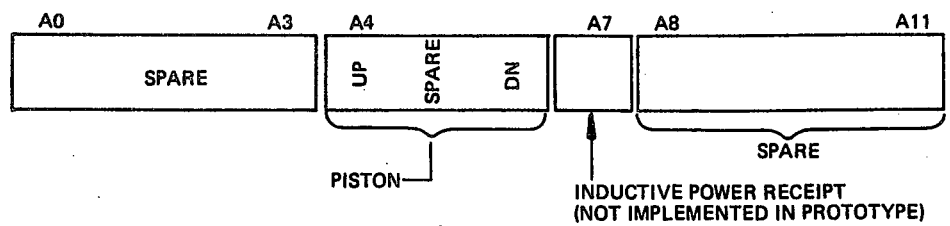
Figure 7B:
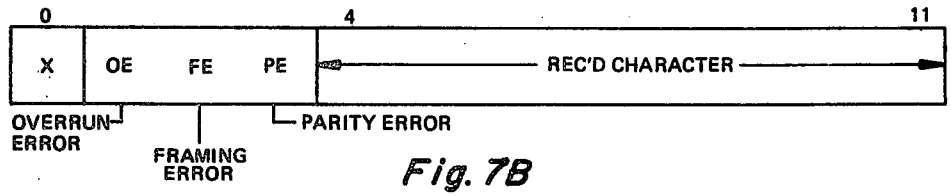
Figure 7C:
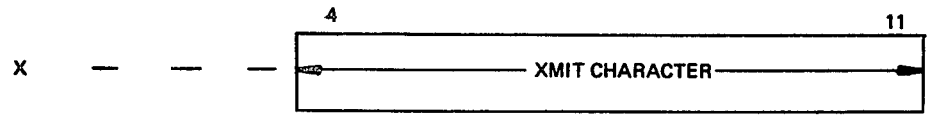
Figure 7D:
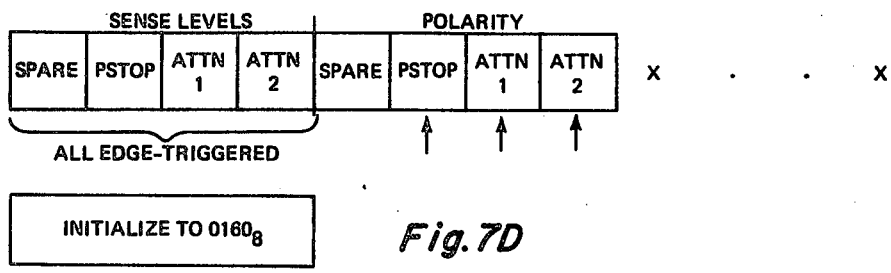
Figure 7E:
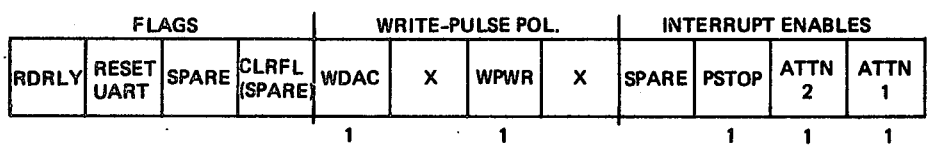
Figure 7F:
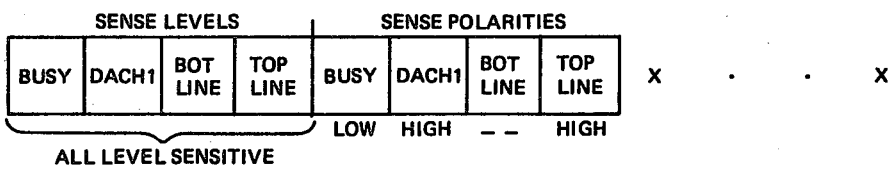

Interconnection of the CPU 150 and PIEs 152, 154, and 156 results in additional input/output-transfer (IOT) instructions specific to the present system. An overview of the ECS 100 data flow is shown in FIG. 6.

Bit 8-unlatch
Bit 9-latch
Bit 10-drive up
Bit 11-drive down

If bit 8 is one, voltage is applied to the solenoid 108 that releases the detent; if bit 9 is one, voltage is applied to the solenoid 107 that applies the detent. The four states that may be specified by the two bit word formed by bits 10 and 11 are:

Table 3

| | | |
| --- | --- | --- |
| 6100 | RDSTAT | Ac V STATUS DISCRETES→Ac (FIG. 7A) |
| 6110 | RUART | AcV SERIAL RECEIVER→Ac (FIG. 7B) |
| 6111 | WRUART | Ac→SERIAL XMTR INITIATE (FIG. 7C) |
| 6112 | SKPTBE | SKIP IF SERIAL XMTR READY FOR A CHARACTER |
| 6113 | SKPDR | SKIP IF NEW SERIAL CHARACTER RECEIVED |

Table 3-continued

| | | |
|---|---|---|
| 6101 | WEXR | ACCUMULATOR→EXPANSION REGISTER |
| 6106 | SXRDAT | ⎫ SEQUENCE TRANSFERS EXPANSION REGISTER TO RECORDER DATA REGISTER RESETS RUPT |
| 6107 | CXRDAT | ⎭ COUNTER |
| 6316 | SXRPAR | ⎫ SEQUENCE SHIFTS RECORDER DATA REG BIT 11 |
| 6317 | CXRPAR | ⎭ INTO RECORDER CONTROL REGISTER |
| | | IF DO SXRDAT FIRST, THEN THIS SEQUENCE SHIFTS BIT 11 OF EXPANSION REGISTER INTO PARAMETER REGISTER |
| 6215 | WCRB2 | Ac→PIE2 CONTROL REG. B (FIG. 7D) |
| 6205 | WCRA2 | Ac→PIE2 CONTROL REG. A |
| 6204 | RCRA2 | Ac←PIE2 CONTROL REG. A V Ac (FIG. 7E) |
| 6315 | WCRB3 | Ac→PIE3 CONTROL REG. B (FIG. 7F) |
| 6305 | WCRA3 | Ac→PIE3 CONTROL REG. A |
| 6304 | RCRA3 | Ac←(PIE3 CONTROL REG. A) V Ac (FIG. 7G) |
| 6116 | SRREQ | ⎫ SEQUENCE PRODUCES "RECORD REQUEST" |
| 6117 | CRREQ | ⎭ PULSE TO RECORDER |
| 6306 | SFLGAP | ⎫ SEQUENCE PRODUCES "FILE GAP REQUEST" |
| 6307 | CFLGAP | ⎭ PULSE TO RECORDER (WHICH IS IGNORED) |
| 6102 | SKIPTK | SKIP IF TIME TICK HAS RISEN |
| 6103 | SKIPRR | SKIP IF RECORDER INTERRUPT HAS RISEN |
| 6202 | SKIPA1 | SKIP IF ATTN1 HAS RISEN |
| 6203 | SKIPA2 | SKIP IF ATTN2 HAS RISEN |
| 6212 | SKIPPS | SKIP IF PSTOP HAS RISEN (PISTON AT STOP) |
| 6302 | SKIPTL | SKIP IF TOP-OF-LINE SENSOR = 1 |
| 6303 | SKIPBL | SKIP IF BOTTOM-OF-LINE SENSOR = 1 |
| 6312 | SKIPDH | SKIP IF COMPARATOR SAYS DAC>INPUT |
| 6313 | SKBUSY | SKIP IF TAPE RECORDER NOT BUSY |
| 6201 | WPWR | XR→POWER CONTROLS |
| 6211 | WDAC | XR→DIGITAL-TO-ANALOG CONVERTER |
| | | CODE IS OFFSET BINARY, i.e. |
| | | 0 1 2 3 4 5 6 7 8 9 10 11 |
| | | 0 0 ......... ......... ......... 0→−10 V |
| | | 1 0 ......... ......... ......... 0→0 V |
| | | 1 1 1 ......... ......... ......... 1→+10 V |
| 6311 | WMOTOR | XR→MOTOR CONTROLLER |
| | | ENCODER IS POWERED WHEN FLAG 4 OF CONTROL REG. A OF PIE3 IS 0. ENCOSER IS UNPOWERED WHEN FLAG 4 OF CRA OF PIE3 IS 1. ACCESSED VIA WCRA3 AND RCRA3. |
| 6310 | RDENC | ENCODER V Ac→Ac |
| 6301 | INPUT | XR→ANALOG INPUT SELECT |
| 6216 | SMR | ⎫ PULSES MASTER RESET LINE TO UART |
| 6217 | CMR | ⎭ AT TURNON OR TO CLEAR ERROR BITS |
| 6114 | WVR1 | Ac→VECTOR ADDRESS FOR RUPTS ON PIE 1, i.e., TICK, RECRPT, UART TBRE, AND UART DR |
| 6214 | WVR2 | Ac→VECTOR ADDRESS FOR RUPTS ON PIE 2, i.e., ATTN1, ATTN2, PSTOP |
| 6314 | WVR3 | SETS VECTOR ADDRESS FOR PIE3 (TOP & BOTTOM OF LINE DACHI, TR BUSY) IT IS ANTICIPATED THAT THESE WILL NOT INTERRUPT THE PRECESSOR) |
| 6115 | WCRB1 | Ac→PIE1 CONTROL REGISTER B (FIG. 7H) |
| 6105 | WCRA1 | Ac→PIE1 CONTROL REG. A |
| 6104 | RCRA1 | Ac→(PIE1 CONTROL REG. A) V Ac (FIG. 7J) |

| Word | |
|---|---|
| 00 | Motor drive off (minimum power in controller). |
| 01 | Apply current-limited dynamic braking to motor. |
| 10 | Drive motor in down direction. |
| 11 | Drive motor in up direction. |

Figure 8:
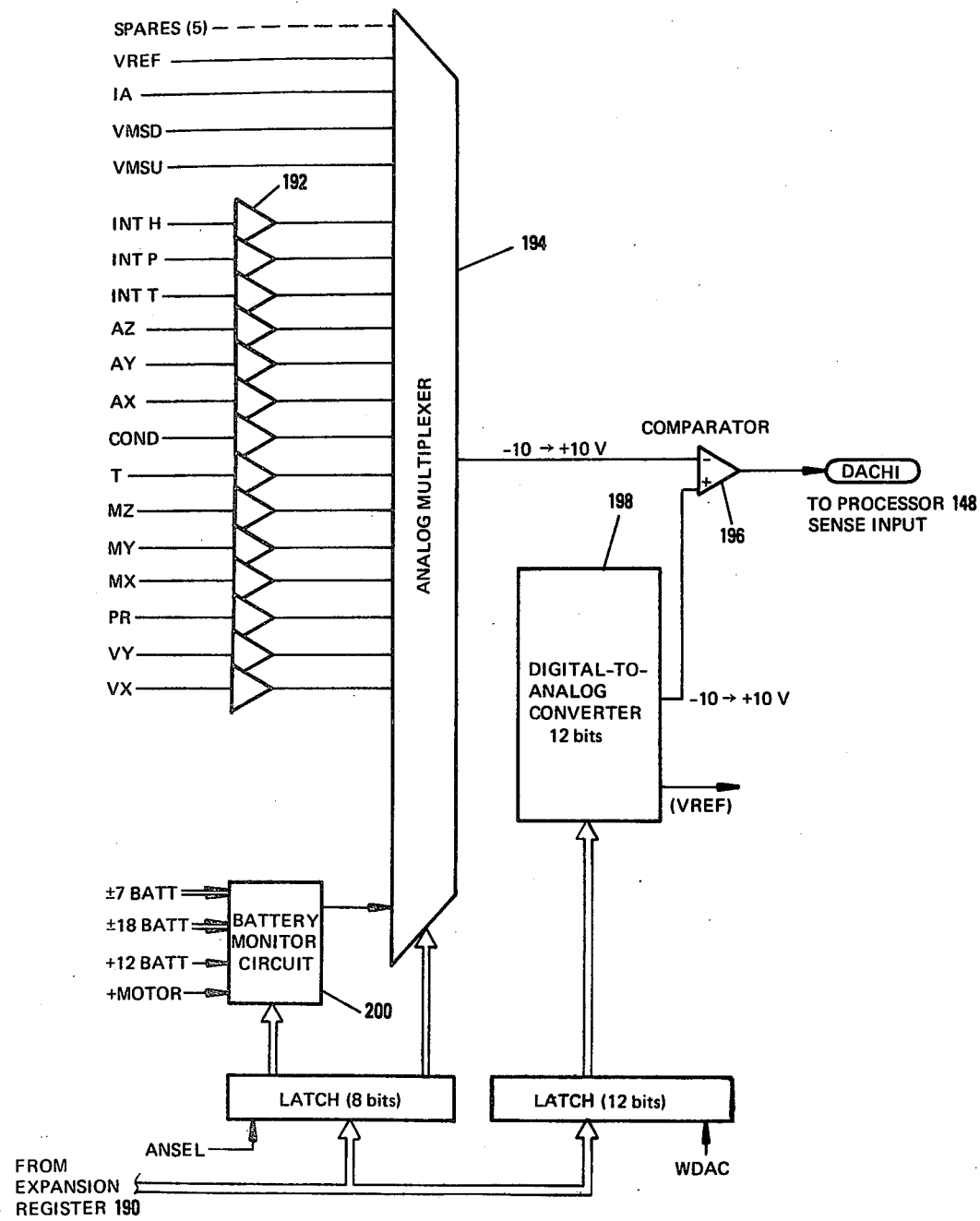
FIG. 8 shows in detailed block diagram form, the analog portion of the ECS of FIG. 4.

A detailed block diagram of the analog portion 190 of ECS 100 is shown in FIG. 8. Individual preconditioning and scaling amplifiers 192 associated with each input produce outputs that vary from −10 to +10 volts over the chosen sensor range. Table 4 shows the selection codes and design end points for the analog inputs to the ECS 100.

A single channel is selected via a 24-input analog multiplexer 194 and applied to a precision comparator 196 along with the output of a 12-bit digital-to-analog converter 198. The output from comparator 196 connects to a processor sense input (DACHI) which may be tested by program. Analog-to-digital conversion is accomplished by a successive-approximation routine resident in program memory.

Battery monitor circuit 200 permits the selection of an attenuated battery voltage cfor conversion, including the +MOTOR signal from the motor controller 102. The other three signals representing the motor behavior are brought to the multiplexer, as is the ECS 100 internal reference voltage which is obtained from the digital-to-analog converter 198.

5. Programmed Microprocessor

Table 4

| Select Code (Octal) | Symbol | Variable |
|---|---|---|
| XX01 | VX | X velocity |
| XX02 | VY | Y velocity |
| XX03 | PR | External pressure |
| XX04 | MX | X magnetometer |

Table 4-continued

| Select Code (Octal) | Symbol | Variable |
|---|---|---|
| XX05 | MY | Y magnetometer |
| XX06 | MZ | Z magnetometer |
| XX07 | T | External temperature |
| XX10 | COND | Conductivity |
| XX11 | AX | X accelerometer |
| XX12 | AY | Y accelerometer |
| XX13 | AZ | Z accelerometer |
| XX14 | INT T | Internal temperature |
| XX15 | INT P | Internal Pressure |
| XX16 | — | — |
| XX17 | VMSU | Motor voltage 1 |
| XX20 | VMSD | Motor voltage 2 |
| XX21 | IA | Motor current |
| XX22 | VREF | Reference 2.5 V |
| XX23 | — | — |
| XX24 | — | — |
| XX25 | — | — |
| XX26 | — | — |
| XX27 | — | — |
| X0XX | — | — |
| X100 | — | — |
| X200 | −18B | −18 V battery |
| X300 | −7B | −7 V battery |
| X400 | +12B | +12 V battery |
| X500 | +MOTOR | Motor battery |
| X600 | +18B | +18 V battery |
| X700 | +7B | +7 V battery |

A microprocessor 150 and associated memory 161 provide the overall control for system 1 so that the assent and decent rates may be precisely controlled without exact foreknowledge of the critical parameters of line tilt, local water density, mooring line friction and current velocity profile. All this is accomplished minimal interfering effects of wave induced motion. Furthermore, the system 1 provides output signals representative of the resolution of the ocean current in absolute north and east components so that all of the desired averages of these components are recorded. In performing this control function, the microprocessor 150 performs two primary functions during operation:

(1) ascent/descent rate and scheduling control, using pressure and current data and affected by motor-driven change of buoyancy.

(2) data gathering via datatizing of analog sensor outputs, processing and recording of that data.

Figure 9:
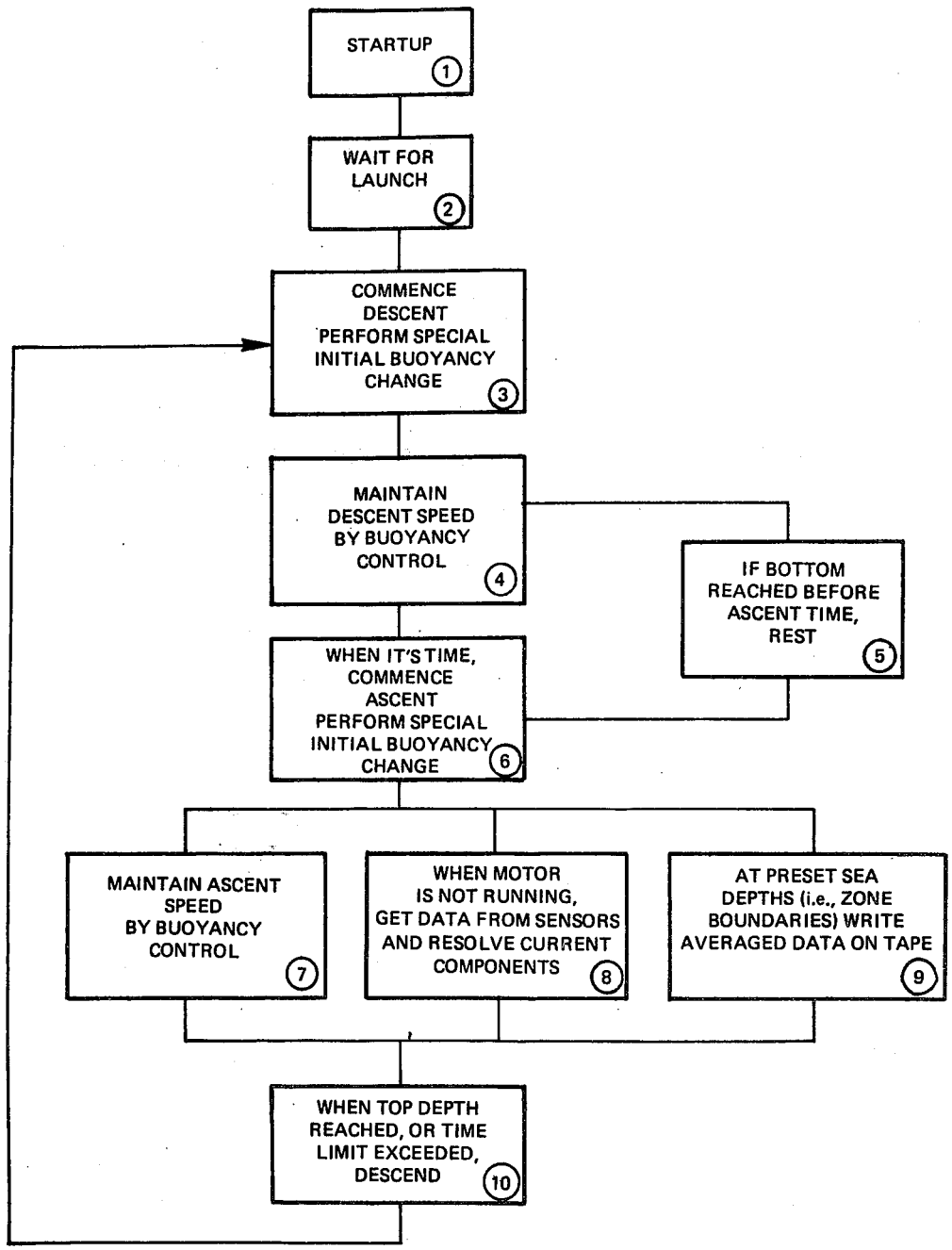
FIG. 9 shows in block diagram form, the tasks performed by the programmed microprocessor of the ECS of FIG. 4.

FIG. 9 shown in block diagram form the tasks performed by the programmed microprocessor 150. The encircled reference numerals of FIG. 9 relate to the following numbered paragraphs explaining the various subtasks.

1. Startup is initiated manually. Prior to startup, the clock and microprocessor 150 may be operating and most system functions may be exercised for test purposes.

2. System 1 remains dormant until a preset time and pressure are reached.

3. To commence descent (or ascent) the buoyancy motor runs until a defined displacement change has been obtained after leaving the upper (or lower) stop. This displacement is computed in real time, as a simple function of local current magnitude, and (descent only) of the time available before the next ascent.

4. Periodically, pressure is sensed, and adjusted ascent/descent rate of the system is calculated. If the system has had sufficient time to reach terminal velocity after the previous buoyancy change, then a decision is made as to whether or not further buoyancy change is necessary, based on whether the ascent/descent velocity is within specified limits. These limits may be changed for each zone during ascent; By way of example, typical values might be in the range 7 to 13 centimeters/second for ascent, or in the range −7 to −20 centimeters/second for descent. If buoyancy change is necessary, the amount, in pistonposition encoder units, is calculated as a function of the desired speed change, the value and result of the last buoyancy change, and the local current magnitude.

5. The "bottom" is determined solely by pressure.

6. Same as paragraph 3 above. Ascent commences at predetermined times.

7. Same as paragraph 4 above. Typically, ascent may take 30 minutes.

8. Current, accelerometer, and magnetometer data are sensed frequency, e.g. every 0.5 to 4 seconds. All data is saved directly on the onboard tape recorder 98. In alternative embodiments, only zone averages of resolved current velocity components may be recorded.

9. At preset zones, i.e. pressures, time is determined and temperature, pressure, and conductivity are averaged, and recorded for each zone.

10. The "top" is defined solely by pressure. The "time limit" for ascent is reached when all the time remaining before the next ascent is needed for descent.

Figure 10:
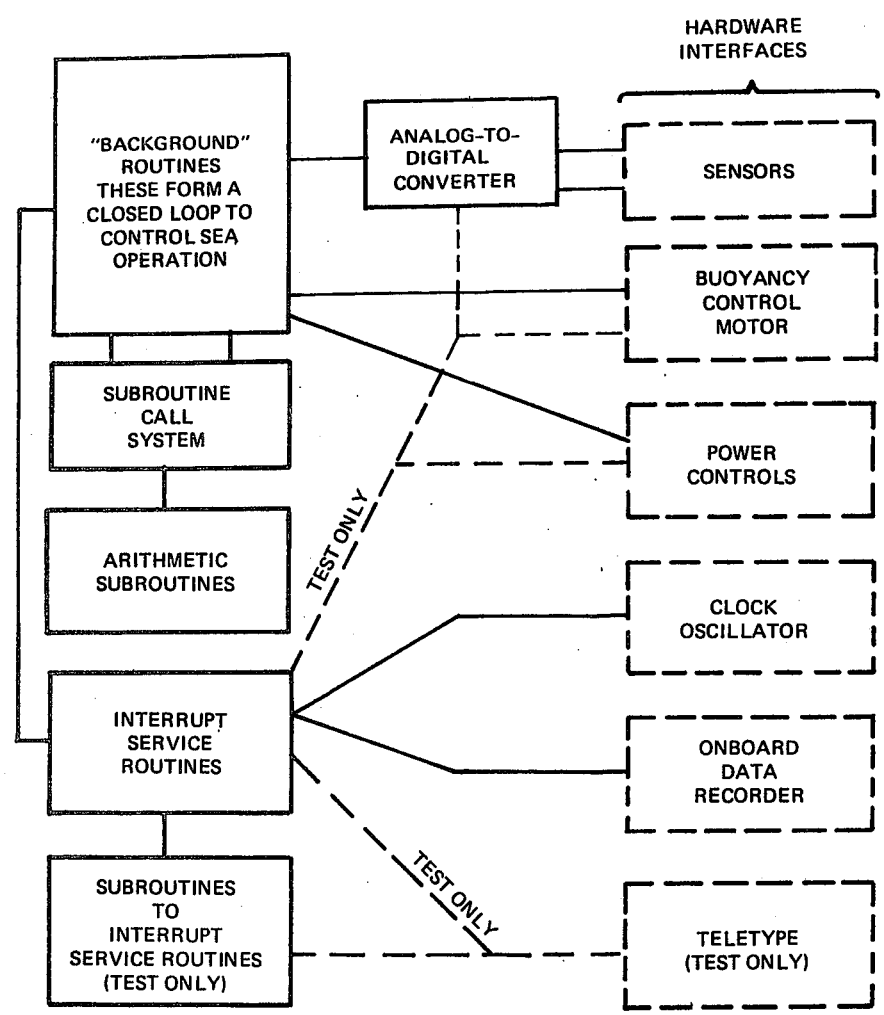
FIG. 10 shows an overview of the background and interrupt routines for the microprocessor of the ECS of FIG. 4.
Figure 11:
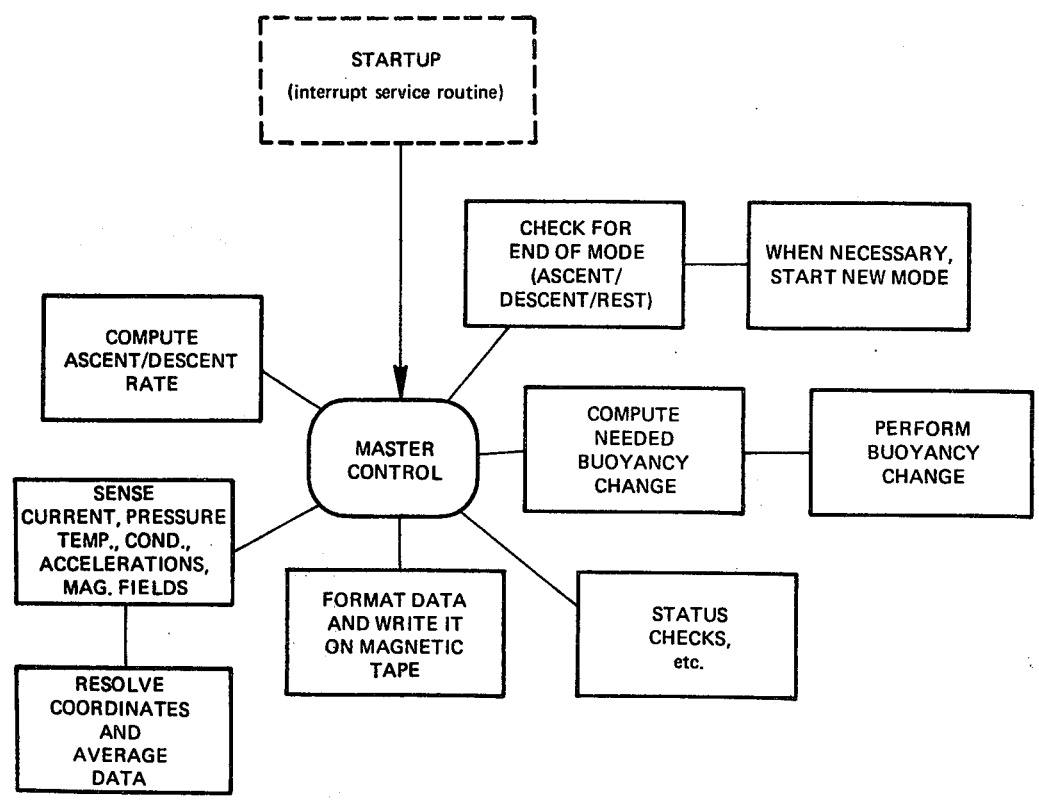
FIGS. 11-13 show component routines for the background, arithmetic and service tasks for the microprocessor of the ECS of FIG. 4.
Figure 12:
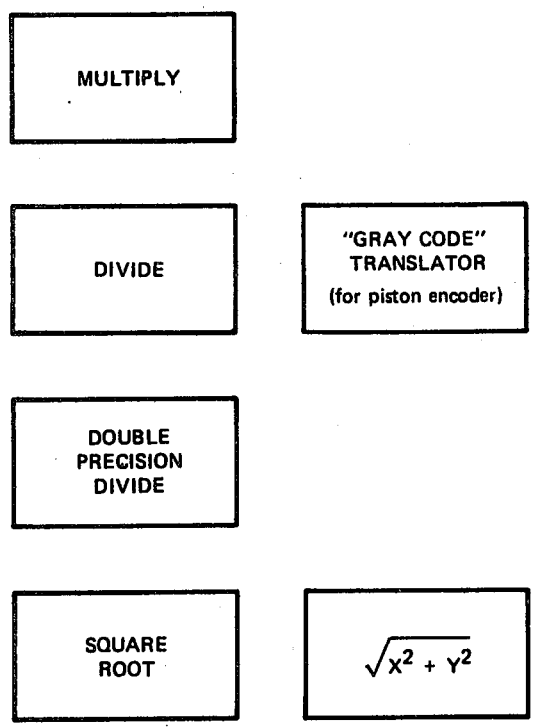
Figure 13:
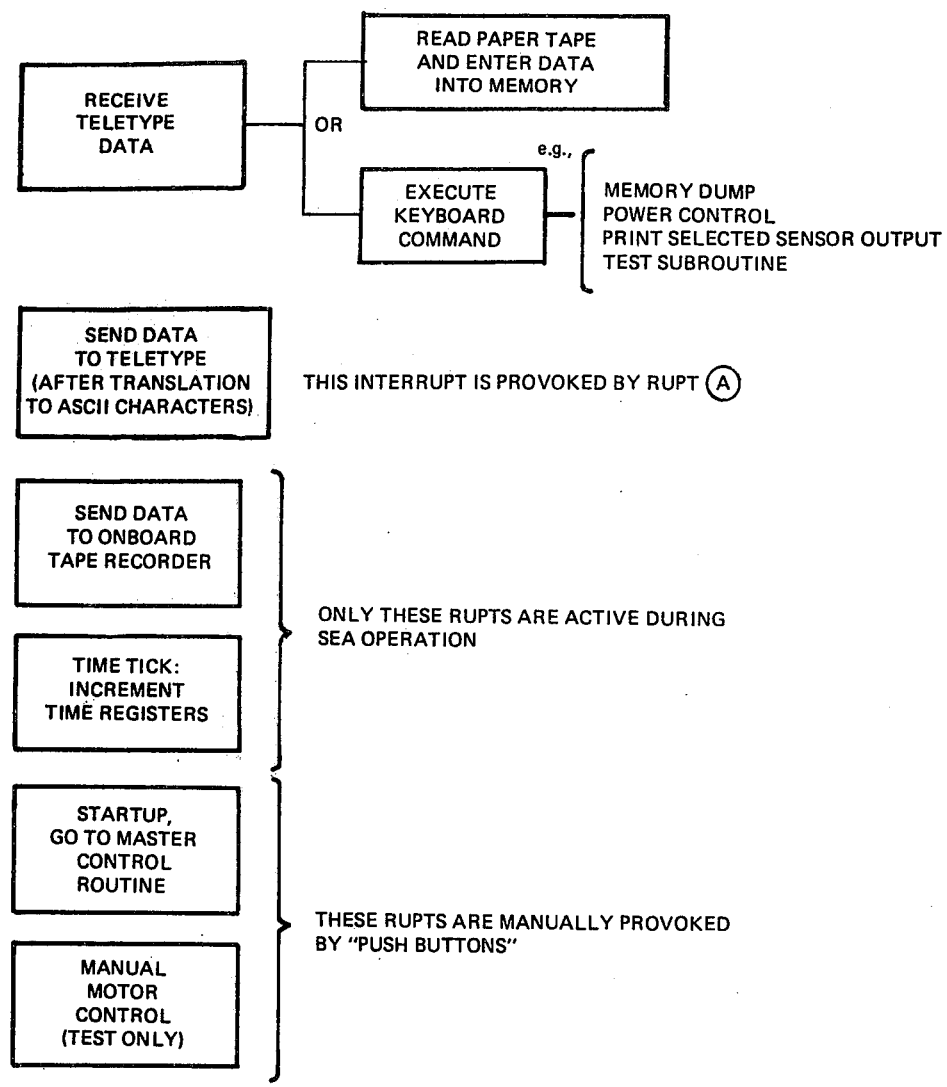
Figure 14:
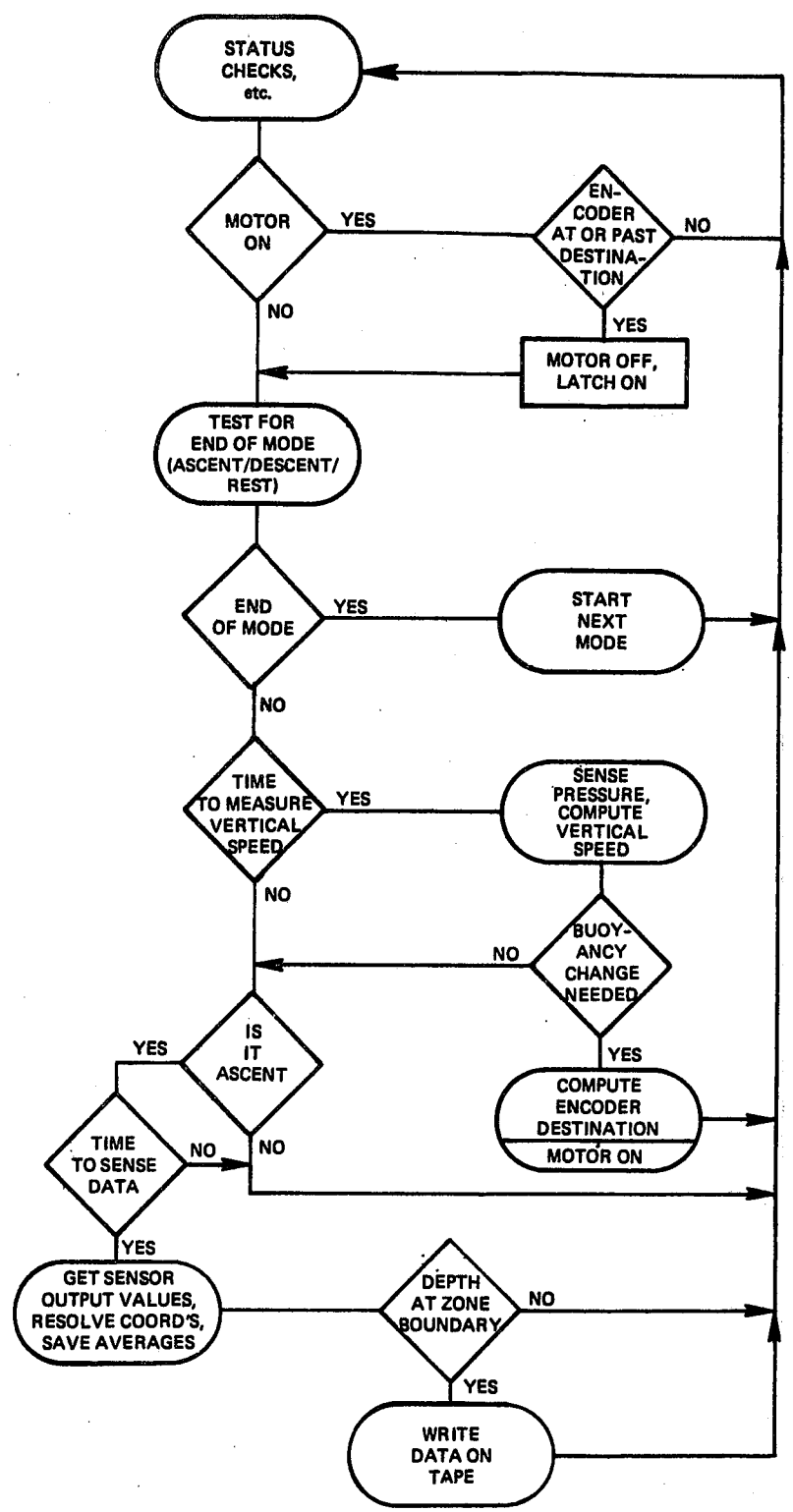
FIG. 14 shows in detailed flow chart form, the master control routine for the microprocessor of the ECS of FIG. 4.

The microprocessor 150 is functionally equivalent to a Digital Equipment Corporation PDP8P/E computer using the same instruction set. FIG. 10 shows an overview of the background and interrupt routines and how those routines interrupt with the hardware. FIGS. 11-13 show major component routines of the background and arithmetic subroutines, and interrupt service routines, respectively. FIG. 14 is a detailed flow chart of the logic of the master control routine. From these flow charts and the above description, the particular instructions for executing them for controlling the operation of system 1 may be readily configured by one skilled in the art. The numeric machine instructions in machine language form are shown in the appendix.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

TABLE OF CONTENTS   PCM BETA PROGRAMS, 7/78.   APPENDIX                    DAY=221  19:00  08/09/78   PAGE 1

```
           MEMBER           SSI      TTP      RECORDS    PAGE
           ABVAL                     0000.13     31         1
           ATCD                      0000.18     63         2
           ATTN1                     001C.05     31         4
           ATTN2                     001B.06     80         5
           EDIVID                    0001.06     84         7
           EUDYC                     0016.1D     92         9
           DATGET                    0016.09     59        11
           DELAY                     0001.10     32        13
           DFDIV                     0002.05     34        14
           DUMBACKG                  0002.0A     30        15
           EDGET                     0017.0B     91        16
           ENCGET                    0002.0E     34        18
           ENDLYR                    0013.01     47        19
           ENDMA                     0019.09     57        20
           ENDMD                     0015.0A     57        21
           ENDMR                     0012.01     28        22
           ENDMR2                    0003.01     28        23
           GRAYBI                    0003.05     34        24
           INITA                     001A.07    113        25
           INITD                     0018.0F     80        27
           INITIAL                   001B.0F    269        29
           INITR                     0016.03     47        34
           INITR2                    0018.08     59        35
           LAUNCH                    0014.08    142        37
           MASTER                    001E.01    255        40
           MOFF                      0003.0A     59        45
           MCON                      0004.01     50        47
           MULT                      0004.07     57        48
           NDELB                     0004.0E     93        49
           PARAM                     001A.01     44        51
           PSTOP                     0005.0A     62        52
           PBEGIN                    0006.04     36        54
           RECEPT                    0006.09     30        55
           RUPTSERV                  0006.0D     68        56
           SORT                      0007.05     47        58
           SUBOVR                    0007.0B     70        59
           SYSOVR                    0008.04     77        61
           TAVE64                    0013.0E     78        63
           TESTRC                    0008.0D     45        65
           TIMERUPT                  0009.04     41        66
           TFGET                     0013.07     56        67
           UARTCOMS                  0009.0A    279        68
           UARTSERV            o     000B.0A    220        73
           UARTTEBE                  000D.06     99        77
           UMOFF                     000E.03     59        79
           USUBS                     000E.0A    177        81
           VMAGET                    000F.0E     86        85
           WRITE                     0010.0A    172        87
           ZOGET                     001C.0A     57        91
```

****** END OF DIRECTORY    49 MEMBERS -   3 BLOCKS USED - 158 BYTES PLUS  14 BLOCKS UNUSED ******

ABVAL              PCM BETA PROGRAMS, 7/78.                                       DAY=221  19:00  08/09/78   PAGE 1

```
1BEGIN PASS 1                                                                                   0000000
                                                                                                0000000
                                                                                                0000000
    END OF PASS 1                                                                               0000000
1BEGIN PASS 2                                                                                   0000000
                                                                                                0000000
        1              / ABSOLUTE VALUE                                                         0000000
        2              /    ABVAL(ACC.) LEFT IN ACC. AND 131 IS FLIP-FLOPPED                    0000000
        3              /    (0 -- -1) AS A FLAG IF ACC. WAS NEGATIVE.                           0000000
        4              /                                                                       0000000
        5       5543   RETURN=JMP I 143                                                         0000000
        6       7140   *7140                                                                    0000000
        7  7140 7500   ABVAL,   SMA                                                             0000000
        8  7141 5543            RETURN                                                          0000000
        9  7142 7041            CIA                                                             0000000
       10  7143 3122            DCA 122      / TEMPORARY SAVE                                   0000000
       11  7144 1131            TAD 131                                                         0000000
       12  7145 7440            SZA          / FLAG ZERO ?                                      0000000
       13  7146 7201            CLA IAC      / NO, ACC. = 1                                     0000000
       14  7147 7041            CMA IAC      / YES, ACC = ACC - 1                               0000000
       15  7150 7040            CMA                                                             0000000
       16  7151 3131            DCA 131      / DEPOSIT FLAG                                     0000000
       17  7152 1122            TAD 122      / ABVAL                                            0000000
       18  7153 5543            RETURN                                                          0000000
    END OF PASS 2                                                                               0000000
                                                                                                0000000
        0 ERRORS DETECTED                                                                       0000000
1SYMBOL TABLE                                                                                   0000000
                                                                                                0000000
    ABVAL 7140    RETURN 5543                                                                   0000000
```

****** END OF MEMBER ABVAL      31 RECORDS ******

```
ATOD                PCM BETA PROGRAMS, 7/78.                                    DAY=221 19:00 08/09/78    PAGE 2

1BEGIN PASS 1

END OF PASS 1
1BEGIN PASS 2

1                    / SELECTS ANALOG INPUT (IN ACCUMULATOR BEFORE CALL),
     2                    / WAITS 10 OR 30 MILLISECONDS FOR TRANSIENT (30 IF BATTERY MONITOR), AND
     3                    / LEAVES BINARY VALUE OF SELECTED INPUT IN 30 AND ACCUMULATOR
     4                    /
     5         4140       CALL=JMS 140
     6         5543       RETURN=JMP I 143
     7         6101       WEXR=6101
     8         6211       WDAC=6211
     9         6312       SKIPDH=6312
    10         7363       DELAY3=7363
    11         6301       INPUT=6301
    12         7362       DELAY2=7362
    13         0030       *30
    14  0030  0000        APPROX,  0
    15         3400       *3400
    16  3400  6101        ATOD,    WEXR
    17  3401  6301                 INPUT              / SELECT ANALOG INPUT
    18  3402  0241                 AND BITS
    19  3403  7450                 SNA                / BATTERY MONITOR ?
    20  3404  5210                 JMP NBM            / NO
    21  3405  7300                 CLL CLA            / YES
    22  3406  4140                 CALL
    23  3407  7362                 DELAY2             / WAIT 10 MS
    24  3410  4140        NBM,     CALL
    25  3411  7363                 DELAY3             / WAIT 10 MS
    26  3412  7330                 CLA CLL CML RAR    / 4000
    27  3413  7421                 MQL
    28  3414  3030                 DCA APPROX         / 0 INTO APPROX
    29  3415  1030        ADLOOP,  TAD APPROX
    30  3416  7501                 MQA                / APPROX OR BITPOS
    31  3417  6101                 WEXR
    32  3420  6211                 WDAC
    33  3421  7200                 CLA
    34  3422  1030                 TAD APPROX         / RECOVER APPROX AND KILL TIME
    35  3423  6312                 SKIPDH             / DAC TOO HIGH?
    36  3424  7501                 MQA                / NO,  OR IN BITPOS
    37  3425  3030                 DCA APPROX         /       AND PUT BACK
    38  3426  7701                 CLA MQA
    39  3427  7110                 CLL RAR            / UPDATE BITPOSITION
    40  3430  7450                 SNA                / DONE?
    41  3431  5234                 JMP ADOUT          / YES
    42  3432  7421                 MQL                / NO,  CONTINUE
    43  3433  5215                 JMP ADLOOP
    44  3434  7300        ADOUT,   CLA CLL
    45  3435  6101                 WEXR
    46  3436  6211                 WDAC
    47  3437  1030                 TAD APPROX         / THIS LEAVES OFFSET BINARY
    48  3440  5543                 RETURN             /    VALUE IN ACC. AND APPROX
    49  3441  0700        BITS,    0700

END OF PASS 2

ATOD                PCM BETA PROGRAMS, 7/78.                                    DAY=221 19:00 08/09/78    PAGE 3

0 ERRORS DETECTED
1SYMBOL TABLE

ADLOOP 3415   ADOUT  3434   APPROX 0030   ATOD   3400   BITS  3441   CALL 4140   DELAY2 7362   DELAY3 7363
INPUT  6301   NBM    3410   RETURN 5543   SKIPDH 6312   WDAC  6211   WEXR 6101

******** END OF MEMBER ATOD       63 RECORDS ********

ATTN1               PCM BETA PROGRAMS, 7/78.                                    DAY=221 19:00 08/09/78    PAGE 4

1BEGIN PASS 1

END OF PASS 1
1BEGIN PASS 2

1                    / INTERRUPT ROUTINE TO RESET AND START TIME REGISTERS
     2                    /       20,21,22.
     3                    /
     4         6105       WCRA1=6105
     5         5340       *5340
     6  5340  7300        ATTN1,   CLL CLA
     7  5341  3020                 DCA 20             / CLEAR TIME WORDS--
     8  5342  3021                 DCA 21
     9  5343  3022                 DCA 22
    10  5344  3065                 DCA 65             / CLEAR COUNTER OF RESETS
    11  5345  3054                 DCA 54             / CLEAR PSTOP FLAG
    12  5346  3006                 DCA 6              / CLEAR UPLIM COUNTER
    13  5347  3007                 DCA 7              / CLEAR LOWLIM COUNTER
    14  5350  1354                 TAD K57
    15  5351  6105                 WCRA1              / ENABLE TIME RUPT
    16  5352  7300                 CLL CLA
    17  5353  5432                 JMP I 32           / RETURN
    18  5354  0057        K57,     57

END OF PASS 2

0 ERRORS DETECTED
1SYMBOL TABLE

ATTN1  5340    K57    5354    WCRA1  6105

******** END OF MEMBER ATTN1      31 RECORDS ********
```

```
ATTN2              PCM BETA PROGRAMS, 7/78.                                      DAY=221 19:00 08/09/78   PAGE 5

1BEGIN PASS 1

END OF PASS 1
1BEGIN PASS 2

1                      / CALLED BY SYSOVR WHEN MAGNET IS REMOVED.
     2                      / THIS STARTS POWER AND ENCODER, ENTERS WAIT MODE, AND
     3                      /   DOES APPROPRIATE INITIALIZING.  SYSTEM IS NORMALLY IN
     4                      /   IDLE MODE BEFORE ATTN2 IS CALLED.
     5                      /
     6          6101         WEXR=6101
     7          6201         WPWR=6201
     8          4500         TPGET=4500
     9          4140         CALL=JMS 140
    10          5543         RETURN=JMP I 143
    11          7360         DELAY=7360
    12          6304         RCRA3=6304
    13          6305         WCRA3=6305
    14          5000         DATGET=5000
    15                      /
    16          3040         *3040
    17   3040   7301        ATTN2,   CLA CLL IAC
    18   3041   3055                 DCA 55        / SET AIR PURGE FLAG
    19   3042   3107                 DCA 107       / CLEAR DELTA B DAMPING FLAG
    20   3043   3031                 DCA 31        / CLEAR DESCENT FORMAT 3 COUNTER
    21   3044   1314                 TAD M164
    22   3045   3106                 DCA 106       / ENDMODE POSTPONEMENT COUNTER
    23   3046   1021                 TAD 21        / TIME (40.96 SEC. UNITS)
    24   3047   1176                 TAD 176       / WAIT TIME  ( "  )
    25   3050   3024                 DCA 24        / SAVE AS ASCENT END TIME
    26   3051   1173                 TAD 173       / FULL CYCLE TIME
    27                      /        CLL RAR       / DIVIDE BY 2
    28   3052   1021                 TAD 21        / TIME NOW
    29   3053   3025                 DCA 25        / SAVE TIME OF NEXT ASCENT
    30                      /        CLA CMA       / 7777 INTO ACC.
    31                      /        WEXR
    32                      /        WPWR          / ALL POWER ON
    33                      /        DCA 57        / SAVE POWER WORD
    34   3054   4140                 CALL
    35   3055   7360                 DELAY         / .1 SECOND
    36   3056   7200                 CLA
    37   3057   6304                 RCRA3
    38   3060   7421                 MQL
    39   3061   7330                 CLA CLL CML RAR   / ENCODER ON BIT
    40   3062   7501                 MQA           / CRA3 OR (INCLUSIVE) ENCODER ON BIT
    41   3063   6305                 WCRA3         / ENCODER ON
    42   3064   4140                 CALL
    43   3065   4500                 TPGET         / GET EXTERNAL PRESSURE INTO 136 AND ACC.
    44   3066   3137                 DCA 137       / SAVE AS OLD P
    45   3067   3023                 DCA 23        / ZERO Z DOT STOPWATCH
    46   3070   1313                 TAD ENDDA     / ENDMODE(DESCENT) ADDRESS
    47   3071   3067                 DCA 67        / SAVE ON PAGE 0.
    48   3072   7307                 CLA CLL IAC RTL   / 4
    49   3073   3177                 DCA 177       / MODE ID = WAIT
    50   3074   1311                 TAD PL        / ADD. OF P TOP OF LAYER. SET TO BOTTOM LAYER
    51   3075   3161                 DCA 161       /   SO ENDMA WON'T START DESCENT PREMATURELY.

ATTN2              PCM BETA PROGRAMS, 7/78.                                      DAY=221 19:00 08/09/78   PAGE 6

52   3076   1312                 TAD M10       / WRITE 10 FRAMES OF JUNK ---
    53   3077   3134                 DCA 134
    54   3100   4140                 CALL
    55   3101   5000                 DATGET
    56   3102   2134                 ISZ 134
    57   3103   5300                 JMP .-3
    58   3104   7300                 CLL CLA
    59   3105   6101                 WEXR
    60   3106   6201                 WPWR          / POWER OFF
    61   3107   3057                 DCA 57        / POWER WORD
    62   3110   5543                 RETURN
    63   3111   3200        PL,      3200
    64   3112   7766        M10,     -12
    65   3113   6041        ENDDA,   6041          / ADDRESS OF ENDMODE(DESCENT)
    66   3114   7552        M164,    -226

END OF PASS 2

0 ERRORS DETECTED
1SYMBOL TABLE

ATTN2 3040     CALL   4140    DATGET 5000    DELAY 7360    ENDDA 3113    M10  3112    M164 3114    PL   3111
RCRA3 6304     RETURN 5543    TPGET  4500    WCRA3 6305    WEXR  6101    WPWR 6201

******** END OF MEMBER ATTN2     80 RECORDS ********
```

```
BDIVID              PCM BETA PROGRAMS, 7/78.                                                DAY=221 19:00  08/09/78    PAGE 7

1BEGIN PASS 1                                                                                              0000000
                                                                                                           0000000
                                                                                                           0000000
END OF PASS 1                                                                                              0000000
1BEGIN PASS 2                                                                                              0000000
                                                                                                           0000000
         1.              / UNSIGNED BASIC DIVIDE.                                                          0000000
         2               /     DIVISOR IN ACC.                                                             0000000
         3               /     DIVIDEND IN 132, 133                                                        0000000
         4               /     QUOTIENT IN 130,  REMAINDER IN 132                                          0000000
         5               / LINK ON ENTRY:  0 MEANS HIGH ORDER QUOT. DESIRED                                0000000
         6               /                 1 MEANS LOW ORDER QUOT. DESIRED (ASSUMES DIVISOR                0000000
         7               /                 >LEFT HAND DIVIDEND AND < 4000 OCTAL)                           0000000
         8               /                                                                                 0000000
         9       5543    RETURN=JMP I 143                                                                  0000000
        10       4140    CALL=JMS 140                                                                      0000000
        11       0121    MASK=121                                                                          0000000
        12       0130    QUOT=130                                                                          0000000
        13       0135    DIVIS=135                                                                         0000000
        14       0134    L=134                                                                             0000000
        15       7200    *7200                                                                             0000000
        16  7200 3135    BDIVID, DCA DIVIS          / DIVISOR                                              0000000
        17  7201 1264            TAD DCOUNT                                                                0000000
        18  7202 3134            DCA L              / LOOP COUNTER                                         0000000
        19  7203 3130            DCA QUOT           / CLEAR QUOTIENT                                       0000000
        20  7204 7240            CLA CMA                                                                   0000000
        21  7205 3121            DCA MASK           / INITIALIZE MASK                                      0000000
        22  7206 7430            SZL                                                                       0000000
        23  7207 5220            JMP DSTART         / SKIP 12 BIT ROTATION OF DIVIDEND                     0000000
        24                                          /     FOR LOW ORDER QUOTIENT.                          0000000
        25  7210 7201            CLA IAC                                                                   0000000
        26  7211 3121            DCA MASK           / CHANGE MASK                                          0000000
        27  7212 1132            TAD 132            / ROTATE DIVIDEND 12--                                 0000000
        28  7213 7421            MQL                                                                       0000000
        29  7214 1133            TAD 133                                                                   0000000
        30  7215 3132            DCA 132                                                                   0000000
        31  7216 7501            MQA                                                                       0000000
        32  7217 3133            DCA 133                                                                   0000000
        33  7220 7100    DSTART, CLL                                                                       0000000
        34  7221 1132            TAD 132            / ROTATE DIVIDEND 1 LEFT--                             0000000
        35  7222 7004            RAL                                                                       0000000
        36  7223 3132            DCA 132                                                                   0000000
        37  7224 1133            TAD 133                                                                   0000000
        38  7225 7004            RAL                                                                       0000000
        39  7226 3133            DCA 133                                                                   0000000
        40  7227 7430            SZL                                                                       0000000
        41  7230 2132            ISZ 132                                                                   0000000
        42  7231 1132            TAD 132                                                                   0000000
        43  7232 0121            AND MASK           / MASK LH (-13-L) BITS IF HIGH QUOT.                   0000000
        44  7233 7141            CLL CIA            / MINUS                                                0000000
        45  7234 1135            TAD DIVIS          / DIVISOR - ACC.                                       0000000
        46  7235 7420            SNL                / ACC. > DIVIS?                                        0000000
        47  7236 5241            JMP D2             / YES                                                  0000000
        48  7237 7440    ZTEST,  SZA                / NO;  ACC. = DIVISOR ?                                0000000
        49  7240 5247            JMP RELOOP         / NO                                                   0000000
        50  7241 7300    D2,     CLL CLA            / YES                                                  0000000
        51  7242 1135            TAD DIVIS                                                                 0000000

BDIVID              PCM BETA PROGRAMS, 7/78.                                                DAY=221 19:00  08/09/78    PAGE 8

52  7243 7041            CIA                                                                       0000000
        53  7244 1132            TAD 132            / LH DIVIDEND                                          0000000
        54  7245 3132            DCA 132                                                                   0000000
        55                                          / LH DIVIDEND = LH DIVIDEND - DIVISOR.                 0000000
        56  7246 2130            ISZ QUOT           / INCREMENT QUOTIENT                                   0000000
        57  7247 2134    RELOOP, ISZ L              / LOOP COUNTER                                         0000000
        58  7250 5253            JMP .+3                                                                   0000000
        59  7251 7300            CLA CLL                                                                   0000000
        60  7252 5543            RETURN                                                                    0000000
        61  7253 7300            CLL CLA                                                                   0000000
        62  7254 1130            TAD QUOT           / ROTATE QUOTIENT                                      0000000
        63  7255 7004            RAL                                                                       0000000
        64  7256 3130            DCA QUOT                                                                  0000000
        65  7257 7120            STL                                                                       0000000
        66  7260 1121            TAD MASK           / ADD RH ONE TO MASK                                   0000000
        67  7261 7004            RAL                                                                       0000000
        68  7262 3121            DCA MASK                                                                  0000000
        69  7263 5220            JMP DSTART                                                                0000000
        70  7264 7764    DCOUNT, -14                / -12 DECIMAL, LOOP CONSTANT.                          0000000
                                                                                                           0000000
END OF PASS 2                                                                                              0000000
                                                                                                           0000000
   0 ERRORS DETECTED                                                                                       0000000
1SYMBOL TABLE                                                                                              0000000

BDIVID 7200   CALL    4140   DCOUNT 7264   DIVIS  0135   DSTART 7220   D2   7241   L   0134   MASK  0121  0000000
 QUOT   0130   RELOOP  7247   RETURN 5543   ZTEST  7237                                                    0000000

******** END OF MEMBER BDIVID       84 RECORDS ********
```

```
BUOYC              PCM BETA PROGRAMS, 7/78.                                              DAY=221  19:00  08/09/78   PAGE 9

1BEGIN PASS 1

END OF PASS 1
1BEGIN PASS 2

1                      / TESTS TO SEE IF BUOYANCY CHANGE IS NECESSARY, AND
       2                      /     IF IT IS CALLS NDELB TO GET ENCODER DESTINATION
       3                      /     AND STARTS MOTOR.
       4                      /
       5      6310            RDENC=6310
       6      3500            GRAYBI=3500
       7      6101            WEXR=6101
       8      2510            MOON=2510
       9      6311            WMOTOR=6311
      10      5600            EDGET=5600
      11      5543            RETURN=JMP I 143
      12      4140            CALL=JMS 140
      13      7360            DELAY=7360
      14      4600            NDELB=4600
      15                      /
      16      4400            *4400
      17  4400 7300   BUOYC,  CLA CLL
      18  4401 1077           TAD 77          / FLAG FROM LAUNCH ROUTINE, SET BEFORE LIFTOFF
      19  4402 7440           SZA             / SET?
      20  4403 5543           RETURN          / YES, RETURN
      21  4404 1167           TAD 167         / NO,  GET MOTOR FLAG
      22  4405 7440           SZA             / MOTOR ON ?
      23  4406 5543           RETURN          / YES
      24  4407 1107           TAD 107         / NO,  GET DELTA B DAMPING FLAG
      25  4410 7450           SNA             / SET ?
      26  4411 5215           JMP .+4         / NO, CONTINUE (+3 HERE, FOR TEST, CAUSES RETURN)
      27  4412 7200           CLA             / YES, CLEAR AND RETURN--
      28  4413 3107           DCA 107
      29  4414 5543           RETURN
      30  4415 1175           TAD 175         / Z DOT
      31  4416 7041           CIA
      32  4417 1570           TAD I 170       / Z DOT MINIMUM - Z DOT
      33                      / THIS A - B ASSUMES ABVAL(A OR B) < 3777 AND IF AB < 0,
      34                      /    THEN ABVAL(A) + ABVAL(B) < 4000 (OCTAL).
      35  4420 7510           SPA             / ZDOT < Z DOT MIN. ?
      36  4421 5235           JMP BU1         / NO
      37  4422 4140           CALL            / YES
      38  4423 4457           NDELB2          / ROUTINE TO COMPUTE NEEDED DELTA B
      39                      / AND ENCODER DESTINATION--- DELTA B IN 166, E.D. IN 156 AND ACC.
      40  4424 7300   BUED,   CLA CLL
      41  4425 1256           TAD MOTDN
      42  4426 4140           CALL
      43  4427 2510           MOON            / MOTOR DOWN
      44  4430 1175   BZ,     TAD 175
      45  4431 3165           DCA 165         / OLD Z DOT = Z DOT
      46  4432 1127           TAD 127
      47  4433 3126           DCA 126         / OLD V MAG. = V MAG.
      48  4434 5543           RETURN
      49  4435 7300   BU1,    CLL CLA
      50  4436 1175           TAD 175         / Z DOT INTO ACC.
      51  4437 7041           CIA

BUOYC              PCM BETA PROGRAMS, 7/78.                                              DAY=221  19:00  08/09/78   PAGE 10

52  4440 1560           TAD I 160       / Z DOT MAXIMUM
      53  4441 7500           SMA             / Z DOT > MAX. ?
      54  4442 5253           JMP BU2         / NO
      55  4443 7300           CLL CLA         / YES
      56  4444 4140           CALL            /
      57  4445 4461           NDELB3          / COMPUTE NEEDED DELTA B AND E.D.
      58  4446 7300   BUEE,   CLA CLL
      59  4447 1255           TAD MOTUP
      60  4450 4140           CALL
      61  4451 2510           MOON            / MOTOR UP
      62  4452 5230           JMP BZ          / MOTOR FLAG
      63  4453 7300   BU2,    CLA CLL         / HERE IF Z DOT IS OK
      64  4454 5543           RETURN
      65  4455 0003   MOTUP,  0003
      66  4456 0002   MOTDN,  0002
      67                      /
      68                      / COMPUTE SIMPLE-MINDED BUOYANCY CORRECTION--
      69                      /
      70  4457 7300   NDELB2, CLL CLA
      71  4460 1265           TAD KB
      72  4461 1266   NDELB3, TAD KB2
      73  4462 4140           CALL
      74  4463 5600           EDGET           / GET AND LOAD ENCODER DEST.
      75  4464 5543           RETURN
      76  4465 7042   KB,     -736            / -30 (DECIMAL) CUBIC INCHES
      77  4466 0357   KB2,    357             / +15 CU. IN.

END OF PASS 2

0 ERRORS DETECTED
1SYMBOL TABLE

BUED   4424   BUEE   4446   BUOYC  4400   BU1   4435   BU2    4453   BZ    4430   CALL   4140   DELAY 7360
EDGET  5600   GRAYBI 3500   KB     4465   KB2   4466   MOON   2510   MOTDN 4456   MOTUP  4455   NDELB 4600
NDELB2 4457   NDELB3 4461   RDENC  6310   RETURN 5543  WEXR   6101   WMOTOR 6311

******** END OF MEMBER BUOYC       92 RECORDS ********
```

DATGET            PCM BETA PROGRAMS, 7/78.

1BEGIN PASS 1

END OF PASS 1
1BEGIN PASS 2

```
  1                       / ROUTINE TO WRITE FAST ASCENT DATA.
  2                       /
  3         4140          CALL=JMS 140
  4         5543          RETURN=JMP I 143
  5         6400          WRITE=6400
  6         6101          WEXR=6101
  7         6201          WFWR=6201
  8         7360          DELAY=7360
  9                       /
 10         5000          *5000
 11  5000   7301   DATGET, CLL CLA IAC
 12  5001   1057          TAD 57          / POWER WORD
 13  5002   7450          SNA             / ALL POWER ON ?
 14  5003   5217          JMP D2          / YES
 15  5004   7340          CLL CLA CMA     / NO, 7777
 16  5005   6101          WEXR
 17  5006   6201          WFWR            / ALL POWER ON
 18  5007   3057          DCA 57          / NEW POWER WORD
 19  5010   1242          TAD NUM         / WAIT 4 SEC. FOR TRANSIENT
 20  5011   3130          DCA 130
 21  5012   4140          CALL
 22  5013   7360          DELAY
 23  5014   2130          ISZ 130
 24  5015   5212          JMP .-3
 25  5016   3033          DCA 33          / CLEAR DATAGET STOPWATCH
 26  5017   1223   D2,    TAD PADD        / DATA CODE LIST START ADDRESS
 27  5020   4140          CALL
 28  5021   6400          WRITE           / DATA ONTO RECORDER
 29  5022   5543          RETURN
 30  5023   5024   PADD,  PAR
 31  5024   5003   PAR,   5003            / FORMAT CODE 3
 32  5025   3000          3000            / COMPOSITE TIME
 33  5026   0003          0003            / PRESSURE
 34  5027   0001          1               / VX
 35  5030   0002          2               / VY
 36  5031   0010          10              / CONDUCTIVITY
 37  5032   0007          7               / TEMPERATURE
 38  5033   0011          11              / AX
 39  5034   0012          12              / AY
 40  5035   0013          13              / AZ
 41  5036   0004          4               / MX
 42  5037   0005          5               / MY
 43  5040   0006          6               / MZ
 44  5041   7777          7777            / TERMINATOR
 45  5042   7730   NUM,   -50
```

END OF PASS 2

0 ERRORS DETECTED
1SYMBOL TABLE

DATGET            PCM BETA PROGRAMS, 7/78.

```
CALL   4140   DATGET 5000   DELAY  7360   D2    5017   NUM   5042   PADD  5023   PAR   5024   RETURN 5543
WEXR   6101   WFWR   6201   WRITE  6400
```

\*\*\*\*\*\*\*\* END OF MEMBER DATGET      59 RECORDS \*\*\*\*\*\*\*\*

DELAY             PCM BETA PROGRAMS, 7/78.

1BEGIN PASS 1

END OF PASS 1
1BEGIN PASS 2

```
  1                       / ROUTINE TO DELAY EITHER .01 OR .02 OR .1 SECONDS.
  2                       /
  3         0121          LOOP=121
  4         4140          CALL=JMS 140
  5         5543          RETURN=JMP I 143
  6         7360          *7360
  7  7360   7300   DELAY,  CLA CLL        / HERE FOR .1 SEC. DELAY
  8  7361   1371          TAD P84SEC
  9  7362   1372   DELAY2, TAD P11SEC     / HERE FOR .02 SEC DELAY
 10  7363   1373   DELAY3, TAD P05SEC     / HERE FOR .01 SEC DELAY
 11  7364   3121          DCA LOOP        /
 12  7365   2121          ISZ LOOP
 13  7366   5365          JMP .-1
 14  7367   7100          CLL
 15  7370   5543          RETURN
 16  7371   5100   P84SEC, -2700
 17  7372   7550   P11SEC, -0230
 18  7373   7550   P05SEC, -0230
```

END OF PASS 2

0 ERRORS DETECTED
1SYMBOL TABLE

```
CALL   4140   DELAY  7360   DELAY2 7362   DELAY3 7363   LOOP  0121   P05SEC 7373   P11SEC 7372   P84SEC 7371
RETURN 5543
```

\*\*\*\*\*\*\*\* END OF MEMBER DELAY      32 RECORDS \*\*\*\*\*\*\*\*

```
DPDIV                   PCM BETA PROGRAMS, 7/78.                              DAY=221  19:00  08/09/78  PAGE 14

1BEGIN PASS 1                                                                                    0000000
                                                                                                 0000000
                                                                                                 0000000
END OF PASS 1                                                                                    0000000
1BEGIN PASS 2                                                                                    0000000
                                                                                                 0000000
      1                  /   UNSIGNED DOUBLE PRECISION DIVIDE.                                   0000000
      2                  /       DIVISOR IN ACC.                                                 0000000
      3                  /       DIVIDEND IN 132, 133                                            0000000
      4                  /       QUOTIENT LEFT IN 124, 125                                       0000000
      5                  / -     REMAINDER LEFT IN 132.                                          0000000
      6                  /                                                                       0000000
      7          4140    CALL=JMS 140                                                            0000000
      8          5543    RETURN=JMP I 143                                                        0000000
      9          7200    BDIVID=7200                                                             0000000
     10          7300    *7300                                                                   0000000
     11  7300    7100    DPDIV,    CLL              / FLAG TO BDIVID FOR HIGH ORDER QUOT.        0000000
     12  7301    4140              CALL                                                          0000000
     13  7302    7200              BDIVID                                                        0000000
     14  7303    1130              TAD 130                                                       0000000
     15  7304    3124              DCA 124          / LH QUOTIENT                                0000000
     16  7305    1135              TAD 135          / RESTORE DIVISOR                            0000000
     17  7306    4140              CALL                                                          0000000
     18  7307    7200              BDIVID                                                        0000000
     19  7310    1130              TAD 130                                                       0000000
     20  7311    3125              DCA 125          / RH QUOTIENT                                0000000
     21  7312    5543              RETURN                                                        0000000
                                                                                                 0000000
END OF PASS 2                                                                                    0000000
                                                                                                 0000000
    0 ERRORS DETECTED                                                                            0000000
1SYMBOL TABLE                                                                                    0000000
                                                                                                 0000000
    BDIVID 7200    CALL  4140    DPDIV 7300    RETURN 5543                                       0000000

******** END OF MEMBER DPDIV        34 RECORDS ********

DUMBACKG                PCM BETA PROGRAMS, 7/78.                              DAY=221  19:00  08/09/78  PAGE 15

1BEGIN PASS 1

END OF PASS 1
1BEGIN PASS 2

1                  /   DUMMY BACKGROUND ROUTINE FOR TEST.
      2                  /
      3          4140    CALL=JMS 140
      4          6200    TESTRC=6200
      5          2540    *2540
      6  2540    7301    BACKST,   CLA CLL IAC
      7  2541    1177              TAD 177          / MODE
      8  2542    7440              SZA              / RECORDER TEST?
      9  2543    5340              JMP BACKST       / NO
     10  2544    7000              NOP
     11  2545    7000              NOP
     12  2546    3177              DCA 177          / CLEAR FLAG
     13  2547    1153              TAD 153          / COUNTER OF FRAMES ON TAPE
     14  2550    4140              CALL
     15  2551    6200              TESTRC           / RECORDER TEST PROGRAM
     16  2552    5340              JMP BACKST
     17  2553    2540    BA,       BACKST

END OF PASS 2

0 ERRORS DETECTED
1SYMBOL TABLE

BA     2553    BACKST 2540    CALL  4140    TESTRC 6200

******** END OF MEMBER DUMBACKG     30 RECORDS ********

EDGET                   PCM BETA PROGRAMS, 7/78.                              DAY=221  19:00  08/09/78  PAGE 16

1BEGIN PASS 1

END OF PASS 1
1BEGIN PASS 2

1                  /   ROUTINE TO COMPUTE ENCODER DESTINATION, GIVEN DESIRED
      2                  /       SIGNED DELTA BUOYANCY (IN ENCODER UNITS, I.E. CC.)
      3                  /       IN ACCUMULATOR.
      4                  /   NOTE:  DESIRED DELTA B IS RAISED TO + OR - 20 IF ITS
      5                  /       ABVAL IS LESS THAN 20.
      6                  /   ACHIEVABLE SIGNED DELTA B IS LEFT IN 166.
      7                  /   ENCODER DESTINATION IS LEFT IN 156 AND ACC.
      8                  /
      9          7362    DELAY2=7362
     10          6140    ENCGET=6140
     11          4140    CALL=JMS 140
     12          5543    RETURN=JMP I 143
     13          5600    *5600
     14  5600    3166    EDGET,    DCA 166
     15  5601    7100              CLL
     16  5602    1166              TAD 166          / DELTA B
     17  5603    7510              SPA
     18  5604    5235              JMP DBNEG        / HERE IF DELTA B > 0
     19  5605    1270              TAD DELBMN       / IF DELTA B < 20, DELTA B = 20
```

```
20  5606 7430          SZL              / < 20 ?
21  5607 5213          JMP EDX          / NO
22  5610 7200          CLA              / YES
23  5611 1271          TAD DELBM
24  5612 3166          DCA 166          / NEW DELTA B
25  5613 4140  EDX,    CALL
26  5614 6140          ENCGET           / GET ENCODER INTO 117 AND ACC.
27  5615 1166          TAD 166          / DELTA B (>0)
28  5616 3156          DCA 156          / SAVE TENTATIVE E. D.
29  5617 1156          TAD 156
30  5620 7430          SZL              / OVERFLOW 7777 ?
31  5621 5225          JMP TFIX         / YES
32  5622 1274          TAD ENCTN        / NO.
33  5623 7420          SNL              / OVERFLOW TOP LIMIT?
34  5624 5265          JMP XEND         / NO
35  5625 7200  TFIX,   CLA              / YES
36  5626 1272          TAD ENCTOP
37  5627 3156          DCA 156          / ENCODER DESTINATION
38  5630 1117          TAD 117          / ENCODER NOW
39  5631 7041          CIA
40  5632 1272          TAD ENCTOP
41  5633 3166          DCA 166          / DELTA B ACHIEVABLE
42  5634 5265          JMP XEND
43  5635 1271  DBNEG,  TAD DELBM        / HERE IF DELTA B <= 0
44                                  /   IF DELTA B > -20, DELTA B = -20
45  5636 7420          SNL              / > -20 ?
46  5637 5243          JMP EDY          / NO
47  5640 7200          CLA              / YES
48  5641 1270          TAD DELBMN
49  5642 3166          DCA 166          / NEW DELTA B
50  5643 7300  EDY,    CLA CLL
51  5644 1117          TAD 117          / ENCODER NOW
```

EDGET              PCM BETA PROGRAMS, 7/78.                                          DAY=221  19:00  08/09/78  PAGE 17

```
52  5645 1166          TAD 166          / DELTA B (<0)
53  5646 3156          DCA 156
54  5647 1156          TAD 156          / SAVE TENTATIVE E.D.
55  5650 7420          SNL              / UNDERFLOW 0000 ?
56  5651 5256          JMP BFIX         / YES
57  5652 7100          CLL              / NO
58  5653 1275          TAD ENCBN
59  5654 7430          SZL              / UNDER BOTTOM LIMIT ?
60  5655 5265          JMP XEND         / NO
61  5656 7200  BFIX,   CLA              / YES
62  5657 1273          TAD ENCBOT
63  5660 3156          DCA 156          / E.D.
64  5661 1117          TAD 117          / ENCODER NOW
65  5662 7041          CIA
66  5663 1273          TAD ENCBOT
67  5664 3166          DCA 166          / DELTA B ACHIEVABLE
68  5665 7200  XEND,   CLA
69  5666 1156          TAD 156          / E.D.
70  5667 5543          RETURN
71  5670 7754  DELBMN, -24              / 20 CC, MINIMUM DELTA B
72  5671 0024  DELBM,  24
73  5672 7315  ENCTOP, 7315
74  5673 0450  ENCBOT, 0450
75  5674 0463  ENCTN,  -7315
76  5675 7330  ENCBN,  -0450
```

END OF PASS 2

0 ERRORS DETECTED
1SYMBOL TABLE

| | | | | | | | |
|---|---|---|---|---|---|---|---|
| BFIX 5656 | CALL 4140 | DBNEG 5635 | DELAY2 7362 | DELBM 5671 | DELBMN 5670 | EDGET 5600 | EDX 5613 |
| EDY 5643 | ENCBN 5675 | ENCBOT 5673 | ENCGET 6140 | ENCTN 5674 | ENCTOP 5672 | RETURN 5543 | TFIX 5625 |
| XEND 5665 | | | | | | | |

****** END OF MEMBER EDGET        91 RECORDS ******

ENCGET              PCM BETA PROGRAMS, 7/78.                                          DAY=221  19:00  08/09/78  PAGE 18

1BEGIN PASS 1

END OF PASS 1
1BEGIN PASS 2

```
 1             / GET BINARY ENCODER POSITION INTO 117 AND ACC.
 2             /
 3       5543          RETURN=JMP I 143
 4       6310          RDENC=6310
 5       3500          GRAYBI=3500
 6       4140          CALL=JMS 140
 7       6140          *6140
 8  6140 7300  ENCGET, CLL CLA
 9  6141 6310          RDENC
10  6142 4140          CALL
11  6143 3500          GRAYBI           / GRAY CODE TRANSLATOR
12  6144 1354          TAD M77          / TEST FOR ENCODER GLITCH---
13  6145 7450          SNA              / ENCODER = 77 OCTAL ?
14  6146 5351          JMP E2           / YES, USE OLD ENC. VALUE INSTEAD
15  6147 1355          TAD K77          / NO, RESTORE.
16  6150 3117          DCA 117
17  6151 1117  E2,     TAD 117
18  6152 7100          CLL
19  6153 5543          RETURN
20  6154 7701  M77,    -77
21  6155 0077  K77,    77
```

END OF PASS 2
0 ERRORS DETECTED
1SYMBOL TABLE

| | | | | | | |
|---|---|---|---|---|---|---|
| CALL 4140 | ENCGET 6140 | E2 6151 | GRAYBI 3500 | K77 6155 | M77 6154 | RDENC 6310 | RETURN 5543 |

****** END OF MEMBER ENCGET        34 RECORDS ******

ENDLYR                PCM BETA PROGRAMS, 7/78.                                    DAY=221  19:00  08/09/78  PAGE 19
1BEGIN PASS 1

END OF PASS 1
1BEGIN PASS 2

```
     1                  / ROUTINE TO SENSE END OF SAMPLING ZONE DURING ASCENT.
     2                  /
     3        5543      RETURN=JMP I 143
     4        4140      CALL=JMS 140
     5        4500      TPGET=4500
     6        5114      INITA2=5114
     7        6200      TAVE64=6200
     8        4700      *4700
     9 4700   7200      ENDLYR,  CLA
    10 4701   1077               TAD 77
    11 4702   7500               SMA          / SPECIAL INIT(ASCENT) RUN?
    12 4703   5311               JMP ENDN     / NO
    13 4704   2077               ISZ 77       / YES, GO TO INITA SECOND ENTRY POINT IF DONE
    14 4705   5543               RETURN
    15 4706   4140               CALL
    16 4707   5114               INITA2
    17 4710   5543               RETURN
    18 4711   7340      ENDN,    CLL CLA CMA  / -1
    19 4712   1177               TAD 177      / MODE ID
    20 4713   7440               SZA          / ASCENT ?
    21 4714   5543               RETURN       / NO
    22 4715   4140               CALL         / YES
    23 4716   6200               TAVE64       / PRESSURE INTO 136 AND ACC. (64 POINT AVERAGE)
    24 4717   7041               CIA
    25 4720   1561               TAD I 161    / PRESSURE OF TOP OF LAYER
    26 4721   7420               SNL          / P < P LAYER TOP?
    27 4722   5543      ENDER,   RETURN       / NO
    28 4723   2160      ENDLR2,  ISZ 160      / YES, INCREMENT LAYER PARAMETER
    29 4724   2170               ISZ 170      /      ADDRESSES
    30 4725   2164               ISZ 164
    31 4726   2161               ISZ 161
    32 4727   2171               ISZ 171
    33 4730   5543               RETURN
```

END OF PASS 2

0 ERRORS DETECTED
1SYMBOL TABLE

CALL   4140    ENDER  4722    ENDLR2 4723    ENDLYR 4700    ENDN   4711    INITA2 5114    RETURN 5543    TAVE64 6200
TPGET  4500

****** END OF MEMBER ENDLYR        47 RECORDS ******

ENDMA                 PCM BETA PROGRAMS, 7/78.                                    DAY=221  19:00  08/09/78  PAGE 20
1BEGIN PASS 1

END OF PASS 1
1BEGIN PASS 2

```
     1                  /    TEST FOR END OF ASCENT.
     2                  /
     3        4140      CALL=JMS 140
     4        5543      RETURN=JMP I 143
     5        2510      MOON=2510
     6        5200      INITD=5200
     7        4734      INITR2=4734
     8        0021      T1=21
     9                  /
    10        6000      *6000
    11 6000   7300      ENDMA,   CLL CLA
    12 6001   1136               TAD 136      / PRESSURE
    13 6002   7041               CIA
    14 6003   1562               TAD I 162    / PRESSURE TO TERMINATE ASCENT
    15 6004   7430               SZL          / P < LIMIT?
    16 6005   5215               JMP EXA      / YES, BEGIN DESCENT
    17 6006   5543               RETURN       / NO.  DON'T USE TIME TO END ASCENT.
    18 6007   7300      ENDMA2,  CLL CLA      / FORMERLY HERE FROM MASTER WHEN IN WAIT MODE.
    19 6010   1021               TAD T1
    20 6011   7041               CIA
    21 6012   1024               TAD 24       / MODE END TIME
    22 6013   7440               SZA          / T1 = M.E.T. ?
    23 6014   5543               RETURN       / NO
    24 6015   7301      EXA,     CLL CLA IAC
    25 6016   3107               DCA 107      / SET DELTA B DAMPING FLAG TO CRIPPLE BUOYC
    26 6017   1055               TAD 55       / PURGE FLAG
    27 6020   7450               SNA          / SET?
    28 6021   5231               JMP EXB      / NO
    29 6022   7300               CLA CLL      / YES
    30 6023   3055               DCA 55       / CLEAR PURGE FLAG
    31 6024   1240               TAD ENCLIM
    32 6025   3156               DCA 156      / ENCODER DEST. = UPPER LIMIT
    33 6026   7325               CLL CLA CML IAC RAL  / 3
    34 6027   4140               CALL
    35 6030   2510               MOON         / MOTOR UP
    36 6031   2106      EXB,     ISZ 106      / ENDMODE COUNTER, TO ALLOW DELAY AFTER UPLIM
    37 6032   5543               RETURN
    38 6033   2006               ISZ 6        / HERE AFTER DELAY-- INCREMENT UPLIM COUNTER
    39 6034   7000               NOP
    40 6035   4140               CALL         /
    41 6036   5200               INITD
    42 6037   5543               RETURN
    43 6040   7315      ENCLIM,  7315
```

END OF PASS 2

0 ERRORS DETECTED
1SYMBOL TABLE

CALL   4140    ENCLIM 6040    ENDMA  6000    ENDMA2 6007    EXA    6015    EXB    6031    INITD  5200    INITR2 4734
MOON   2510    RETURN 5543    T1     0021
****** END OF MEMBER ENDMA         57 RECORDS ******

ENDMD          PCM BETA PROGRAMS, 7/78.                                  DAY=221 19:00 08/09/78 PAGE 21

1BEGIN PASS 1

END OF PASS 1
1BEGIN PASS 2

```
   1                    / TEST FOR END OF DESCENT.
   2                    /
   3           4140     CALL=JMS 140
   4           5543     RETURN=JMP I 143
   5           5300     INITR=5300
   6           0021     T1=21
   7           5050     INITA=5050
   8           6041     *6041
   9                    /ENDMD,   CLL CLA        / DON'T USE TIME TO END DESCENT
  10                    /         TAD T1
  11                    /         CIA
  12                    /         TAD 25         / ASCENT START TIME
  13                    /         SZA            / T1 = A.S.T. ?
  14                    /         JMP EXD        / NO
  15                    /         CALL           / YES
  16                    /         INITA
  17                    /         RETURN
  18  6041  7300   EXD,          CLA CLL
  19  6042  1136                 TAD 136         / PRESSURE
  20  6043  7041                 CIA
  21  6044  1670                 TAD I TERMD     / P LIMIT
  22  6045  7430                 SZL             / PRESS. > PRESS. LIMIT ?
  23  6046  5543                 RETURN          / NO
  24  6047  7301                 CLL CLA IAC     / YES, 1
  25  6050  3107                 DCA 107         / SET DELTA B DAMPING FLAG TO CRIPPLE BUOYC
  26  6051  2106                 ISZ 106         /   ENDMODE COUNTER, FOR DELAY.
  27  6052  5543                 RETURN
  28  6053  2007                 ISZ 7           / LOWLIM COUNTER
  29  6054  7000                 NOP
  30  6055  7300                 CLL CLA
  31  6056  1055                 TAD 55          / PURGE FLAG
  32  6057  7450                 SNA             / SET?
  33  6060  5265                 JMP EZ          / NO
  34  6061  7300                 CLL CLA         / YES
  35  6062  1021                 TAD T1
  36  6063  1271                 TAD M45         / 45 MINUTES
  37  6064  3025                 DCA 25          / NEW ASCENT START TIME
  38  6065  4140   EZ,           CALL            /
  39  6066  5300                 INITR
  40  6067  5543                 RETURN
  41  6070  3350   TERMD,        3350            / ADDRESS OF PRESSURE FOR TERMINATION
  42  6071  0102   M45,          102
  43                                             /      OF DESCENT.
```

END OF PASS 2

0 ERRORS DETECTED
1SYMBOL TABLE

CALL  4140    EXD  6041    EZ  6065    INITA 5050    INITR 5300    M45  6071    RETURN 5543    TERMD 6070
T1    0021
***** END OF MEMBER ENDMD      57 RECORDS *****

ENDMR          PCM BETA PROGRAMS, 7/78.                                  DAY=221 19:00 08/09/78 PAGE 22

1BEGIN PASS 1

END OF PASS 1
1BEGIN PASS 2

```
   1                    / ROUTINE TO TEST FOR END OF REST.
   2           4140     CALL=JMS 140
   3           5543     RETURN=JMP I 143
   4           5050     INITA=5050
   5           0021     T1=21
   6           6100     *6100
   7  6100  7300  ENDMR,   CLL CLA
   8  6101  1021           TAD T1
   9  6102  7041           CIA
  10  6103  1025           TAD 25         / ASCENT START TIME
  11  6104  7440           SZA            / T1 = A.S.T. ?
  12  6105  5543           RETURN         / NO
  13  6106  4140           CALL           / YES
  14  6107  5050           INITA
  15  6110  5543           RETURN
```

END OF PASS 2

0 ERRORS DETECTED
1SYMBOL TABLE

CALL  4140    ENDMR 6100    INITA 5050    RETURN 5543    T1    0021

***** END OF MEMBER ENDMR      28 RECORDS *****

ENDMR2          PCM BETA PROGRAMS, 7/78.

1BEGIN PASS 1

END OF PASS 1
1BEGIN PASS 2

```
    1                       /  ROUTINE TO TEST FOR END OF REST.
    2          4140         CALL=JMS 140
    3          5543         RETURN=JMP I 143
    4          5200         INITD=5200
    5          0021         T1=21
    6          6120         *6120
    7   6120   7300         ENDMR,   CLL CLA
    8   6121   1021                  TAD T1
    9   6122   7041                  CIA
   10   6123   1026                  TAD 26      / DESCENT START TIME
   11   6124   7440                  SZA         / T1 = D.S.T. ?
   12   6125   5543                  RETURN      / NO
   13   6126   4140                  CALL        / YES
   14   6127   5200                  INITD
   15   6130   5543                  RETURN
```

END OF PASS 2

0 ERRORS DETECTED
1SYMBOL TABLE

CALL    4140    ENDMR  6120    INITD  5200    RETURN 5543    T1    0021

****** END OF MEMBER ENDMR2       28 RECORDS ******

GRAYBI          PCM BETA PROGRAMS, 7/78.

1BEGIN PASS 1

END OF PASS 1
1BEGIN PASS 2

```
    1                       /  GRAY CODE TO BINARY CONVERTER.
    2                       /
    3          5543         RETURN=JMP I 143
    4          0060         *60
    5   0060   0000         GRBCNT,  0
    6          3500         *3500
    7   3500   7421         GRAYBI,  MQL         / SAVE INPUT
    8   3501   1316                  TAD NEG13   / SET UP LOOP COUNTER
    9   3502   3060                  DCA GRBCNT
   10   3503   7501                  MQA         / RECOVER INPUT
   11   3504   7040                  CMA         / COMPLEMENT, SINCE ENCODER
   12   3505   7004         GRLOOP,  RAL         / ROTATE
   13   3506   2060                  ISZ GRBCNT  / DONE?
   14   3507   5311                  JMP GRTEST  / NO
   15   3510   5543                  RETURN      / YES
   16   3511   7420         GRTEST,  SNL         / L = 0 ?
   17   3512   5305                  JMP GRLOOP  / YES, JUST ROTATE
   18   3513   7004                  RAL         / NO, ROTATE AND INVERT
   19   3514   7020                  CML
   20   3515   5306                  JMP GRLOOP+1    / CONTINUE
   21   3516   7763         NEG13,   -15
```

END OF PASS 2

0 ERRORS DETECTED
1SYMBOL TABLE

GRAYBI 3500    GRBCNT 0060    GRLOOP 3505    GRTEST 3511    NEG13  3516    RETURN 5543

****** END OF MEMBER GRAYBI       34 RECORDS ******

INITA           PCM BETA PROGRAMS, 7/78.

1BEGIN PASS 1

END OF PASS 1
1BEGIN PASS 2

```
    1                       /  ROUTINE TO START ASCENT.
    2                       /
    3          4140         CALL=JMS 140
    4          5543         RETURN=JMP I 143
    5          6101         WEXR=6101
    6          6201         WPWR=6201
    7          6301         INPUT=6301
    8          3400         ATOD=3400
    9          6311         WMOTOR=6311
   10          4500         TPGET=4500
   11          7360         DELAY=7360
   12          6400         WRITE=6400
   13          2510         MOON=2510
   14          6200         TAVE64=6200
   15                       /
   16          5050         *5050
   17   5050   7201         INITA,   CLA IAC
   18   5051   3177                  DCA 177     / MODE ID = 1
   19                       /        TAD ALLON
   20                       /        WEXR
   21                       /        WPWR        / POWER ON
```

```
22              /          DCA 57       / SAVE POWER CONTROL WORD
23  5052 7000              NOP
24  5053 7000              NOP
25  5054 7000              NOP
26  5055 7000              NOP
27  5056 7300              CLL CLA
28  5057 1333              TAD FLAG77   / -60 DECIMAL
29  5060 3077              DCA 77       / SET FLAG AS COUNTER
30  5061 7000              NOP
31  5062 7000              NOP
32  5063 7000              NOP
33  5064 1363              TAD M164     / -164 DECIMAL
34  5065 7000              NOP
35  5066 3106              DCA 106      / ENDMODE COUNTER
36  5067 1362              TAD ENDAA    / ENDMODE(ASCENT) ADDRESS
37  5070 3067              DCA 67
38  5071 1021              TAD 21       / PRESENT TIME (40.96 SEC. UNITS)
39  5072 1173              TAD 173      / FULL CYCLE TIME   (  "  )
40  5073 3025              DCA 25       / SAVE TIME OF NEXT ASCENT
41  5074 1174              TAD 174      / DESCENT MINIMUM TIME
42  5075 7141              CLL CIA
43  5076 1025              TAD 25
44  5077 3024              DCA 24       / ASCENT END TIME
45  5100 1334              TAD SPL
46  5101 3171              DCA 171      / ADDRESS OF SAMPLING PERIOD
47  5102 1335              TAD ZDL1
48  5103 3160              DCA 160      / ADDRESS OF Z DOT UPPER LIMIT
49  5104 1336              TAD ZDL2
50  5105 3170              DCA 170      / ADDRESS OF Z DOT LOWER LIMIT
51  5106 1341              TAD ZDP
```

INITA           PCM BETA PROGRAMS, 7/78.                                     DAY=221 19:00 08/09/78  PAGE 26

```
52  5107 3164              DCA 164      / ADDRESS OF Z DOT OPTIMUM
53  5110 1337              TAD PL
54  5111 3161              DCA 161      / ADDRESS OF PRESSURE OF TOP OF LAYER
55  5112 3033              DCA 33       / ZERO DATAGET STOPWATCH
56  5113 5543              RETURN       / DON'T RETURN IN TEST RUN
57  5114 7201   INITA2,    CLA IAC      / ENTRY POINT FROM ENDLAYER (BUT NOT IN FIRST RUNS)
58                                      /     HERE AFTER BOTTOM DATA GOTTEN.
59  5115 3077              DCA 77       / SET LAUNCH FLAG
60  5116 1343              TAD MMADD    / DATA CODE LIST ADDRESS
61  5117 4140              CALL
62  5120 6400              WRITE        / MAINTANANCE MONITOR DATA ONTO TAPE
63  5121 4140              CALL
64  5122 6200              TAVE64       / PRESSURE INTO 136 AND ACC. (64 POINT AVERAGE)
65  5123 3076              DCA 76       / SAVE LAUNCH PRESSURE
66  5124 1340              TAD MOTUP
67  5125 4140              CALL
68  5126 2510              MOON         / MOTOR UP
69  5127 1342              TAD ENCLIM
70  5130 3156              DCA 156      / ENCODER DEST. = TOP LIMIT, FOR SAFETY
71  5131 5543              RETURN
72  5132 7777   ALLON,     7777         / ALL POWER ON.
73  5133 7704   FLAG77,    -74
74  5134 3230   SPL,       3230         / ADDRESS OF SAMPLING PERIOD
75  5135 3260   ZDL1,      3260         / ADD. OF Z DOT UPPER LIMIT
76  5136 3310   ZDL2,      3310         / ADD. OF Z DOT LOWER LIMIT
77  5137 3200   PL,        3200         / ADD. OF P TOP OF LAYER
78  5140 0003   MOTUP,     0003         / MOTOR UP BITS
79  5141 3450   ZDP,       3450         / ADD. OF Z DOT OPTIMUM
80  5142 7315   ENCLIM,    7315         / ENCODER LIMIT, MAX. BUOYANCY
81  5143 5144   MMADD,     MMD
82  5144 5004   MMD,       5004         / FORMAT CODE 4
83  5145 0022              0022         / V REF
84  5146 0600              0600         / +18 B
85  5147 0200              0200         / -18 B
86  5150 0400              0400         / +12 B
87  5151 0700              0700         / +7 B
88  5152 0300              0300         / -7 B
89  5153 0022              0022         / (DITTO---)
90  5154 0600              0600
91  5155 0200              0200
92  5156 0400              0400
93  5157 0700              0700
94  5160 0300              0300
95  5161 7777              7777         / TERMINATOR
96  5162 6000   ENDAA,     6000         / ENDMODE(ASCENT) ADDRESS
97  5163 7552   M164,      -226         / -164 DECIMAL
```

END OF PASS 2

0 ERRORS DETECTED
1SYMBOL TABLE

```
ALLON  5132    ATOD   3400    CALL   4140    DELAY  7360    ENCLIM 5142    ENDAA  5162    FLAG77 5133    INITA  5050
INITA2 5114    INPUT  6301    MMADD  5143    MMD    5144    MOON   2510    MOTUP  5140    M164   5163    PL     5137
RETURN 5543    SPL    5134    TAVE64 6200    TPGET  4500    WEXR   6101    WMOTOR 6311    WPWR   6201    WRITE  6400
ZDL1   5135    ZDL2   5136    ZDP    5141
```

****** END OF MEMBER INITA    113 RECORDS ******

INITD          PCM BETA PROGRAMS, 7/78.                                                                DAY=221  19:00  08/09/78  PAGE 27

1BEGIN PASS 1

END OF PASS 1
1BEGIN PASS 2

```
    1                       / START DESCENT MODE.
    2                       /
    3         4140          CALL=JMS 140
    4         3700          VMAGET=3700
    5         6101          WEXR=6101
    6         6311          WMOTOR=6311
    7         6400          WRITE=6400
    8         7360          DELAY=7360
    9         5543          RETURN=JMP I 143
   10         4500          TPGET=4500
   11         6201          WPWR=6201
   12         2510          MOON=2510
   13         6200          TAVE64=6200
   14                       /
   15         5200          *5200
   16   5200  7305   INITD, CLA CLL IAC RAL
   17   5201  3177          DCA 177             / MODE ID = 2
   18   5202  1257          TAD M164            / -164 DECIMAL
   19   5203  7000          NOP
   20   5204  3106          DCA 106             / ENDMODE COUNTER
   21   5205  1260          TAD M30
   22   5206  3031          DCA 31              / FORMAT 3 FRAME COUNTER
   23   5207  1247          TAD ENDDA
   24   5210  3067          DCA 67              / ENDMODE(DESCENT) ADDRESS
   25   5211  7301          CLL CLA IAC
   26   5212  3077          DCA 77              / SET LAUNCH FLAG
   27   5213  7340          CLL CLA CMA         / -1
   28   5214  3040          DCA 40              / FORMAT 5 5-SECOND COUNTER
   29   5215  1250          TAD ZDLD1           / LOAD ADDRESSES OF Z DOT LIMITS--
   30   5216  3160          DCA 160             /    MAX.
   31   5217  1251          TAD ZDLD2
   32   5220  3170          DCA 170             /    MIN.
   33   5221  1252          TAD ZDDP
   34   5222  3164          DCA 164             / Z DOT OPTIMUM
   35   5223  1253          TAD FKZD1           / COMPUTE NEEDED Z DOT.  FOR PROTOTYPE
   36   5224  3650          DCA I ZDLD1         /    LET THIS BE DEGENERATE.
   37   5225  1254          TAD FKZD2
   38   5226  3651          DCA I ZDLD2
   39   5227  1255          TAD FKZDP           / Z DOT OPTIMUM
   40   5230  3652          DCA I ZDDP
   41   5231  4140          CALL
   42   5232  6200          TAVE64              / GET PRESSURE (64 POINT AVERAGE)
   43   5233  3076          DCA 76              / SAVE LAUNCH PRESSURE
   44   5234  1256          TAD MOTDN
   45   5235  4140          CALL
   46   5236  2510          MOON                / MOTOR DOWN
   47   5237  1246          TAD ENCLIM
   48   5240  3156          DCA 156             / ENCODER DEST. = BOTTOM LIMIT, FOR SAFETY
   49   5241  1261          TAD PPWR
   50   5242  6101          WEXR
   51   5243  6201          WPWR                / PRESSURE POWER ON
```

INITD          PCM BETA PROGRAMS, 7/78.                                                                DAY=221  19:00  08/09/78  PAGE 28

```
   52   5244  3057          DCA 57              / SAVE POWER WORD
   53   5245  5543          RETURN
   54   5246  0450   ENCLIM, 0450               / ENCODER LIMIT, MIN. BUOYANCY
   55   5247  6041   ENDDA,  6041               / ENDMODE(DESCENT) ADDRESS
   56   5250  0600   ZDLD1,  600                / Z DOT LIMIT ADDRESSES (RAM)
   57   5251  0601   ZDLD2,  601
   58   5252  0602   ZDDP,   602                / Z DOT OPTIMUM ADDRESS
   59   5253  2000   FKZD1,  2000               / Z DOT LIMITS, IN MM/SEC.
   60   5254  0062   FKZD2,  0062               /    FAST DESCENT OK
   61   5255  0144   FKZDP,  0144               / Z DOT DESIRED, 100 MM/SEC
   62   5256  0002   MOTDN,  0002               / MOTOR DOWN BIT
   63   5257  7552   M164,   -226
   64   5260  7742   M30,    -36
   65   5261  5001   PPWR,   5001
```

END OF PASS 2

0 ERRORS DETECTED
1SYMBOL TABLE

```
CALL    4140   DELAY  7360   ENCLIM 5246   ENDDA  5247   FKZDP  5255   FKZD1  5253   FKZD2  5254   INITD  5200
MOON    2510   MOTDN  5256   M164   5257   M30    5260   PPWR   5261   RETURN 5543   TAVE64 6200   TPGET  4500
VMAGET  3700   WEXR   6101   WMOTOR 6311   WPWR   6201   WRITE  6400   ZDDP   5252   ZDLD1  5250   ZDLD2  5251
```

****** END OF MEMBER INITD      80 RECORDS ******

INITIAL        PCM BETA PROGRAMS, 7/78.                                                                DAY=221  19:00  08/09/78  PAGE 29

1BEGIN PASS 1

END OF PASS 1
1BEGIN PASS 2

```
    1                       / ROUTINE TO INITIALIZE MICROPROCESSOR.
    2                       /
    3         4140          CALL=JMS 140
    4         6311          WMOTOR=6311
    5         6201          WPWR=6201
    6         6101          WEXR=6101
```

```
  7      6115           WCRB1=6115
  8      6105           WCRA1=6105
  9      6215           WCRB2=6215
 10      6205           WCRA2=6205
 11      6315           WCRB3=6315
 12      5300           INITR=5300
 13      6140           ENCGET=6140
 14      2510           MOON=2510
 15      6305           WCRA3=6305
 16      6114           WVR1=6114
 17      6214           WVR2=6214
 18      0140           CALLX=140
 19      0143           RETX=143
 20      0144           STACK=144
 21      6106           SXRDAT=6106
 22      6107           CXRDAT=6107
 23      6316           SXRPAR=6316
 24      6317           CXRPAR=6317
 25      7000           CALLY=7000
 26      7011           RETY=7011
 27      6110           RUART=6110
 28      7040           UCALY=7040
 29      0100           UCALX=100
 30      7051           URETY=7051
 31      0103           URETX=103
 32      0104           USTACK=104
 33      6203           SKIPA2=6203
 34      6211           WDAC=6211
 35      6216           SMR=6216
 36      6217           CMR=6217
 37      3040           ATTN2=3040
 38      4734           INITR2=4734
 39      7776           *7776
 40 7776 7400           INIT
 41 7777 5776           JMP I .-1
 42      7400           *7400                 / PAGE 36 (OCTAL)
 43 7400 7300    INIT,  CLA CLL
 44 7401 7001           IAC                   / DELAY TO ALLOW POWER UP ---
 45 7402 7440           SZA
 46 7403 5201           JMP .-2
 47 7404 1335           TAD K1                / LOAD PIE CONTROL REGISTERS--
 48 7405 6115           WCRB1
 49 7406 7300           CLA CLL
 50 7407 1336           TAD K2
 51 7410 6105           WCRA1
```

INITIAL                 PCM BETA PROGRAMS, 7/78.                                              DAY=221 19:00 08/09/78  PAGE 30

```
 52 7411 7200    IX,    CLA
 53 7412 1341           TAD K4
 54 7413 6205           WCRA2
 55 7414 7200           CLA
 56 7415 1342           TAD K5
 57 7416 6315           WCRB3
 58 7417 7200           CLA
 59 7420 1343           TAD K6
 60 7421 6305           WCRA3
 61 7422 7200           CLA
 62 7423 1344           TAD K7                / LOAD RUPT VECTOR ADDRESSES
 63 7424 6114           WVR1
 64 7425 7200           CLA
 65 7426 1345           TAD K8
 66 7427 6214           WVR2
 67 7430 7300           CLL CLA
 68 7431 1346           TAD C1                / UART BUFFER WRITE POINTER
 69 7432 3146           DCA 146
 70 7433 3041           DCA 41                / PAPER TAPE FLAG OFF
 71 7434 3043           DCA 43                / MEMORY DUMP FLAG OFF
 72 7435 3044           DCA 44                / LEADER-TRAILER FLAG = 0
 73 7436 3045           DCA 45                / PAPER TAPE BYTE FLAG = 0
 74 7437 3046           DCA 46                / TIMER MONITOR FLAG = 0
 75 7440 3150           DCA 0150              / CLEAR UART ARGUMENT REGISTERS--
 76 7441 3151           DCA 0151
 77 7442 7001           IAC
 78 7443 3042           DCA 42                / TBRE FLAG = 1 (I.E. TBRE OFF)
 79 7444 7100           CLL
 80 7445 6101           WEXR
 81 7446 6311           WMOTOR                / MOTOR OFF, DETENT OFF
 82 7447 3167           DCA 167               / MOTOR FLAG = 0
 83 7450 7200           CLA
 84 7451 6101           WEXR
 85 7452 6201           WPWR                  / ALL POWER CONTROLS OFF
 86 7453 3057           DCA 57                / POWER WORD
 87 7454 5256           JMP PAST              / TAPE RECORDER INITIALIZATION--
 88 7455 0754    K,     0754                  / 37 DECIMAL CHARACTERS PER FRAME
 89 7456 7200    PAST,  CLA
 90 7457 1255           TAD K
 91 7460 6106           SXRDAT
 92 7461 6101    LOOP,  WEXR
 93 7462 7110           CLL RAR
 94 7463 7450           SNA
 95 7464 5270           JMP ENDINT
 96 7465 6316           SXRPAR
 97 7466 6317           CXRPAR
 98 7467 5261           JMP LOOP
 99 7470 6107    ENDINT, CXRDAT
100 7471 1347    INITS, TAD JUMPI             / SUBROUTINE OVERHEAD INITIALIZATION--
101 7472 3141           DCA CALLX+1
102 7473 1350           TAD KCALLY
103 7474 3142           DCA CALLX+2
104 7475 1351           TAD KRETY
105 7476 3143           DCA RETX
106 7477 1352           TAD BASE
107 7500 3144           DCA STACK
108 7501 1353    INITUS, TAD UJUMPI           / RUPT SUBROUTINE OVERHEAD INITIALIZE--
```

```
INITIAL              PCM BETA PROGRAMS, 7/78.

109  7502  3101              DCA UCALX+1
110  7503  1354              TAD UKCALY
111  7504  3102              DCA UCALX+2
112  7505  1355              TAD UKRETY
113  7506  3103              DCA URETX
114  7507  1356              TAD UBASE
115  7510  3104              DCA USTACK
116  7511  1357              TAD KRUPTA
117  7512  3032              DCA 32       / RUPT RETURN ADDRESS
118  7513  1360              TAD K5402    / JMP I 2
119  7514  3001              DCA 1
120  7515  1361              TAD K2150    / RECRPT ADDRESS
121  7516  3002              DCA 2
122  7517  1362              TAD K620     / RECORDER BUFFER ADDRESS
123  7520  3010              DCA 10
124  7521  3177              DCA 177      / MODE ID = 0 , IDLE
125  7522  1363              TAD K66
126  7523  3066              DCA 66       / "JMP I 67"
127  7524  3077              DCA 77       / CLEAR "LAUNCH" FLAG
128  7525  1364              TAD KZDTI
129  7526  3155              DCA 155      / Z DOT TIME INTERVAL
130  7527  7000              NOP
131  7530  7000              NOP
132  7531  7000              NOP
133  7532  7000              NOP
134  7533  5734              JMP I .+1    / GO TO NEXT PAGE
135  7534  7600              7600
136  7535  0300      K1,     0300         / CRB1
137  7536  0057      K2,     0057         / CRA1, TIME RUPT ENABLED
138  7537  1160      K3,     1160         / CRB2, ATTN2 LEV SENS +; ATTN1, PSTOP EDGE SENS +
139  7540  1120      K3B,    1120         /   ATTN2 LEVEL SENSITIVE -, "           "
140  7541  0245      K4,     0245         / CRA2, ATTN1 ENABLED, PSTOP ENABLED.
141  7542  7560      K5,     7560         / CRB3
142  7543  4240      K6,     4240         / CRA3, WITH ENCODER ON
143  7544  3360      K7,     3360         / VR1
144  7545  3364      K8,     3364         / VR2
145  7546  0200      C1,     0200
146  7547  5542      JUMPI,  JMP I CALLX+2   / SUBROUTINE INIT CONSTANTS
147  7550  7000      KCALLY, CALLY
148  7551  7011      KRETY,  RETY
149  7552  0720      BASE,   0720            / START ADDRESS OF STACK IN RAM
150  7553  5502      UJUMPI, JMP I UCALX+2   / RUPT SUBROUTINE CONSTANTS--
151  7554  7040      UKCALY, UCALY
152  7555  7051      UKRETY, URETY
153  7556  1000      UBASE,  1000            / START OF STACK IN RAM
154  7557  2156      KRUPTA, 2156            / RUPT RETURN ADDRESS
155  7560  5402      K5402,  5402
156  7561  2150      K2150,  2150
157  7562  0620      K620,   620
158  7563  5467      K66,    JMP I 67        / FOR PAGE 0
159  7564  5670      KZDTI,  5670            / Z DOT TIME INTERVAL, 30 SEC. IN .01 SEC.
160                                          /      UNITS.
161                        /
162                        /
163        7600      *7600
164  7600  1300              TAD PTLTA
165  7601  3162              DCA 162         / ADD. OF PRESSURE OF TOP LAYER TOP

INITIAL              PCM BETA PROGRAMS, 7/78.

166  7602  1301              TAD NRT
167  7603  3163              DCA 163         / NOMINAL REST TIME (40.96 SEC. UNITS)
168  7604  1302              TAD FCT
169  7605  3173              DCA 173         / FULL CYCLE TIME   (   "    )
170  7606  1303              TAD DMT
171  7607  3174              DCA 174         / DESCENT MIN. TIME (   "    )
172  7610  1304              TAD SYS1        / SYSOVR ADDRESSES FOR BRANCH (DUMMY)
173  7611  3071              DCA 71
174  7612  1305              TAD SYS2
175  7613  3072              DCA 72
176  7614  1306              TAD TWAIT
177  7615  3176              DCA 176         / WAIT TIME
178  7616  1307              TAD VMAG
179  7617  3126              DCA 126         / GUESS AT CURRENT MAGNITUDE
180  7620  1307              TAD VMAG
181  7621  3127              DCA 127
182  7622  1310              TAD SPADD
183  7623  3171              DCA 171         / ADD. OF SAMPLING PERIOD
184  7624  1311              TAD PL
185  7625  3161              DCA 161         / ADD. OF PRESSURE OF BOTTOM LAYER TOP
186  7626  1312              TAD SAFENC
187  7627  3117              DCA 117         / SAFE PAST ENCODER VALUE
188  7630  1313              TAD KDELB       / FIXED DELTA B AFTER LIFTOFF, IN CC.
189  7631  3037              DCA 37
190  7632  1314              TAD LFTBIT      / DELTA PRESSURE TO DEFINE LIFTOFF, NEGATIVE.
191  7633  3047              DCA 47
192  7634  6101              WEXR
193  7635  6211              WDAC            / CLEAR DAC
194  7636  6216              SMR
195  7637  6217              CMR             / RESET UART
196  7640  1315              TAD K3X
197  7641  6215              WCRB2
198  7642  6203              SKIPA2          / TEST IF ATTN2 HIGH
199  7643  5275              JMP XYZ         / NO, MAGNET IS ON
200  7644  7200              CLA             / YES, MAGNET IS OFF, RESPECIFY POLARITY
201  7645  1316              TAD K3BX
202  7646  6215              WCRB2
203  7647  2065              ISZ 65          / INCREMENT COUNTER OF RESETS
204  7650  7000              NOP
205  7651  7000              NOP
206  7652  7000              NOP
```

```
207  7653 6001              ION           / INTERRUPTS ENABLED
208  7654 4140              CALL
209  7655 3040              ATTN2         / RESTART MISSION
210  7656 3055              DCA 55        / CLEAR PURGE FLAG
211  7657 4140              CALL
212  7660 6140              ENCGET        / READ ENCODER
213  7661 1320              TAD NENCL     / NEGATIVE LOWER ENCODER LIMIT - 2
214  7662 7420              SNL           / ENCODER < LIMIT + 2 ?
215  7663 5272              JMP CIN       / YES
216  7664 7300              CLL CLA       / NO
217  7665 1317              TAD ENCL      / LOWER ENCODER LIMIT
218  7666 3156              DCA 156       / SAVE ENCODER DESTINATION
219  7667 7305              CLL CLA IAC RAL   / 2
220  7670 4140              CALL
221  7671 2510              MOON          / MOTOR DOWN
222  7672 4140    CIN,      CALL
```

INITIAL          PCM BETA PROGRAMS, 7/78.                          DAY=221 19:00 08/09/78    PAGE 33

```
223  7673 5300              INITR         / ENTER REST MODE, WHICH WILL WAIT FOR ASCENT.
224  7674 5276              JMP .+2
225  7675 6001    XYZ,      ION           / INTERRUPTS ENABLED.
226  7676 5677              JMP I .+1
227  7677 4000              4000          / GO TO BACKGROUND
228  7700 3201    PTLTA,    3201          / 1 + ADD. OF PRESSURE OF TOP LAYER TOP
229  7701 0002    NRT,      0002          / MINIMUM REST TIME (40.96 SEC. UNITS) + 1
230  7702 0130    FCT,      0130          / FULL CYCLE TIME     ( "  )
231  7703 0002    DMT,      0002          / DESCENT MINIMUM TIME ( "  )
232  7704 4246    SYS1,     4246          / BRANCH RETURN ADDRESS IN SYSOVR
233  7705 4251    SYS2,     4251          /           "
234  7706 0002    TWAIT,    0002          / WAIT TIME AFTER MAGNET OFF (40.96 SEC. UNITS)
235  7707 0100    VMAG,     0100          / INITIAL VALUE FOR CURRENT MAGNITUDE
236                                       /  (.33 CM/SEC PER BIT)
237  7710 3230    SPADD,    3230          / ADD. OF SAMPLING PERIOD
238  7711 3200    PL,       3200          / ADD. OF PRESSURE OF BOTTOM LAYER TOP
239  7712 4000    SAFENC,   4000
240  7713 0020    KDELB,    20
241  7714 7764    LFTBIT,   -14
242  7715 1160    K3X,      1160
243  7716 1120    K3BX,     1120
244  7717 0450    ENCL,     0450
245  7720 7326    NENCL,    -0452
246                         /
```

END OF PASS 2

0 ERRORS DETECTED
1SYMBOL TABLE

```
ATTN2  3040    BASE   7552    CALL   4140    CALLX  0140    CALLY  7000    CIN    7672    CMR    6217    CXRDAT 6107
CXRPAR 6317    C1     7546    DMT    7703    ENCGET 6140    ENCL   7717    ENDINT 7470    FCT    7702    INIT   7400
INITR  5300    INITR2 4734    INITS  7471    INITUS 7501    IX     7411    JUMPI  7547    K      7455    KCALLY 7550
KDELB  7713    KRETY  7551    KRUPTA 7557    KZDTI  7564    K1     7535    K2     7536    K2150  7561    K3     7537
K3B    7540    K3BX   7716    K3X    7715    K4     7541    K5     7542    K5402  7560    K6     7543    K620   7562
K66    7563    K7     7544    K8     7545    LFTBIT 7714    LOOP   7461    MOON   2510    NENCL  7720    NRT    7701
PAST   7456    PL     7711    PTLTA  7700    RETX   0143    RETY   7011    RUART  6110    SAFENC 7712    SKIPA2 6203
SMR    6216    SPADD  7710    STACK  0144    SXRDAT 6106    SXRPAR 6316    SYS1   7704    SYS2   7705    TWAIT  7706
UBASE  7556    UCALX  0100    UCALY  7040    UJUMPI 7553    UKCALY 7554    UKRETY 7555    URETX  0103    URETY  7051
USTACK 0104    VMAG   7707    WCRA1  6105    WCRA2  6205    WCRA3  6305    WCRB1  6115    WCRB2  6215    WCRB3  6315
WDAC   6211    WEXR   6101    WMOTOR 6311    WPWR   6201    WVR1   6114    WVR2   6214    XYZ    7675
```

****** END OF MEMBER INITIAL    269 RECORDS ******

INITR            PCM BETA PROGRAMS, 7/78.                          DAY=221 19:00 08/09/78    PAGE 34

1BEGIN PASS 1

END OF PASS 1
1BEGIN PASS 2

```
 1                       /  START REST MODE.
 2                       /
 3        5543           RETURN=JMP I 143
 4        6101           WEXR=6101
 5        6201           WPWR=6201
 6                       /
 7        5300           *5300
 8   5300 7325   INITR,  CLA CLL CML IAC RAL  / 3 INTO ACC.
 9   5301 3177           DCA 177              / MODE ID = 3
10   5302 1327           TAD ENDRA
11   5303 3067           DCA 67               / ADDRESS OF ENDMODE(REST)
12   5304 1330           TAD ZDLR1            / Z DOT MAX ADDRESS
13   5305 3160           DCA 160
14   5306 1331           TAD ZDLR2            / Z DOT MIN ADDRESS
15   5307 3170           DCA 170
16   5310 1332           TAD ZDPR             / Z DOT OPTIMUM ADDRESS
17   5311 3164           DCA 164
18   5312 6101           WEXR                 / ALL POWER OFF
19   5313 6201           WPWR
20   5314 3057           DCA 57               / SAVE NEW POWER WORD
21   5315 1025           TAD 25               / ASCENT START TIME
22   5316 7041           CIA
23   5317 1021           TAD 21               / TIME NOW
24   5320 7510           SPA                  / IS NOW < ASCENT START TIME ?
25   5321 5543           RETURN               / YES
26   5322 7300           CLL CLA              / NO, UPDATE A.S.T.
27   5323 1025           TAD 25
28   5324 1173           TAD 173              / FULL CYCLE TIME (1 HOUR)
29   5325 3025           DCA 25
30   5326 5543           RETURN
```

```
   31   5327  6100    ENDRA,   6100        / ADDRESS OF ENDMODE(REST)
   32   5330  3346    ZDLR1,   3346        / ADD. OF Z DOT MAX.
   33   5331  3347    ZDLR2,   3347        / ADD. OF Z DOT MIN.
   34   5332  3357    ZDPR,    3357        / ADD. OF Z DOT OPTIMUM
```

END OF PASS 2

0 ERRORS DETECTED
1SYMBOL TABLE

ENDRA  5327    INITR  5300    RETURN 5543    WEXR   6101    WPWR   6201    ZDLR1  5330    ZDLR2  5331    ZDPR   5332

****** END OF MEMBER INITR       47 RECORDS ******

INITR2            PCM BETA PROGRAMS, 7/78.                                                DAY=221  19:00  08/09/78  PAGE 35

1BEGIN PASS 1

END OF PASS 1
1BEGIN PASS 2

```
    1                /    START REST MODE.
    2                /
    3       5543     RETURN=JMP I 143
    4       2510     MOON=2510
    5       6101     WEXR=6101
    6       6201     WPWR=6201
    7       4140     CALL=JMS 140
    8                /
    9       4734     *4734
   10  4734  7327    INITR,   CLA CLL CML IAC RTL  / 6 INTO ACC.
   11  4735  3177             DCA 177              / MODE ID = 6
   12  4736  6101             WEXR
   13  4737  6201             WPWR                 / ALL POWER OFF
   14  4740  3057             DCA 57               / POWER WORD
   15  4741  1372             TAD ENDRA
   16  4742  3067             DCA 67               / ADDRESS OF ENDMODE(REST)
   17  4743  1373             TAD ZDLR1            / Z DOT MAX ADDRESS
   18  4744  3160             DCA 160
   19  4745  1374             TAD ZDLR2            / Z DOT MIN ADDRESS
   20  4746  3170             DCA 170
   21  4747  1375             TAD ZDPR             / Z DOT OPTIMUM ADDRESS
   22  4750  3164             DCA 164
   23  4751  1021             TAD 21               / TIME NOW
   24  4752  1163             TAD 163              / REST TIME
   25  4753  3026             DCA 26        / DESCENT START TIME.
   26  4754  1055             TAD 55        / PURGE FLAG
   27  4755  7450             SNA           / SET ?
   28  4756  5543             RETURN        / NO
   29  4757  7300             CLA CLL       / YES
   30  4760  3055             DCA 55        / CLEAR PURGE FLAG
   31  4761  7005             IAC RAL
   32  4762  1026             TAD 26        / ADD 82 SEC. TO DESCENT START TIME---
   33  4763  3026             DCA 26
   34  4764  1376             TAD ENCLIM
   35  4765  3156             DCA 156       / ENCODER DESTINATION = UPPER LIMIT
   36  4766  1377             TAD MOTUP
   37  4767  4140             CALL
   38  4770  2510             MOON
   39  4771  5543             RETURN
   40  4772  6120    ENDRA,   6120          / ADDRESS OF ENDMODE(REST)
   41  4773  3344    ZDLR1,   3344          / ADD. OF Z DOT MAX.
   42  4774  3345    ZDLR2,   3345          / ADD. OF Z DOT MIN.
   43  4775  3356    ZDPR,    3356          / ADD. OF Z DOT OPTIMUM
   44  4776  7315    ENCLIM,  7315
   45  4777  0003    MOTUP,   0003
```

END OF PASS 2

0 ERRORS DETECTED
1SYMBOL TABLE

INITR2            PCM BETA PROGRAMS, 7/78.                                                DAY=221  19:00  08/09/78  PAGE 36

CALL   4140    ENCLIM 4776    ENDRA  4772    INITR  4734    MOON   2510    MOTUP  4777    RETURN 5543    WEXR   6101
WPWR   6201    ZDLR1  4773    ZDLR2  4774    ZDPR   4775

****** END OF MEMBER INITR2      59 RECORDS ******

LAUNCH            PCM BETA PROGRAMS, 7/78.                                                DAY=221  19:00  08/09/78  PAGE 37

1BEGIN PASS 1

END OF PASS 1
1BEGIN PASS 2

```
    1                /  COMPUTES ASCENT OR DESCENT LAUNCH BY NOTICING LIFT-OFF,THEN
    2                /    COMPUTING ENCODER DESTINATION AND CLEARING LAUNCH FLAG.
    3                /  DELTA BUOYANCY IS LEFT IN 166
    4                /  ENCODER DESTINATION IS LEFT IN 156
    5                /
    6       5543     RETURN=JMP I 143
    7       4140     CALL=JMS 140
    8       4500     TPGET=4500
    9       3600     MULT=3600
```

```
10        5600    EDGET=5600
11        6400    WRITE=6400
12        6200    TAVE64=6200
13                /
14        5400    *5400
15  5400  7300    LAUNCH, CLL CLA         / HERE FROM MASTER IF MOTOR ON AND LAUNCH FLAG SET
16  5401  4140            CALL
17  5402  6200            TAVE64          / PRESSURE INTO 136 AND ACC. (64 POINT AVERAGE)
18  5403  7344            CLL CLA CMA RAL  / -2
19  5404  1167            TAD 167         / MOTOR FLAG
20  5405  7440            SZA             / ?
21  5406  5221            JMP LMUP        / UP
22  5407  7300            CLL CLA         / DOWN, GET PRESSURE
23  5410  1136            TAD 136
24  5411  7041            CIA
25  5412  1076            TAD 76          / LAUNCH PRESSURE
26  5413  7420            SNL             / P < P LAUNCH?
27  5414  5227            JMP LMX         / NO, P LAUNCH OK
28  5415  7200    LMQ,    CLA             / YES, UPDATE P LAUNCH
29  5416  1136            TAD 136
30  5417  3076            DCA 76
31  5420  5543            RETURN          / SKIP REMAINDER OF LAUNCH ROUTINE
32  5421  7300    LMUP,   CLL CLA
33  5422  1136            TAD 136         / HERE IF MOTOR UP, GET PRESSURE
34  5423  7041            CIA
35  5424  1076            TAD 76          / LAUNCH PRESSURE
36  5425  7420            SNL             / P > P LAUNCH ?
37  5426  5215            JMP LMQ         / YES
38  5427  7510    LMX,    SPA
39  5430  7041            CIA             / ABSOLUTE VALUE
40  5431  1047            TAD 47          / NUM. OF PRESSURE BITS FOR LIFTOFF, NEGATIVE
41  5432  7510            SPA             / DELTA PRESSURE < LIFTOFF CRITERION ?
42  5433  5543            RETURN          / YES, DO NOTHING
43  5434  7300            CLA CLL         / NO, COMPUTE ENCODER DESTINATION
44  5435  1127            TAD 127         / CURRENT MAGNITUDE
45  5436  7041            CIA
46  5437  1334            TAD VM10
47  5440  7510            SPA             / < 10 CM/SEC ?
48  5441  5244            JMP GT10        / NO, JUMP AHEAD
49  5442  7200            CLA             / YES, DELTA B = 0
50                / NOTE:  EDGET WILL INCREASE DELTA B TO THE MINIMUM MOTOR RUN, 20 CC.
51  5443  5304            JMP LEND

LAUNCH              PCM BETA PROGRAMS, 7/78.                                          DAY=221 19:00 08/09/78 PAGE 38

52  5444  1335    GT10,   TAD VM40
53  5445  7510            SPA             / < 50 CM/SEC ?
54  5446  5266            JMP GT50        / NO, JUMP AHEAD
55  5447  7200            CLA
56  5450  1127            TAD 127         / CURRENT MAGNITUDE
57  5451  7421            MQL
58  5452  1336            TAD FACT1
59  5453  4140            CALL
60  5454  3600            MULT
61  5455  7300            CLA CLL
62  5456  1133            TAD 133         / LOW ORDER PRODUCT, UNITS OF .13 CC
63  5457  7010            RAR             / DIVIDE BY 8, MAKING UNITS CC--
64  5460  7100            CLL
65  5461  7010            RAR
66  5462  7100            CLL
67  5463  7010            RAR
68  5464  1332            TAD K8          / CONSTANT.  NOW, ABVAL(DELTA B) IS IN ACC.
69  5465  5304            JMP LEND
70  5466  7300    GT50,   CLA CLL         / HERE IF CURRENT MAGNITUDE > 50 CM/SEC
71  5467  1127            TAD 127         / CURRENT MAG.
72  5470  7010            RAR             / DIVIDE BY 8
73  5471  7100            CLL
74  5472  7010            RAR
75  5473  7100            CLL
76  5474  7010            RAR
77  5475  7421            MQL
78  5476  1337            TAD FACT2       / MAGIC FACTOR
79  5477  4140            CALL
80  5500  3600            MULT
81  5501  7300            CLA CLL
82  5502  1133            TAD 133         / LOW ORDER PRODUCT, UNITS OF .12 CC
83  5503  1333            TAD K9          / NOW, ABVAL(DELTA B) IS IN ACC.
84  5504  7001    LEND,   IAC             / GUARANTEE DELTA B NOT = 0
85  5505  3157            DCA 157         / SAVE AS ABVAL(DELTA B) BY COMPLICATED RULE.
86  5506  1037            TAD 37          / FIXED DELTA B FOR FIRST TESTS, IN CC.
87  5507  3166            DCA 166         / SAVE
88  5510  7344            CLA CLL CMA RAL  / -2
89  5511  1177            TAD 177         / MODE ID
90  5512  7440            SZA             / ASCENT?
91  5513  5317            JMP LX          / YES
92  5514  1166            TAD 166         / NO, NEGATE DELTA B.
93  5515  7041            CIA
94  5516  3166            DCA 166
95  5517  1166    LX,     TAD 166
96  5520  4140            CALL
97  5521  5600            EDGET           / LOAD ENCODER DESTINATION AND ACHIEVABLE DELTA B
98  5522  7300            CLA CLL
99  5523  3077            DCA 77          / LAUNCH FLAG OFF
100 5524  1340            TAD DLADD       / ADDRESS OF DATA CODE LIST
101 5525  4140            CALL
102 5526  6400            WRITE           / DATA INTO RECORDER
103 5527  3175            DCA 175         / MAKE DELTA B ZERO TO GET NDELB OF ON THE RIGHT
104               / FOOT. THE FIRST BUOYC WILL UNDERESTIMATE ABVAL(DELTA B).
105 5530  5543            RETURN
106 5531  7776    MINUS2, -2
107 5532  7746    K8,     -32             / -26 (DECIMAL) CC
108 5533  7610    K9,     -170            / -120 (DECIMAL) CC
```

LAUNCH          PCM BETA PROGRAMS, 7/78.                                            DAY=221 19:00  08/09/78  PAGE 39

```
109   5534   0036      VM10,    0036      / 10 CM/SEC. IF 1 BIT = .33 CM/SEC
110   5535   0170      VM40,    0170      / 40 CM/SEC.      "       .33
111   5536   0023      FACT1,   0023      / 6.2 X 3+ = 19
112   5537   0030      FACT2,   0030      / 8.1 X 3 = 24
113   5540   5541      DLADD,   DLIST
114   5541   5001      DLIST,   5001      / FORMAT CODE 1
115   5542   6000               6000      / STATUS
116   5543   2020               2020      / TIME --
117   5544   2021               2021
118   5545   2022               2022
119   5546   2136               2136      / PRESSURE FROM PAGE 0
120   5547   1000               1000      / ENCODER
121   5550   2175               2175      / Z DOT
122   5551   2127               2127      / CURRENT MAGNITUDE AVERAGE
123   5552   2157               2157      / DELTA B BY COMPLICATED RULE
124   5553   2007               2007      / LOWLIM COUNTER
125   5554   2156               2156      / ENCODER DESTINATION.
126   5555   0500               0500      / + MOTOR
127   5556   7777               7777      / TERMINATOR

END OF PASS 2

0 ERRORS DETECTED
1SYMBOL TABLE

CALL    4140    DLADD  5540    DLIST  5541    EDGET  5600    FACT1  5536    FACT2  5537    GT10   5444    GT50   5466
K8      5532    K9     5533    LAUNCH 5400    LEND   5504    LMQ    5415    LMUP   5421    LMX    5427    LX     5517
MINUS2  5531    MULT   3600    RETURN 5543    TAVE64 6200    TPGET  4500    VM10   5534    VM40   5535    WRITE  6400

******** END OF MEMBER LAUNCH     142 RECORDS ********
```

MASTER          PCM BETA PROGRAMS, 7/78.                                            DAY=221 19:00  08/09/78  PAGE 40

1BEGIN PASS 1 .

END OF PASS 1
1BEGIN PASS 2

```
  1                   / OUTER LOOP OF BACKGROUND.
  2                   /
  3          4140     CALL=JMS 140
  4          5543     RETURN=JMP I 143
  5          4200     SYSOVR=4200
  6          6000     ENDMA=6000
  7          3700     VMAGET=3700
  8          6400     WRITE=6400
  9          5000     DATGET=5000
 10          4700     ENDLYR=4700
 11          6201     WPWR=6201
 12          6101     WEXR=6101
 13          6311     WMOTOR=6311
 14          0066     ENDMDA=66
 15          4300     ZDGET=4300
 16          6140     ENCGET=6140
 17          5400     LAUNCH=5400
 18          4400     BUOYC=4400
 19          7360     DELAY=7360
 20          6007     ENDMA2=6007
 21          4500     TPGET=4500
 22          5710     MOFF=5710
 23          2510     MOON=2510
 24                   /
 25          4000     *4000
 26   4000   4140     MASTER,  CALL
 27   4001   4200              SYSOVR
 28   4002   1155              TAD 155     / Z DOT TIME INTERVAL (.01 SEC UNITS)
 29   4003   7041              CIA
 30   4004   1023              TAD 23      / Z DOT STOPWATCH
 31   4005   7420              SNL
 32   4006   5211              JMP M1      / WATCH > TIME INTERVAL ?
 33   4007   4140              CALL        / NO
 34   4010   7061              MAST1       / YES, GO TO SUBSECTION NO. 1
 35   4011   7200     M1,      CLA
 36   4012   1177              TAD 177     / MODE ID
 37   4013   1256              TAD MINUS4
 38   4014   7440              SZA         / WAIT MODE?
 39   4015   5236              JMP M2      / NO
 40   4016   3033              DCA 33      / YES, ZERO DATGET STOPWATCH
 41   4017   1024              TAD 24      /ENDTIME
 42   4020   7041              CIA
 43   4021   1021              TAD 21      / TIME NOW
 44   4022   7440              SZA         / EQUAL ?
 45   4023   5236              JMP M2      / NO
 46   4024   7305              CLL CLA IAC RAL   / YES, 2 INTO ACC.
 47   4025   3177              DCA 177     / MODE = DESCENT
 48   4026   1260              TAD TPWR
 49   4027   6101              WEXR
 50   4030   6201              WPWR        / PRESSURE POWER ON
 51   4031   3057              DCA 57      / SAVE POWER WORD
```

MASTER        PCM BETA PROGRAMS, 7/78.

```
 52   4032  4140           CALL
 53   4033  2510           MOON            / RATTLE SOLENOIDS, WRITE DATA
 54   4034  4140           CALL            /        FORMAT 1.
 55   4035  5710           MOFF
 56   4036  7300    M2,    CLA CLL
 57   4037  1167           TAD 167         / MOTOR FLAG
 58   4040  0257           AND BIT10
 59   4041  7450           SNA             / MOTOR ON ?
 60   4042  5245           JMP M3          / NO
 61   4043  4140           CALL            / YES
 62   4044  3640           MAST2           / GO TO SUBSECTION NO. 2
 63   4045  7300    M3,    CLA CLL
 64   4046  1571           TAD I 171       / SAMPLING PERIOD
 65   4047  7041           CIA
 66   4050  1033           TAD 33          / DATAGET STOPWATCH (.01 SEC. UNITS)
 67   4051  7420           SNL             / TIME TO GET DATA?
 68   4052  5200           JMP MASTER      / NO
 69   4053  4140           CALL            / YES
 70   4054  4064           MAST3           / GO TO SUBSECTION NO. 3
 71   4055  5200           JMP MASTER      / CLOSE MAIN BACKGROUND LOOP
 72   4056  7774   MINUS4, -4
 73   4057  0002   BIT10,  0002
 74   4060  5001   TPWR,   5001
 75                         /
 76                         /
 77                         /
 78          7061           *7061
 79   7061  4140   MAST1,   CALL            / HERE EACH 30 SEC. (BY Z DOT STOPWATCH).
 80   7062  4300            ZDGET           / Z DOT INTO 175
 81   7063  1167            TAD 167         / MOTOR FLAG
 82   7064  7440            SZA
 83   7065  5543            RETURN          / YES
 84   7066  1327            TAD MIN4        / NO, -4
 85   7067  1177            TAD 177         / MODE ID
 86   7070  7440            SZA             / WAIT MODE ?
 87   7071  5276            JMP NXT         / NO
 88   7072  1331            TAD DLA         / YES, GET STANDBY DATA LIST ADDRESS
 89   7073  4140            CALL            /
 90   7074  6400            WRITE           / DATA ONTO TAPE
 91   7075  5543            RETURN
 92   7076  7344   NXT,     CLA CLL CMA RAL   / -2
 93   7077  1177            TAD 177           / MODE ID
 94   7100  7440            SZA               / DESCENT?
 95   7101  5324            JMP NWT           / NO.
 96   7102  1031            TAD 31            / FORMAT 3 FRAME COUNTER.
 97   7103  7440            SZA               / SET?
 98   7104  5311            JMP NZT           / YES
 99   7105  7300            CLL CLA           / NO
100   7106  1330            TAD F1ADD         / ADDRESS OF FORMAT 1 DATA CODE LIST
101   7107  4140            CALL
102   7110  6400            WRITE           / DATA ONTO TAPE.
103   7111  1055   NZT,     TAD 55          / PURGE FLAG
104   7112  7450            SNA             / SET?
105   7113  5324            JMP NWT         / NO
106   7114  4140            CALL            / YES
107   7115  5000            DATGET          / FORMAT 3 DATA ONTO TAPE
108   7116  7300            CLL CLA
```

MASTER        PCM BETA PROGRAMS, 7/78.

```
109   7117  1337            TAD PPWR
110   7120  6101            WEXR
111   7121  6201            WPWR            / ALL POWER OFF, EXCEPT PRESSURE
112   7122  3057            DCA 57          / ZERO INTO PWER WORD
113   7123  5543            RETURN
114   7124  4140   NWT,     CALL            / HERE IF MOTOR OFF AND NOT WAIT MODE
115   7125  4400            BUOYC           / START MIDCOURSE BUOYANCY CHANGE IF REQUIRED
116   7126  5543            RETURN
117   7127  7774   MIN4,    -4
118   7130  5541   F1ADD,   5541
119   7131  7132   DLA,     DL
120   7132  5000   DL,      5000            / FORMAT CODE 0
121   7133  6000            6000            / STATUS
122   7134  3000            3000            / COMPOSITE TIME
123   7135  0003            0003            / PRESSURE
124   7136  7777            7777            / TERMINATOR
125   7137  5001   PPWR,    5001
126                          /
127                          /
128                          /
129          3640            *3640
130   3640  7300   MAST2,   CLL CLA         / HERE IF MOTOR ON
131   3641  1077            TAD 77          / LAUNCH FLAG
132   3642  7450            SNA             / SET?
133   3643  5246            JMP SKL         / NO
134   3644  4140            CALL            / YES
135   3645  5400            LAUNCH
136   3646  7300   SKL,     CLL CLA
137   3647  1167            TAD 167         / MOTOR FLAG
138   3650  7010            RAR             / NOW, LINK = 0 IF DOWN, 1 IF UP
139   3651  7430            SZL
140   3652  5264            JMP MUP         / UP
141   3653  4140            CALL            / DOWN
142   3654  6140            ENCGET          / READ ENCODER
143   3655  7041            CIA
144   3656  1156            TAD 156         / ENCODER DESTINATION
145   3657  7420            SNL             / ENCODER <= DESTINATION ?
146                                         / N.B. MAX. ENCODER = MAX. BUOYANCY
147   3660  5543            RETURN          / NO
```

```
148  3661 4140        CALL         / YES, CALL MOTOR OFF INSTRUCTIONS
149  3662 5710        MOFF
150  3663 5543        RETURN
151  3664 4140  MUP,  CALL         / HERE IF MOTOR UP
152  3665 6140        ENCGET       / READ ENCODER
153  3666 7041        CIA
154  3667 1156        TAD 156      / ENCODER DESTINATION
155  3670 7430        SZL          / ENC. >= DEST. ?
156  3671 5543        RETURN       / NO
157  3672 4140        CALL         / MOTOR OFF AND LATCHED.
158  3673 5710        MOFF
159  3674 5543        RETURN
160              /
161              /
162              /
163       4064  *4064
164  4064 7300  MAST3, CLA CLL     / HERE EACH 1 SEC., EXCEPT DURING WAIT.
165  4065 7000        NOP
```

MASTER              PCM BETA PROGRAMS, 7/78.                                  DAY=221 19:00 08/09/78 PAGE 43

```
166  4066 7000        NOP
167  4067 7000        NOP
168  4070 3033        DCA 33       / ZERO DATAGET STOPWATCH
169  4071 1167        TAD 167      / MOTOR FLAG
170  4072 7450        SNA          / MOTOR ON ?
171  4073 5301        JMP MX       / NO
172  4074 7200        CLA          / YES
173  4075 1353        TAD DBLA     / ADDRESS OF DELTA B MONITOR DATA CODE LIST
174  4076 4140        CALL
175  4077 6400        WRITE        / DATA ONTO TAPE
176  4100 5543        RETURN
177  4101 7340  MX,   CLL CLA CMA  / -1
178  4102 1177        TAD 177      / MODE ID
179  4103 7440        SZA          / ASCENT?
180  4104 5313        JMP NAS      / NO
181  4105 4140        CALL         / YES
182  4106 3700        VMAGET       / UPDATE CURRENT MAGNITUDE AVERAGE
183  4107 4140        CALL
184  4110 5000        DATGET       / WRITE SEA DATA ON TAPE
185  4111 4140        CALL
186  4112 4700        ENDLYR       / TEST FOR END OF SAMPLING LAYER
187  4113 4140  NAS,  CALL
188  4114 4500        TPGET        / READ PRESSURE, SINCE SOME ENDMODES NEED IT.
189  4115 7344        CLL CLA CMA RAL  / -2
190  4116 1177        TAD 177
191  4117 7440        SZA          / DESCENT?
192  4120 5350        JMP NAD      / NO
193  4121 1031        TAD 31       / FORMAT 3 FRAME COUNTER
194  4122 7450        SNA          / SET?
195  4123 5336        JMP MDP      / NO
196  4124 4140        CALL         / YES
197  4125 5000        DATGET       / FORMAT 3 DATA ONTO TAPE
198  4126 2031        ISZ 31       / INCREMENT FMT. 3 COUNTER
199  4127 5350        JMP NAD      / NON-ZERO
200  4130 7300        CLL CLA      / HERE IF COUNTER ZEROED
201  4131 1260        TAD TPWR
202  4132 6101        HEXR
203  4133 6201        HFWR
204  4134 3057        DCA 57       / POWER OFF, EXCEPT PRESSURE
205  4135 5350        JMP NAD
206  4136 1055  MDP,  TAD 55       / PURGE FLAG
207  4137 7440        SZA          / SET?
208  4140 5350        JMP NAD      / YES
209  4141 2040        ISZ 40       / NO, WRITE ONLY EACH 5 SEC. ---
210  4142 5350        JMP NAD
211              /    NOP
212              /    NOP
213  4143 1367        TAD DPTA     / ADDRESS OF FORMAT 5 DATA CODE LIST
214  4144 4140        CALL
215  4145 6400        WRITE        / PRESSURE ONTO TAPE
216  4146 1370        TAD MIN5
217  4147 3040        DCA 40
218              /    NOP
219              /    NOP
220  4150 4140  NAD,  CALL
221  4151 0066        ENDMDA       / ENDMODE TEST
222  4152 5543        RETURN
```

MASTER              PCM BETA PROGRAMS, 7/78.                                  DAY=221 19:00 08/09/78 PAGE 44

```
223  4153 4154  DBLA, DBL
224  4154 5002  DBL,  5002         / FORMAT CODE 2
225  4155 3000        3000         / COMPOSITE TIME
226  4156 0003        3            / PRESSURE
227  4157 1000        1000         / ENCODER
228  4160 0017        17           / VMSU
229  4161 0020        20           / VMSD
230  4162 0021        21           / IA
231  4163 7777        7777         / TERMINATOR
232  4164 5005  DPT,  5005         / FORMAT CODE 5
233  4165 2136        2136         / PRESSURE FROM PAGE 0
234  4166 7777        7777         / TERMINATOR
235  4167 4164  DPTA, DPT
236  4170 7773  MIN5, -5
```

END OF PASS 2

0 ERRORS DETECTED
1SYMBOL TABLE

```
BIT10   4057    BUOYC  4400    CALL    4140    DATGET 5000    DBL     4154    DBLA    4153    DELAY   7360    DL      7132
DLA     7131    DPT    4164    DPTA    4167    ENCGET 6140    ENDLYR  4700    ENDMA   6000    ENDMA2  6007    ENDMDA  0066
F1ADD   7130    LAUNCH 5400    MASTER  4000    MAST1  7061    MAST2   3640    MAST3   4064    MDP     4136    MINUS4  4056
MIN4    7127    MIN5   4170    MOFF    5710    MOON   2510    MUP     3664    MX      4101    M1      4011    M2      4036
M3      4045    NAD    4150    NAS     4113    NHT    7124    NXT     7076    NZT     7111    PPWR    7137    RETURN  5543
SKL     3646    SYSOVR 4200    TPGET   4500    TPWR   4060    VMAGET  3700    WEXR    6101    WMOTOR  6311    WPWR    6201
WRITE   6400    ZDGET  4300
```

****** END OF MEMBER MASTER    255 RECORDS ******

MOFF              PCM BETA PROGRAMS, 7/78.                                                           DAY=221  19:00  08/09/78  PAGE 45

1BEGIN PASS 1

END OF PASS 1
1BEGIN PASS 2

```
    1                       / ROUTINE TO TURN MOTOR OFF AND APPLY LATCH.
    2                       /
    3          4140         CALL=JMS 140
    4          5543         RETURN=JMP I 143
    5          7360         DELAY=7360
    6          6311         WMOTOR=6311
    7          6101         WEXR=6101
    8                       /
    9          5710         *5710
   10   5710   7301   MOFF,  CLL CLA IAC
   11   5711   6101          WEXR
   12   5712   6311          WMOTOR           / MOTOR OFF, BRAKES ON
   13   5713   7346          CLA CLL CMA RTL  / -3
   14   5714   1167          TAD 167          / MOTOR FLAG
   15   5715   7440          SZA              / UP ?
   16   5716   5321          JMP MDOWN        / NO
   17   5717   7000          NOP              / YES
   18   5720   7000          NOP
   19   5721   4140   MDOWN, CALL
   20   5722   7360          DELAY            / 100 MS
   21   5723   7000          NOP
   22   5724   7000          NOP
   23   5725   4140          CALL
   24   5726   7360          DELAY
   25   5727   7000          NOP
   26   5730   7000          NOP
   27   5731   7307          CLA CLL IAC RTL  / 4
   28   5732   7001          IAC              / 5
   29   5733   6101          WEXR
   30   5734   6311          WMOTOR           / MOTOR STILL OFF, BRAKES STILL ON, LATCH SOL. ON
   31   5735   4140          CALL
   32   5736   7360          DELAY
   33   5737   4140          CALL
   34   5740   7360          DELAY
   35   5741   4140          CALL
   36   5742   7360          DELAY
   37   5743   4140          CALL
   38   5744   7360          DELAY
   39   5745   7200          CLA
   40   5746   6101          WEXR
   41   5747   6311          WMOTOR           / ALL OFF
   42   5750   3167          DCA 167          / ZERO INTO MOTOR FLAG
   43   5751   7001          IAC
   44   5752   3107          DCA 107          / DELTA B DAMPING FLAG = +1
   45   5753   3077          DCA 77           / LAUNCH FLAG = 0
   46   5754   5543          RETURN
```

END OF PASS 2

0 ERRORS DETECTED
1SYMBOL TABLE

MOFF              PCM BETA PROGRAMS, 7/78.                                                           DAY=221  19:00  08/09/78  PAGE 46

```
CALL    4140    DELAY  7360    MDOWN   5721    MOFF   5710    RETURN 5543    WEXR    6101    WMOTOR  6311
```

****** END OF MEMBER MOFF      59 RECORDS ******

MOON              PCM BETA PROGRAMS, 7/78.                                                           DAY=221  19:00  08/09/78  PAGE 47

1BEGIN PASS 1

END OF PASS 1
1BEGIN PASS 2

```
    1                       / MOTOR ON ROUTINE.
    2                       / WORD TO GIVE FINAL MOTOR STATE IS IN ACC. ON ENTRY.
    3                       /
    4          6101         WEXR=6101
    5          6311         WMOTOR=6311
    6          4140         CALL=JMS 140
    7          5543         RETURN=JMP I 143
    8          7360         DELAY=7360
    9          6400         WRITE=6400
   10          5710         MOFF=5710
   11                       /
   12          2510         *2510
   13   2510   3123   MOON,  DCA 123          / TEMPORARY SAVE OF MOTOR FINAL STATE
   14   2511   1336          TAD DLADD
```

```
15  2512  4140           CALL
16  2513  6400           WRITE       / WRITE PRE-BURN DATA (FORMAT 1)
17  2514  1167           TAD 167     / MOTOR FLAG
18  2515  7450           SNA         / ON ?
19  2516  5321           JMP ST      / NO
20  2517  4140           CALL        / YES
21  2520  5710           MOFF        / MOTOR OFF
22  2521  1337    ST,    TAD UNLAT
23  2522  6101           WEXR
24  2523  6311           WMOTOR      / UNLATCH
25  2524  4140           CALL
26  2525  7360           DELAY       / 100 MS
27  2526  1123           TAD 123     / RECALL DESIRED MOTOR STATE
28  2527  6101           WEXR
29  2530  6311           WMOTOR
30  2531  3167           DCA 167     / WRITE MOTOR FLAG
31  2532  4140           CALL
32  2533  7360           DELAY       / WAIT 100 MS FOR MOTOR TRANSIENT
33  2534  7300           CLL CLA
34  2535  5543           RETURN
35  2536  5541   DLADD,  5541        / FORMAT 1 DATA CODE ADDRESS
36  2537  0010   UNLAT,  0010

END OF PASS 2

0 ERRORS DETECTED
1SYMBOL TABLE

CALL   4140    DELAY  7360    DLADD  2536    MOFF   5710    MOON   2510    RETURN 5543    ST     2521    UNLAT  2537
WEXR   6101    WMOTOR 6311    WRITE  6400

******** END OF MEMBER MOON       50 RECORDS ********

MULT              PCM BETA PROGRAMS, 7/78.                                        DAY=221  19:00  08/09/78  PAGE 48

1BEGIN PASS 1

END OF PASS 1
1BEGIN PASS 2

1                  / ROM SUBROUTINE TO MULTIPLY TWO 12- BIT WORDS.
 2                  /      MULTIPLIER IS IN MQ, MULTIPLICAND IN ACC.
 3                  /      PRODUCT IS LEFT IN 0132 AND 0133.
 4                  /
 5        5543      RETURN=JMP I 0143
 6        0130      MULT1=0130
 7        0131      MULT2=0131
 8        0132      MPROD1=0132
 9        0133      MPROD2=0133
10        0121      MNLOOP=0121
11        3600      *3600                       / PAGE 17 (OCTAL) IN ROM
12  3600  3130   MULT,   DCA MULT1
13  3601  1236           TAD MCOUNT
14  3602  3121           DCA MNLOOP             / INITIALIZE LOOP COUNTER
15  3603  3132           DCA MPROD1             / INITIALIZE PRODUCT TO 0
16  3604  3133           DCA MPROD2
17  3605  7501   MSTART, MQA                    / MQ INTO ACC.
18  3606  0237           AND MCONST             / ACC. = LH BIT OF MQ
19  3607  7450           SNA                    / SKIP IF ACC. NOT = 0
20  3610  5217           JMP MLEND              / GO TO END OF PRODUCT ADD
21  3611  7300           CLA CLL
22  3612  1130           TAD MULT1              / ADD MULTIPLICAND
23  3613  1133           TAD MPROD2             /     TO PRODUCT
24  3614  3133           DCA MPROD2
25  3615  7430           SZL                    / SKIP IF LINK = 0
26  3616  2132           ISZ MPROD1             / INCREMENT MPROD1 (SKIP IRRELEVANT)
27  3617  2121   MLEND,  ISZ MNLOOP
28  3620  5222           JMP .+2
29  3621  5543           RETURN
30  3622  7300           CLA CLL
31  3623  7501           MQA                    / MQ INTO ACC.
32  3624  7004           RAL                    / ROTATE ACC. LEFT
33  3625  7421           MQL                    / ACC. INTO MQ,  ACC. = 0
34  3626  7100           CLL
35  3627  1133           TAD MPROD2             / ROTATE PRODUCT LEFT --
36  3630  7004           RAL
37  3631  3133           DCA MPROD2
38  3632  1132           TAD MPROD1
39  3633  7004           RAL
40  3634  3132           DCA MPROD1
41  3635  5205           JMP MSTART
42  3636  7764   MCOUNT, 7764                   / -12 DECIMAL
43  3637  4000   MCONST, 4000

END OF PASS 2

0 ERRORS DETECTED
1SYMBOL TABLE

MCONST 3637    MCOUNT 3636    MLEND  3617    MNLOOP 0121    MPROD1 0132    MPROD2 0133    MSTART 3605    MULT   3600
MULT1  0130    MULT2  0131    RETURN 5543

******** END OF MEMBER MULT       57 RECORDS ********
```

NDELB    PCM BETA PROGRAMS, 7/78.                                    DAY=221 19:00 08/09/78   PAGE 49

1BEGIN PASS 1

END OF PASS 1
1BEGIN PASS 2

```
   1                  / ROUTINE TO COMPUTE NEEDED DELTA BUOYANCY (B) AND
   2                  /    CALL EDGET TO GET
   3                  /    ENCODER DESTINATION.
   4                  /    DELTA B LEFT IN 166.
   5                  /    E.D. LEFT IN 156 AND ACC.
   6                  /
   7       3500       GRAYBI=3500
   8       3600       MULT=3600
   9       4140       CALL=JMS 140
  10       5543       RETURN=JMP I 143
  11       7300       DPDIV=7300
  12       5600       EDGET=5600
  13       6310       RDENC=6310
  14       7140       ABVAL=7140
  15                  /
  16       4600       *4600
  17  4600 7300       NDELB,   CLL CLA
  18  4601 3131                DCA 131          / SIGN FLAG
  19  4602 1165                TAD 165          / OLD Z DOT (MM/SEC)
  20  4603 7041                CIA
  21  4604 1175                TAD 175          / NEW Z DOT
  22  4605 4140                CALL
  23  4606 7140                ABVAL
  24  4607 7421                MQL
  25  4610 1126                TAD 126          / OLD V MAGNITUDE (.2CM/SEC)
  26  4611 4140                CALL
  27  4612 3600                MULT
  28  4613 1132                TAD 132          / HIGH ORDER PRODUCT
  29  4614 7450                SNA              / ZERO DENOMINATOR?
  30  4615 7001                IAC              / YES, INCREMENT
  31  4616 3120                DCA 120          / SAVE DIVISOR
  32  4617 1166                TAD 166          / LAST DELTA B
  33  4620 4140                CALL
  34  4621 7140                ABVAL
  35  4622 7421                MQL
  36  4623 1127                TAD 127          / CURRENT MAGNITUDE
  37  4624 4140                CALL
  38  4625 3600                MULT
  39  4626 7300                CLA CLL
  40  4627 1120                TAD 120          / RECOVER DIVISOR
  41                  / NOTE: COMPUTED CC PER MM/SEC IS RESTRICTED TO A RANGE
  42                  /       2 TO 50.
  43  4630 4140                CALL
  44  4631 7300                DPDIV            / DOUBLE PRECISION DIVIDE
  45  4632 1124                TAD 124          / HIGH ORDER QUOTIENT
  46  4633 7440                SZA              / OK?
  47  4634 5241                JMP NN3          / NO, GO TO MAX. CC PER MM/SEC
  48  4635 1125                TAD 125          / YES, MIDDLE QUOT. = CC PER MM/SEC
  49  4636 1273                TAD NEG50
  50  4637 7420                SNL              / > 50 DECIMAL CC PER MM/SEC?
  51  4640 5245                JMP NREG         / NO
```

NDELB    PCM BETA PROGRAMS, 7/78.                                    DAY=221 19:00 08/09/78   PAGE 50

```
  52  4641 7300       NN3,     CLA CLL          / YES, ACC. = 50 DECIMAL
  53  4642 1274                TAD X50
  54  4643 3125                DCA 125          / CC PER MM/SEC = 50
  55  4644 5252                JMP NN2
  56  4645 1125       NREG,    TAD 125
  57  4646 1272                TAD NEG2         / -2
  58  4647 7430                SZL              / < 2 CC PER MM/SEC?
  59  4650 5253                JMP .+3          / NO
  60  4651 7305                CLL CLA IAC RAL  / YES, SET = 2
  61  4652 7421       NN2,     MQL
  62  4653 1175                TAD 175          / Z DOT REAL
  63  4654 7041                CIA
  64  4655 1565                TAD I 165        / Z DOT DESIRED
  65  4656 4140                CALL
  66  4657 7140                ABVAL
  67  4660 4140                CALL
  68  4661 3600                MULT
  69  4662 1133                TAD 133          / LOW ORDER PRODUCT = ABVAL (DELTA B)
  70  4663 7001                IAC              / GUARANTEE DELTA B NOT = 0
  71  4664 2131                ISZ 131          / SIGN FLAG FROM ABVAL CALLS
  72  4665 5267                JMP .+2
  73  4666 7041                CIA
  74  4667 4140                CALL             / COMPUTE ENCODER DESTINATION
  75  4670 5600                EDGET
  76  4671 5543                RETURN
  77  4672 7776       NEG2,    -2
  78  4673 7716       NEG50,   -62
  79  4674 0062       X50,     62
```

END OF PASS 2

0 ERRORS DETECTED
1SYMBOL TABLE

```
 ABVAL  7140    CALL   4140    DPDIV  7300    EDGET  5600    GRAYBI 3500    MULT   3600    NDELB  4600    NEG2   4672
 NEG50  4673    NN2    4652    NN3    4641    NREG   4645    RDENC  6310    RETURN 5543    X50    4674
```

****** END OF MEMBER NDELB       93 RECORDS ******

PARAM    PCM BETA PROGRAMS, 7/78.                                DAY=221 19:00 08/09/78 PAGE 51

1BEGIN PASS 1

END OF PASS 1
1BEGIN PASS 2

```
    1                    / PROFILING PARAMETERS.
    2                    /
    3          3200      *3200
    4  3200 0244         0244      / PRESSURE AT TOP OF LAYER (1 BIT = 5 CM)
    5  3201 0244         0244
    6  3202 0000         0000
    7          3230      *3230
    8  3230 0144         0144      / SAMPLING PERIOD (.01 SEC UNITS)
    9  3231 0144         0144      / 1 SECOND
   10  3232 0144         0144
   11          3260      *3260
   12  3260 7716         -0062     / Z DOT MAX (ASCENT), UNITS OF MM/SEC.
   13  3261 7716         -0062     / -5 CM/SEC
   14  3262 7716         -0062
   15          3310      *3310
   16  3310 6000         -2000     / Z DOT MIN. (ASCENT) , UNITS OF MM/SEC.
   17  3311 6000         -2000     /
   18  3312 6000         -2000
   19          3344      *3344
   20  3344 2000         2000      / REST2 Z DOT MAX.
   21  3345 6000         -2000     / REST2 Z DOT MIN.
   22  3346 2000         2000      / REST Z DOT MAX. (IN MM/SEC).  5 CM/SEC DESCENT
   23  3347 6000         -2000     / REST Z DOT MIN.
   24          3356      *3356
   25  3356 7754         -0024     / REST2 Z DOT OPTIMUM
   26  3357 0024         0024      / REST Z DOT OPTIMUM
   27          3450      *3450
   28  3450 7634         -0144     / ZDOT OPTIMUM FOR ASCENT (MM/SEC)
   29  3451 7634         -0144
   30  3452 7634         -0144
   31          3350      *3350
   32  3350 0263         0263      / PRESSURE OF DESCENT TERMINATOR (5 CM UNITS)
```

END OF PASS 2

0 ERRORS DETECTED
1SYMBOL TABLE

****** END OF MEMBER PARAM    44 RECORDS ******

PSTOP    PCM BETA PROGRAMS, 7/78.                                DAY=221 19:00 08/09/78 PAGE 52

1BEGIN PASS 1

END OF PASS 1
1BEGIN PASS 2

```
    1                    / ROUTINE TO SERVICE INTERRUPT OF PISTON TRIPPING A MICRO
    2                    /   SWITCH NEAR THE LIMITS OF TRAVEL.
    3                    /   THE PISTON IS BACKED OFF JUST FAR ENOUGH TO RESET THE
    4                    /   MICROSWITCH.
    5                    /
    6          6212      SKIPPS=6212
    7          4100      UCALL=JMS 100
    8          2100      UMOFF=2100
    9          6747      UDELAY=6747
   10          6101      WEXR=6101
   11          6311      WMOTOR=6311
   12          6310      RDENC=6310
   13          6666      GRAYR=6666
   14                    /
   15          3530      *3530
   16  3530 4100  PSTOP, UCALL
   17  3531 2100         UMOFF       / MOTOR OFF AND LATCHED.
   18  3532 7307         CLL CLA IAC RTL
   19  3533 7004         RAL         / NOW, 0010 OCTAL IS IN ACC.
   20  3534 6101         WEXR
   21  3535 6311         WMOTOR      / MOTOR OFF, RELEASE DETENT SOLENOID ON
   22  3536 4100         UCALL
   23  3537 6747         UDELAY      / 100 MS
   24  3540 7300         CLL CLA
   25  3541 6310         RDENC       / READ ENCODER
   26  3542 4100         UCALL
   27  3543 6666         GRAYR       / GRAY CODE TRANSLATOR FOR RUPTS.
   28  3544 7100         CLL
   29  3545 7500         SMA         / PISTON AT TOP OR BOTTOM?
   30  3546 7120         STL         / BOTTOM (MIN. BUOY.), LINK = 1
   31  3547 7205         CLA IAC RAL / TOP (MAX. BUOY.). NOW, ACC. = 2 IF TOP,
   32                                /    3 IF BOTTOM.
   33  3550 3147         DCA 147     / SAVE AS PSTOP FLAG
   34  3551 1147         TAD 147     / RESTORE
   35  3552 6101         WEXR
   36  3553 6311         WMOTOR      / MOTOR ON, SOLENOID OFF
   37  3554 3167         DCA 167     / MOTOR FLAG
   38  3555 7300         CLL CLA     / WAIT 5 SEC. --
   39  3556 1367         TAD NUM
   40  3557 3054         DCA 54      / COUNTER
   41  3560 4100         UCALL
   42  3561 6747         UDELAY
```

```
    43   3562  2054         ISZ 54
    44   3563  5360         JMP .-3
    45   3564  4100         UCALL
    46   3565  2100         UMOFF       / MOTOR OFF AND LATCHED
    47   3566  5432         JMP I 32    / RETURN
    48   3567  7716   NUM,  -0062

END OF PASS 2
```

PSTOP                PCM BETA PROGRAMS, 7/78.                                                           DAY=221  19:00  08/09/78  PAGE 53

0 ERRORS DETECTED
1SYMBOL TABLE

GRAYR  6666    NUM     3567    PSTOP  3530    RDENC  6310    SKIPPS 6212    UCALL  4100    UDELAY 6747    UMOFF  2100
WEXR   6101    WMOTOR  6311

****** END OF MEMBER PSTOP      62 RECORDS ******

RBEGIN               PCM BETA PROGRAMS, 7/78.                                                           DAY=221  19:00  08/09/78  PAGE 54

1BEGIN PASS 1                                                                                                                    0000000
                                                                                                                                 0000000
                                                                                                                                 0000000
END OF PASS 1                                                                                                                    0000000
1BEGIN PASS 2                                                                                                                    0000000
                                                                                                                                 0000000
```
     1                   / ROUTINE TO START RECORD CYCLE FOR SEA DATA RECORDER
     2                   /
     3         6101      WEXR=6101
     4         5543      RETURN=JMP I 143
     5         6106      SXRDAT=6106
     6         6107      CXRDAT=6107
     7         6113      SKBUSY=6113
     8         6116      SRREQ=6116
     9         6117      CRREQ=6117
    10         3160      *3160
    11  3160   1371      RBEGIN,  TAD RC
    12  3161   3010               DCA 10
    13  3162   1410               TAD I 10
    14  3163   6101               WEXR
    15  3164   6106               SXRDAT
    16  3165   6107               CXRDAT
    17                 /          SKBUSY       / ?
    18                 /          JMP .-1
    19  3166   6116               SRREQ
    20  3167   6117               CRREQ
    21  3170   5543               RETURN
    22  3171   0620      RC,      620          / BUFFER ADDRESS

END OF PASS 2

0 ERRORS DETECTED
1SYMBOL TABLE

CRREQ  6117    CXRDAT 6107    RBEGIN 3160    RC     3171    RETURN 5543    SKBUSY 6113    SRREQ  6116    SXRDAT 6106
WEXR   6101
```

****** END OF MEMBER RBEGIN     36 RECORDS ******

RECRPT               PCM BETA PROGRAMS, 7/78.                                                           DAY=221  19:00  08/09/78  PAGE 55

1BEGIN PASS 1

END OF PASS 1
1BEGIN PASS 2

```
     1                   /   SEA DATA TAPE RECORDER ENACTS THIS RUPT WHEN IT
     2                   /   WANTS THE NEXT 12 BITS OF A DATA FRAME.
     3                   /
     4         6101      WEXR=6101
     5         6106      SXRDAT=6106
     6         6107      CXRDAT=6107
     7         0032      RPTOUX=32
     8         0010      *10
     9  0010   0000      RECPTR,  0            / AUTOINCREMENT BUFFER POINTER
    10         0620      *620
    11  0620   0000      RECBUF,  0            / START OF BUFFER
    12         3140      *3140
    13  3140   1410      RR,      TAD I RECPTR / GET NEXT 12 BITS
    14  3141   6101               WEXR         / PUT IN EXPANSION REGISTER
    15  3142   6106               SXRDAT       / COPY TO
    16  3143   6107               CXRDAT       /          DATA REGISTER
    17  3144   5432               JMP I RPTOUX

END OF PASS 2

0 ERRORS DETECTED
1SYMBOL TABLE

CXRDAT 6107    RECBUF 0620    RECPTR 0010    RPTOUX 0032    RR     3140    SXRDAT 6106    WEXR   6101
```

****** END OF MEMBER RECRPT     30 RECORDS ******

RUPTSERV          PCM BETA PROGRAMS, 7/78.                                                    DAY=221  19:00  08/09/78   PAGE 56

1BEGIN PASS 1

END OF PASS 1
1BEGIN PASS 2

```
  1                          / INTERRUPT SERVICE OVERHEAD ROUTINE.
  2                          /
  3                          /    INTERRUPT CAUSES JUMP TO LOCATION 0.
  4            6206          SCLRFL=6206
  5            6207          CCLRFL=6207
  6            0032          *32
  7   0032    2156   RPTOUX,  RPTOUT           / ADDRESS ON PAGE 0
  8                          /
  9            3360          *3360                          / NEAR END OF PAGE 15 (OCTAL)
 10   3360    5770                   JMP I 3370            / RUPT VECTOR DESTINATIONS--
 11   3361    5771                   JMP I 3371
 12   3362    5772                   JMP I 3372
 13   3363    5773                   JMP I 3373
 14   3364    5774                   JMP I 3374
 15   3365    5775                   JMP I 3375
 16   3366    5776                   JMP I 3376
 17   3367    5777                   JMP I 3377
 18                          / START ADDRESSES OF RUPT ROUTINES:
 19   3370    3000                   3000            / TIME TICK
 20   3371    3140                   3140            / RECORD RUPT
 21   3372    2400                   2400            / TBRE
 22   3373    2000                   2000            / DR
 23   3374    5340                   5340            / ATTN1
 24   3375    2156                   RPTOUT          / ATTN2  (DOESN'T RUPT)
 25   3376    3530                   3530            / PSTOP
 26   3377    2156                   RPTOUT          / (SPARE)
 27            0000          *0
 28   0000    0000   RUPT,    0                      / RETURN ADDRESS SAVED HERE.
 29   0001    5402                   JMP I .+1       / THESE MUST BE INITIALIZED, AND
 30   0002    2150                   RUPTP           / ASSUME NO NESTED RUPTS, I.E.
 31   0003    0000   ASAVE,   0                      / EACH SERVICE COMPLETED BEFORE
 32   0004    0000   MQSAVE,  0                      / NEXT ENABLED.
 33   0005    0000   LSAVE,   0
 34                          / SAVES LIVE REGISTERS FOR ALL SERVICING ROUTINES.
 35                          /
 36            2150          *2150                   / LATTER PART OF PAGE 10 (OCTAL)
 37   2150    3003   RUPTP,   DCA ASAVE      / SAVE ACC.
 38   2151    7501            MQA
 39   2152    3004            DCA MQSAVE     / SAVE MQ
 40   2153    7204            CLA RAL
 41   2154    3005            DCA LSAVE      / SAVE LINK
 42   2155    6002            IOF            / VECTOR TO APPROPRIATE LOCATION
 43                          / SERVICE ROUTINE JUMPS HERE WHEN DONE:
 44   2156    7200   RPTOUT,  CLA
 45   2157    1005            TAD LSAVE
 46   2160    7110            CLL RAR        / RESTORE LINK
 47   2161    1004            TAD MQSAVE
 48   2162    7421            MQL            / RESTORE MQ
 49   2163    1003            TAD ASAVE      / RESTORE ACC.
 50   2164    6206            SCLRFL         / DISABLE CONSOLE INTERRUPTS FOR 2 INST'S
 51   2165    6207            CCLRFL         /    "
```

RUPTSERV          PCM BETA PROGRAMS, 7/78.                                                    DAY=221  19:00  08/09/78   PAGE 57

```
 52   2166    6001            ION            / ENABLE INTERRUPT FACILITY
 53   2167    5400            JMP I 0        / RETURN
 54                          /
```

END OF PASS 2

0 ERRORS DETECTED
1SYMBOL TABLE

ASAVE  0003    CCLRFL 6207    LSAVE 0005    MQSAVE 0004    RPTOUT 2156    RPTOUX 0032    RUPT  0000    RUPTP 2150
SCLRFL 6206

***** END OF MEMBER RUPTSERV    68 RECORDS ******

SQRT              PCM BETA PROGRAMS, 7/78.                                                    DAY=221  19:00  08/09/78   PAGE 58

1BEGIN PASS 1

END OF PASS 1
1BEGIN PASS 2

```
  1                          / SQUARE ROOT.
  2                          /    ARGUMENT IN 122, 123
  3                          /    ANSWER LEFT IN ACC.
  4                          /
  5            4140          CALL=JMS 140
  6            5543          RETURN=JMP I 143
  7            7200          BDIVID=7200
  8            7320          *7320
  9   7320    7350   SQRT,    CLA CLL CMA RAR    / 3777 INTO ACC.
 10   7321    3120   SQST,    DCA 120            / SAVE X
 11   7322    1122            TAD 122            / Z SQUARED INTO DIVIDEND.
 12   7323    3132            DCA 132
 13   7324    1123            TAD 123
 14   7325    3133            DCA 133
```

```
 15   7326  1120              TAD 120         / RESTORE X
 16   7327  7120              STL             / FLAG TO BDIVID FOR LOW QUOT.
 17   7330  4140              CALL
 18   7331  7200              BDIVID
 19   7332  1120              TAD 120         / X
 20   7333  7041              CIA
 21   7334  1130              TAD 130         / QUOTIENT Z SQUARED/X
 22   7335  7510              SPA             / NEGATIVE ?
 23   7336  5341              JMP SNEG        / YES
 24   7337  7110              CLL RAR         / NO, DIVIDE BY TWO
 25   7340  5344              JMP SS
 26   7341  7041    SNEG,     CIA             / MAKE POSITIVE
 27   7342  7110              CLL RAR         / DIVIDE BY TWO
 28   7343  7041              CIA             / RESTORE NEGATIVE
 29   7344  7440    SS,       SZA             / DONE?
 30   7345  5350              JMP .+3         / NO
 31   7346  1120              TAD 120         / YES
 32   7347  5543              RETURN
 33   7350  1120              TAD 120
 34   7351  5321              JMP SQST

END OF PASS 2

0 ERRORS DETECTED
1SYMBOL TABLE

BDIVID 7200    CALL   4140    RETURN 5543    SNEG   7341    SQRT   7320    SQST   7321    SS    7344

******** END OF MEMBER SQRT        47 RECORDS ********
```

SUBOVR            PCM BETA PROGRAMS, 7/78.                                                 DAY=221  19:00  08/09/78  PAGE 59

1BEGIN PASS 1

END OF PASS 1
1BEGIN PASS 2

```
  1                       / SOFTWARE STACK ROUTINES FOR SUBROUTINE CALLS.
  2                       /
  3            0140       *140
  4   0140  0000   CALLX,  0000        / ENTRY POINT FOR "CALL" ROUTINE
  5   0141  5542           JMP I .+1   / GO TO "CALL" IN ROM
  6   0142  7000           CALLY       / START OF "CALL" IN ROM
  7   0143  7011   RETX,   RETY        / POINTER TO "RETURN" ROUTINE IN ROM
  8   0144  0720   STACK,  720         / CURRENT STACK POINTER. INIT TO
  9                                    /    720 BY INITIAL (RESET) ROUTINE
 10   0145  0000   AC,     0000        / TEMPORARY LOC. FOR ACC.
 11                       /
 12            7000       *7000
 13   7000  3145   CALLY,  DCA AC      / SAVE ACC.
 14   7001  2144           ISZ STACK   / UPDATE STACK POINTER
 15   7002  1140           TAD CALLX   / CALLX HAS RETURN ADDRESS
 16   7003  7001           IAC         / INCREMENT BY ONE TO SKIP OVER
 17   7004  3544           DCA I STACK /  ENTRY ADD. OF USER SUBROUTINE--SAVE
 18   7005  1540           TAD I CALLX / GET USER ROUTINE ENTRY ADD.
 19   7006  3140           DCA CALLX   /   AND SAVE IT IN CALLX
 20   7007  1145           TAD AC      / RESTORE ACC.
 21   7010  5540           JMP I CALLX / GO TO USER SUBROUTINE
 22   7011  3145   RETY,   DCA AC      / SAVE AC
 23   7012  1544           TAD I STACK / GET RETURN ADD. FROM STACK
 24   7013  3140           DCA CALLX   /   AND PUT IT IN CALLX
 25   7014  7060           CMA CML     / ACC. = 7777; COMPLEMENT LINK
 26   7015  1144           TAD STACK   / STACK POINTER-1; RESTORE LINK
 27   7016  3144           DCA STACK   / UPDATE STACK POINTER
 28   7017  1145           TAD AC      / RESTORE AC
 29   7020  5540           JMP I CALLX / RETURN
 30                       /
 31                       /
 32            0100       *100
 33   0100  0000   UCALX,  0000        / DITTO AL THE ABOVE FOR RUPT SUBROUTINE CALLS--
 34   0101  5502           JMP I .+1
 35   0102  7040           UCALY
 36   0103  7051   URETX,  URETY
 37   0104  1000   USTACK, 1000
 38   0105  0000   UAC,    0000
 39            7040       *7040
 40   7040  3105   UCALY,  DCA UAC
 41   7041  2104           ISZ USTACK
 42   7042  1100           TAD UCALX
 43   7043  7001           IAC
 44   7044  3504           DCA I USTACK
 45   7045  1500           TAD I UCALX
 46   7046  3100           DCA UCALX
 47   7047  1105           TAD UAC
 48   7050  5500           JMP I UCALX
 49   7051  3105   URETY,  DCA UAC
 50   7052  1504           TAD I USTACK
 51   7053  3100           DCA UCALX
```

SUBOVR            PCM BETA PROGRAMS, 7/78.                                                 DAY=221  19:00  08/09/78  PAGE 60

```
 52   7054  7060           CMA CML
 53   7055  1104           TAD USTACK
 54   7056  3104           DCA USTACK
 55   7057  1105           TAD UAC
 56   7060  5500           JMP I UCALX

END OF PASS 2

0 ERRORS DETECTED
1SYMBOL TABLE

AC     0145    CALLX  0140    CALLY  7000    RETX   0143    RETY   7011    STACK  0144    UAC    0105    UCALX  0100
UCALY  7040    URETX  0103    URETY  7051    USTACK 0104

******** END OF MEMBER SUBOVR      70 RECORDS ********
```

SYSOVR          PCM BETA PROGRAMS, 7/78.                                                              DAY=221  19:00  08/09/78  PAGE 61

1BEGIN PASS 1

END OF PASS 1
1BEGIN PASS 2

```
     1                 / GENERAL OVERHEAD ROUTINE.
     2                 /
     3        5543     RETURN=JMP I 143
     4        6203     SKIPA2=6203
     5        4140     CALL=JMS 140
     6        6311     WMOTOR=6311
     7        6101     WEXR=6101
     8        7360     DELAY=7360
     9        6215     WCRB2=6215
    10        3040     ATTN2=3040
    11        6201     WPWR=6201
    12        6400     WRITE=6400
    13        5710     MOFF=5710
    14        0071     *71
    15  0071  4246                SYS1
    16  0072  4251                SYS2
    17        4200     *4200
    18  4200  7200     SYSOVR,   CLA
    19  4201  6203               SKIPA2      / HAS ATTN2 RISEN?  I.E. HAS THE MAGNET BEEN
    20                                       /     APPLIED OR REMOVED?
    21  4202  5241               JMP SCONT   / NO
    22  4203  7300               CLL CLA     / YES
    23  4204  1167               TAD 167     / MOTOR FLAG
    24  4205  7450               SNA         / MOTOR ON?
    25  4206  5211               JMP SMOFF   / NO
    26  4207  4140               CALL        / YES
    27  4210  5710               MOFF        / MOTOR OFF AND LATCHED.
    28  4211  1237     SMOFF,    TAD K1040   / ATTN2 LEVEL SENSITIVE HIGH
    29  4212  6215               WCRB2
    30  4213  6203               SKIPA2      / ATTN2 HIGH?
    31  4214  5223               JMP SON     / NO,  MAGNET IS ON
    32  4215  7300               CLA CLL     / YES, MAGNET IS OFF
    33  4216  1240               TAD K1000   / ATTN2 LEVEL SENSITIVE LOW
    34  4217  6215               WCRB2
    35  4220  4140               CALL
    36  4221  3040               ATTN2       / START WAIT MODE
    37  4222  5241               JMP SCONT   / CONTINUE
    38  4223  7300     SON,      CLA CLL     / HERE IF MAGNET ON
    39  4224  1253               TAD OLADD
    40  4225  4140               CALL
    41  4226  6400               WRITE       / WRITE FORMAT 1 DATA TO RECORD TIME OF MAG. ON
    42  4227  1253               TAD OLADD
    43  4230  4140               CALL
    44  4231  6400               WRITE       / WRITE DATA AGAIN, IN CASE IT'S THE FINAL FRAME
    45  4232  3177               DCA 177     / MODE ID = 0 , IDLE
    46  4233  6101               WEXR
    47  4234  6201               WPWR        / SENSOR POWER OFF
    48  4235  3057               DCA 57      / SAVE POWER WORD
    49  4236  5241               JMP SCONT
    50  4237  1160     K1040,    1160
    51  4240  1120     K1000,    1120
```

SYSOVR          PCM BETA PROGRAMS, 7/78.                                                              DAY=221  19:00  08/09/78  PAGE 62

```
    52  4241  7300     SCONT,    CLA CLL
    53  4242  1177               TAD 177     / MODE FLAG, =0 IF IDLE
    54  4243  7440               SZA
    55  4244  5250               JMP SYSNI
    56  4245  5471               JMP I 71    / HERE IF IDLE.  GO TO P. 0 ADDRESS
    57  4246  7200     SYS1,     CLA
    58  4247  5200               JMP SYSOVR
    59  4250  5472     SYSNI,    JMP I 72    / HERE IF NOT IDLE. GO TO P. 0 ADDRESS
    60  4251  7300     SYS2,     CLA CLL
    61  4252  5543               RETURN
    62  4253  5541     OLADD,    5541        / ADDRESS OF DATA CODES FOR FORMAT 1.
```

END OF PASS 2

0 ERRORS DETECTED
1SYMBOL TABLE

```
ATTN2  3040     CALL   4140     DELAY  7360     OLADD  4253     K1000  4240     K1040  4237     MOFF   5710     RETURN 5543
SCONT  4241     SKIPA2 6203     SMOFF  4211     SON    4223     SYSNI  4250     SYSOVR 4200     SYS1   4246     SYS2   4251
WCRB2  6215     WEXR   6101     WMOTOR 6311     WPWR   6201     WRITE  6400
```

****** END OF MEMBER SYSOVR      77 RECORDS ******

TAVE64          PCM BETA PROGRAMS, 7/78.                                                              DAY=221  19:00  08/09/78  PAGE 63

1BEGIN PASS 1

END OF PASS 1
1BEGIN PASS 2

```
     1                 / ROUTINE TO GET AND AVERAGE 64 PRESSURE VALUES.
     2                 /
     3        3400     ATOD=3400
     4        3412     ATOD2=3412
     5        4140     CALL=JMS 140
     6        5543     RETURN=JMP I 143
     7        0134     PHI=134
     8        6201     WPWR=6201
```

```
  9        7362          DELAY2=7362
 10        0135          PLO=135
 11        6101          WEXR=6101
 12        6301          INPUT=6301
 13                      /
 14        6200          *6200
 15  6200  7300  TAVE64, CLA CLL
 16  6201  1057          TAD 57               / POWER WORD
 17  6202  7450          SNA                  / OFF?
 18  6203  5240          JMP TEND             / YES, USE OLD PRESSURE
 19  6204  7300          CLL CLA
 20              /       TAD PONBIT           / SENSOR POWER ON---
 21              /       MQL                  / PRESSURE POWER BITS INTO MQ
 22              /       TAD 57               / PRESENT POWER WORD
 23              /       MQA                  / INCLUSIVE OR
 24              /       WEXR
 25              /       WPWR                 / POWER
 26              /       CLL CLA
 27              /       CALL                 / .02 SECOND DELAY FOR TRANSIENT
 28              /       DELAY2
 29  6205  1242          TAD NEG64
 30  6206  3120          DCA 120              / LOOP COUNTER
 31  6207  3134          DCA PHI              / CLEAR 2 WORD DATA ACCUMULATOR---
 32  6210  3135          DCA PLO
 33  6211  7325          CLA CLL CML IAC RAL  / 3 INTO ACC.
 34  6212  4140          CALL
 35  6213  3400          ATOD                 / SELECT INPUT AND WAIT FOR TRANSIENT
 36  6214  4140  NEXT,   CALL
 37  6215  3412          ATOD2                / PRESSURE INTO 30 AND ACC.
 38  6216  1135          TAD PLO
 39  6217  3135          DCA PLO              / LOW HALF
 40  6220  7430          SZL                  / CARRY ?
 41  6221  2134          ISZ PHI              / YES
 42  6222  2120          ISZ 120              / NO, DONE?
 43  6223  5214          JMP NEXT             / NO, LOOP.
 44  6224  1243          TAD K30              / YES, 30 (OCTAL) INTO ANSEL.
 45  6225  6101          WEXR
 46  6226  6301          INPUT
 47  6227  7300          CLA CLL
 48  6230  1134          TAD PHI              / NOW, DIVIDE BY 64 TO GET ANSWER---
 49  6231  7002          BSW
 50  6232  3030          DCA 30
 51  6233  1135          TAD PLO
```

```
 52  6234  0242          AND NEG64
 53  6235  7002          BSW                  / LOW ORDER BITS
 54  6236  1030          TAD 30               / ANSWER IS NOW IN ACC.
 55  6237  3136          DCA 136              / SAVE IN 136
 56              /       TAD 57               / OLD POWER
 57              /       WEXR
 58              /       WPWR                 / RESTORE
 59              /       CLL CLA
 60  6240  1136  TEND,   TAD 136
 61  6241  5543          RETURN
 62  6242  7700  NEG64,  -100
 63  6243  0030  K30,    30
 64  6244  5001  PONBIT, 5001
```

END OF PASS 2

0 ERRORS DETECTED
1SYMBOL TABLE

| ATOD | 3400 | ATOD2 | 3412 | CALL | 4140 | DELAY2 | 7362 | INPUT | 6301 | K30 | 6243 | NEG64 | 6242 | NEXT | 6214 |
|---|---|---|---|---|---|---|---|---|---|---|---|---|---|---|---|
| PHI | 0134 | PLO | 0135 | PONBIT | 6244 | RETURN | 5543 | TAVE64 | 6200 | TEND | 6240 | WEXR | 6101 | WPWR | 6201 |

****** END OF MEMBER TAVE64     78 RECORDS ******

```
  1              / ROUTINE TO TEST RECORDER WRITE PROGRAMS
  2              /
  3              / ACC. = NO. OF DATA CYCLES TO BE WRITTEN.
  4              /
  5        4140  CALL=JMS 140
  6        5543  RETURN=JMP I 143
  7        6400  WRITE=6400
  8        6200  *6200
  9  6200  7041  TESTRC, CIA            / NO. OF DATA CYCLES TO BE WRITTEN
 10  6201  3120          DCA 120        / INTO LOOP COUNTER
 11  6202  7200  NEWF,   CLA
 12  6203  1211          TAD DSTART     / ADDRESS OF DATA DESCRIPTOR LIST
 13  6204  4140          CALL
 14  6205  6400          WRITE
 15  6206  2120          ISZ 120        / DONE?
 16  6207  5202          JMP NEWF       / NO, RELOOP
 17  6210  5543          RETURN         / YES
 18  6211  6212  DSTART, STARTA
```

```
 19  6212 5005   STARTA,  5005        / FORMAT CODE 0101
 20  6213 2021            2021        / T1
 21  6214 2022            2022        / T0
 22  6215 2120            2120        / LOOP COUNTER
 23  6216 3000            3000        / COMPOSITE TIME
 24  6217 1000            1000        / ENCODER
 25  6220 0000            0000        / ZERO
 26  6221 0003            0003        / EXTERNAL PRESSURE
 27  6222 0013            0013        / AZ
 28  6223 0004            0004        / MX
 29  6224 0100            0100        / -MOTOR VOLTAGE
 30  6225 0200            0200        / -18B VOLTAGE
 31  6226 6000            6000        / STATUS
 32  6227 7777            7777        / TERMINATOR

END OF PASS 2

0 ERRORS DETECTED
1SYMBOL TABLE

CALL   4140    DSTART 6211   NEWF   6202   RETURN 5543   STARTA 6212   TESTRC 6200   WRITE 6400

******** END OF MEMBER TESTRC     45 RECORDS ********

TIMERUPT          PCM BETA PROGRAMS, 7/78.                                      DAY=221  19:00  08/09/78   PAGE 66

1BEGIN PASS 1

END OF PASS 1
1BEGIN PASS 2

1                    /    RUPT SERVICE ROUTINE--- TIMER
  2                    /
  3         0020       *20              / PAGE 0
  4  0020 0000    T2,      0
  5  0021 0000    T1,      0
  6  0022 0000    T0,      0
  7                    /
  8         0032       RPTOUX=32        / ADDRESS OF RUPT SERVICE EXIT
  9         3000       *3000            / PAGE 14 (OCTAL)
 10  3000 2023    TTR,     ISZ 23       / Z DOT STOPWATCH
 11  3001 7000             NOP
 12  3002 2033             ISZ 33       / DATAGET STOPWATCH
 13  3003 7000             NOP
 14  3004 2022             ISZ T0       / INCREMENT .01 SECOND COUNTER
 15  3005 5432             JMP I RPTOUX     / NO, RETURN
 16  3006 2021             ISZ T1       /   INCREMENT 40.96 SEC. COUNTER
 17  3007 5215             JMP TMONIT   /   GO TO 40.96 SEC. MONITOR STATEMENTS
 18  3010 2020             ISZ T2       /     INCREMENT DAY COUNTER
 19  3011 7000             NOP
 20  3012 5215             JMP TMONIT   / GO TO 30 SEC. MONITOR STATEMENTS
 21  3013 2110    TIM1,    -5670        / -3000 DECIMAL
 22  3014 2610    TIM2,    -5170        / -2880 DECIMAL
 23  3015 7000    TMONIT,  NOP          / PUT STATEMENTS HERE TO MONITOR, ETC. EACH
 24  3016 7200             CLA          /              30 SECONDS.
 25  3017 1046             TAD 46       / MONITOR FLAG INTO ACC.
 26  3020 7450             SNA          / ZERO?
 27  3021 5432             JMP I RPTOUX / YES, RETURN
 28  3022 5446             JMP I 46     / NO, GO TO MONITOR UART COMMAND.

END OF PASS 2

0 ERRORS DETECTED
1SYMBOL TABLE

RPTOUX 0032   TIM1   3013   TIM2   3014   TMONIT 3015   TTR   3000   T0   0022   T1   0021   T2   0020

******** END OF MEMBER TIMERUPT    41 RECORDS ********

TPGET             PCM BETA PROGRAMS, 7/78.                                      DAY=221  19:00  08/09/78   PAGE 67

1BEGIN PASS 1

END OF PASS 1
1BEGIN PASS 2

1               /   GET EXTERNAL PRESSURE INTO 136 AND ACC.
  2               /
  3               /
  4        5543   RETURN=JMP I 143
  5        6301   INPUT=6301
  6        6101   WEXR=6101
  7        3400   ATOD=3400
  8        7362   DELAY2=7362
  9        6201   WFWR=6201
 10        4140   CALL=JMS 140
 11        4500   *4500
 12  4500 7300   TPGET,   CLA CLL
 13  4501 1057            TAD 57       / POWER WORD
 14  4502 7450            SNA          / OFF?
 15  4503 5315            JMP TEND     / YES, USE OLD PRESSURE.
 16  4504 7300            CLL CLA      / NO, CONTINUE
 17              /        TAD PONBIT            / PRESSURE POWER BITS
 18              /        MQL
 19              /        TAD 57                / PRESENT POWER WORD
 20              /        MQA                   / PRESSURE BITS OR (INCLUSIVE)
 21                                             /    PRESENT POWER
```

```
22              /       WEXR
23              /       WPWR
24              /       CLA CLL
25              /       CALL
26              /       DELAY2              / .016 SECOND DELAY
27   4505 7325         CLA CLL CML IAC RAL  / 3 INTO ACC.
28   4506 4140         CALL
29   4507 3400         ATOD
30   4510 3136         DCA 136
31   4511 1320         TAD K30
32   4512 6101         WEXR
33   4513 6301         INPUT           / ANSEL = 30 TO CONSERVE POWER
34   4514 7200         CLA
35              /       TAD 57          / OLD POWER WORD
36              /       WEXR
37              /       WPWR
38              /       CLA
39   4515 1136  TEND,  TAD 136         / PRESSURE INTO ACC.
40   4516 5543         RETURN
41   4517 5001  PONBIT, 5001
42   4520 0030  K30,   30

END OF PASS 2

0 ERRORS DETECTED
1SYMBOL TABLE

ATOD  3400    CALL  4140    DELAY2 7362    INPUT 6301    K30  4520    PONBIT 4517    RETURN 5543    TEND  4515
TPGET 4500    WEXR  6101    WPWR   6201

******** END OF MEMBER TPGET      56 RECORDS ********

UARTCOMS          PCM BETA PROGRAMS, 7/78.                                     DAY=221 19:00 08/09/78 PAGE 68

1BEGIN PASS 1

END OF PASS 1
1BEGIN PASS 2

1              / KEYBOARD COMMANDS TO MICROPROCESSOR.
 2              /
 3     2600    *2600                 / PAGE 13 (OCTAL)   (ROM)
 4     2320    URETN=2320            / RETURN ADDRESS IN ROUTINE UARTSERV
 5     6216    SMR=6216
 6     6217    CMR=6217
 7     4100    UCALL=JMS 100
 8     2100    UMOFF=2100
 9     5503    URET=JMP I 103
10     6705    UATOD=6705
11     6666    GRAYR=6666
12     0040    UTYPAD=40
13     6105    WCRA1=6105
14              /
15              / COMMAND "S" --- (PRINT TIME, PRESS., PISTON, MOTOR FLAG,
16              /                 MODE ID EVERY 41 SECONDS)
17              /
18   2600 7200  UARTS, CLA
19   2601 1046         TAD 46        / TIMER MONITOR FLAG.
20   2602 7450         SNA           /   TURN OFF IF ON.
21   2603 5207         JMP USON
22   2604 7200         CLA
23   2605 3046         DCA 46
24   2606 5613         JMP I URETA
25   2607 1212  USON,  TAD USJA      / ADDRESS INTO TIMER MONITOR FLAG
26   2610 3046         DCA 46
27   2611 5253  USJ,   JMP UARTP     / GO TO "P" COMMAND; TIMER JUMPS HERE
28   2612 2611  USJA,  USJ
29   2613 2320  URETA, URETN
30              /
31              / COMMAND "Z" ---   (PRINT 'PROGRAM COUNTER' (ACTUALLY MEMORY
32              /                    LOCATION 0). THIS TELLS YOU WHERE YOU'RE
33              /                    AT IN BACKGROUND.)
34   2614 7200  UARTZ, CLA
35   2615 1000         TAD 0
36   2616 4100         UCALL
37   2617 6612         DUMP
38   2620 5613         JMP I URETA
39              /
40              / COMMAND "W" --    (WRITE INTO MEMORY. 0150 = OCTAL WORD
41              /                    TO BE ENTERED. 0151 = ADDRESS TO BE
42              /                    WRITTEN IN.)
43   2621 7200  UARTW, CLA
44   2622 1150         TAD 0150
45   2623 3551         DCA I 0151
46   2624 5751         JMP I URETX
47              /
48              / COMMAND "M" --    (MEMORY DUMP.. THIS JUST FLAGS; TBRE
49              /                    INTERRUPT DOES THE WORK.
50              /                    ARG1=0150 = NO. OF WORDS TO BE DUMPED.
51              /                    ARG2=0151 = ADD. WHERE DUMP STARTS.

UARTCOMS          PCM BETA PROGRAMS, 7/78.                                     DAY=221 19:00 08/09/78 PAGE 69

52   2625 7301  UARTM, CLA CLL IAC
53   2626 3043         DCA 43        / SET MEMORY DUMP ON FLAG.
54   2627 1150         TAD 0150
55   2630 7450         SNA
56   2631 7001         IAC
57   2632 7041         CIA
58   2633 3150         DCA 0150      / SET UP COUNTER IN ARG1=0150
```

```
 59  2634  5750            JMP I URETE
 60                 /
 61                 / COMMAND "G" --   LOAD CRA1, PIE #1 CONTROL REGISTER A
 62                 /      56 = TIME RUPT OFF
 63                 /      57 = TIME RUPT ON
 64  2635  7200     UARTG, CLA
 65  2636  1151            TAD 0151
 66  2637  6105            WCRA1
 67  2640  5751            JMP I URETX
 68                 /
 69                 / COMMAND "B:--    (POWER CONTROL, ARG.=0151 = POWER
 70                 /                  CONTROL WORD)
 71                 /
 72        6101     WEXR=6101
 73        6201     WPWR=6201
 74  2641  1151     UARTB, TAD 0151
 75  2642  6101            WEXR
 76  2643  6201            WPWR
 77  2644  3057            DCA 57          / SAVE POWER CONTROL WORD
 78  2645  5751            JMP I URETX
 79                 /
 80                 /
 81                 / COMMAND "T"---     (READ BINARY TAPE)
 82                 /
 83  2646  7201     UARTT, CLA IAC
 84  2647  3041            DCA 41          / SET PAPER TAPE FLAG
 85  2650  3044            DCA 44          / UNSET LEADER-TRAILER FLAG
 86  2651  3045            DCA 45          / BYTE FLAG = 0
 87  2652  5751            JMP I URETX     / RETURN TO UART SERVICE ROUTINE
 88                 /
 89                 /
 90                 / COMMAND "P"--      (PRINT TIME, PRESSURE, PISTON POSITION,
 91                 /                    MOTOR FLAG, MODE ID.)
 92                 /
 93        0021     T1=21
 94        0022     T0=22
 95        6612     DUMP=6612
 96        6310     RDENC=6310
 97        6301     INPUT=6301
 98  2653  7300     UARTP, CLA CLL
 99  2654  1021            TAD T1          / PRINT TIME WORDS--
100  2655  4100            UCALL
101  2656  6612            DUMP
102  2657  7200            CLA
103  2660  1022            TAD T0
104  2661  4100            UCALL
105  2662  6612            DUMP
106  2663  7325            CLA CLL CML IAC RAL   / 3 INTO ACC., ANSEL FOR PRESSURE
107  2664  7000            NOP
108  2665  7000            NOP 109  2666  4100            UCALL
110  2667  6705            UATOD           / CALL A TO D
111  2670  4100            UCALL
112  2671  6612            DUMP            / PRINT PRESSURE
113  2672  7200            CLA
114  2673  6310            RDENC           / READ ENCODER
115  2674  4100            UCALL
116  2675  6666            GRAYR           / CALL GRAY CODE TRANSLATOR
117  2676  4100            UCALL
118  2677  6612            DUMP            / PRINT PISTON POSITION
119  2700  7200            CLA
120  2701  1167            TAD 167         / MOTOR FLAG
121  2702  4100            UCALL
122  2703  6612            DUMP
123  2704  7200            CLA
124  2705  1177            TAD 177         / MODE ID
125  2706  4100            UCALL
126  2707  6612            DUMP
127  2710  5613            JMP I URETA     / RETURN
128                 /
129                 /
130                 / COMMAND "D"---    (OUTPUT A DATA ITEM. ARG.=0151 CONTAINS
131                 /                   INPUT SELECT CODE.)
132                 /
133  2711  7300     UARTD, CLA CLL
134  2712  1151            TAD 0151        / ARG. INTO ACC.
135  2713  6216            SMR             / RESET UART, JUST IN CASE IT IS HUNG UP
136  2714  6217            CMR
137  2715  4100            UCALL
138  2716  6705            UATOD           / CALL A TO D
139  2717  4100            UCALL
140  2720  6612            DUMP
141  2721  5613            JMP I URETA     / RETURN
142                 /
143                 /
144                 / COMMAND 'A'---    (SUBROUTINE TEST.  0150 = MQ,
145                 /                   0151 = ACC., 0152 = SUBROUTINE ADDRESS
146                 /                   0153 = LINK.
147                 /                   (THIS MUST BE DEFINED WITH 'W' COMMAND)
148                 /                   NEW MQ AND ACC. ARE TYPED ON TTY.)
149                 /
150  2722  7300     UARTA, CLL CLA
151  2723  1153            TAD 153
152  2724  7010            RAR             / LOAD LINK
153  2725  7200            CLA
154  2726  1150            TAD 0150
155  2727  7421            MQL
156  2730  1346            TAD UABACA
```

```
157  2731  2144              ISZ 144         / INCREMENT STACK POINTER
158  2732  3544              DCA I 144       / SAVE RETURN ADDRESS IN STACK
159  2733  1151              TAD 0151        / LOAD ACC.
160  2734  5552              JMP I 0152      / GO TO SUBROUTINE
161  2735  3150      UABACK, DCA 150         / SAVE ACC.
162  2736  7501              MQA
163  2737  4100              UCALL
164  2740  6612              DUMP            / WRITE MQ
165  2741  7200              CLA
```

```
166  2742  1150              TAD 150
167  2743  4100              UCALL
168  2744  6612              DUMP            / WRITE ACC.
169  2745  5613              JMP I URETA     / RETURN
170  2746  2735      UABACA, UABACK
171  2747  0720      UAZ,    0720            / RAM ADDRESS
172  2750  2333      URETE,  URETN+13        / RETURN ADD. IF 150, 151 NOT TO BE CLEARED
173  2751  2330      URETX,  URETN+10        / RETURN ADD. IF NO CARR. RET. AND LINFEED
174                          /
175        6311              WMOTOR=6311
176                          /
177                          / COMMAND 'K'---   SUM ALL ROM LOCATIONS
178                          /
179  2752  7200      UARTK,  CLA
180  2753  1363              TAD KSTX
181  2754  3027              DCA 27
182  2755  1427              TAD I 27
183  2756  2027              ISZ 27
184  2757  5355              JMP .-2
185  2760  4100              UCALL
186  2761  6612              DUMP
187  2762  5613              JMP I URETA
188  2763  2000      KSTX,   2000            / START OF ROM
189                  /
190                  /
191                  / COMMAND "Y"--- MOTOR CONTROL.
192                  /     ARGUMENT DEFINITIONS:
193                  /
194                  / SIMPLE COMMANDS-
195                  /     20 = OFF
196                  /     21 = BRAKE
197                  /     22 = DOWN
198                  /     23 = UP
199                  /     24 = "DETENT SOLENOID" ON, MOTOR OFF
200                  /     30 = "RELEASE DETENT SOLENOID" ON, MOTOR OFF
201                  /
202                  / COMPLEX COMMANDS-
203                  /     0 = MOTOR OFF, BRAKE ON, WAIT, APPLY DETENT (BRAKE STILL ON),
204                  /           WAIT, DETENT SOLENOID OFF, BRAKE OFF.
205                  /     2 = RELEASE DETENT ON, WAIT 100MS, DETENT SOLENOID OFF
206                  /           AND MOTOR DOWN
207                  /     3 = RELEASE DETENT ON, WAIT 100MS, DETENT SOLENOID OFF
208                  /           AND MOTOR UP
209                  /
210        6747              UDELAY=6747
211                  /
212        6300              *6300
213  6300  7300      UARTY,  CLA CLL
214  6301  1151              TAD 151         / COMMAND ARGUMENT
215  6302  0356              AND BIT7        / GET BIT 7
216  6303  7450              SNA             / COMPLEX COMMAND?
217  6304  5313              JMP CMPLX       / YES
218  6305  7041              CIA
219  6306  1151              TAD 151         / NO
220  6307  6101              WEXR
221  6310  6311              WMOTOR
222  6311  3167              DCA 167         / MOTOR FLAG
```

```
223  6312  5760              JMP I URETA2    / RETURN
224  6313  7200      CMPLX,  CLA
225  6314  1151              TAD 151         / HERE IF COMPLEX COMMAND
226  6315  7440              SZA             / STOP MOTOR?
227  6316  5322              JMP Y2          / NO
228  6317  4100              UCALL           / YES
229  6320  2100              UMOFF           / MOTOR OFF AND LATCHED
230  6321  5760              JMP I URETA2    / RETURN
231  6322  7344      Y2,     CLA CLL CMA RAL / -2 INTO ACC.
232  6323  1151              TAD 151
233  6324  7440              SZA             / MOTOR DOWN?
234  6325  5340              JMP Y3          / NO
235  6326  1357              TAD K10         / YES
236  6327  6101              WEXR
237  6330  6311              WMOTOR          / RELEASE DETENT, MOTOR STILL OFF
238  6331  4100              UCALL
239  6332  6747              UDELAY
240  6333  7305              CLA CLL IAC RAL / 2 INTO ACC.
241  6334  6101              WEXR
242  6335  6311              WMOTOR          / MOTOR DOWN, DETENT SOLENOIDS OFF
243  6336  3167              DCA 167         / MOTOR FLAG
244  6337  5760              JMP I URETA2    / RETURN
245  6340  7346      Y3,     CLA CLL CMA RTL / -3 INTO ACC.
246  6341  1151              TAD 151
247  6342  7440              SZA             / UP MOTOR?
248  6343  5760              JMP I URETA2    / NO, RETURN
249  6344  1357              TAD K10         / YES
250  6345  6101              WEXR
```

```
251  6346 6311           WMOTOR         / RELEASE DETENT, MOTOR STILL OFF
252  6347 4100           UCALL
253  6350 6747           UDELAY
254  6351 7325           CLA CLL CML IAC RAL   / 3 INTO ACC.
255  6352 6101           WEXR
256  6353 6311           WMOTOR         / MOTOR UP
257  6354 3167           DCA 167        / MOTOR FLAG
258  6355 5760           JMP I URETA2   / RETURN
259  6356 0020   BIT7,   0020
260  6357 0010   K10,    10
261  6360 2320   URETA2, 2320           / RETURN ADDRESS IN UARTSERV

END OF PASS 2

0 ERRORS DETECTED
1SYMBOL TABLE

BIT7   6356   CMPLX  6313   CMR    6217   DUMP   6612   GRAYR  6666   INPUT  6301   KSTX   2763   K10    6357
RDENC  6310   SMR    6216   TO     0022   T1     0021   UABACA 2746   UABACK 2735   UARTA  2722   UARTB  2641
UARTD  2711   UARTG  2635   UARTK  2752   UARTM  2625   UARTP  2653   UARTS  2600   UARTT  2646   UARTW  2621
UARTY  6300   UARTZ  2614   UATOD  6705   UAZ    2747   UCALL  4100   UDELAY 6747   UMOFF  2100   URET   5503
URETA  2613   URETA2 6360   URETE  2750   URETN  2320   URETX  2751   USJ    2611   USJA   2612   USON   2607
UTYPAD 0040   WCRA1  6105   WEXR   6101   WMOTOR 6311   WPWR   6201   Y2     6322   Y3     6340

******** END OF MEMBER UARTCOMS   279 RECORDS ********

UARTSERV           FCM BETA PROGRAMS, 7/78.

1BEGIN PASS 1

END OF PASS 1
1BEGIN PASS 2

1                  / UART SERVICE, ENTERED VIA DR INTERRUPT.
      2                  /
      3        0061      *61                    / PAGE 0
      4   0061 0000      UCOUNT, 0
      5        2000      *2000                  / PAGE 10 (OCTAL) (START OF ROM)
      6        4100      UCALL=JMS 100          / LOCATION OF BUFFER WRITE ROUTINE
      7        6600      PRINT=6600             / BUFFER WRITE ROUTINE
      8        6110      RUART=6110
      9        0151      ARG2=0151
     10        0150      ARG1=0150
     11        0032      RPTOUX=32              / LOC. OF ADD. OF RUPT SERVICE EXIT
     12                  /
     13   2000 6110      UARTS,  RUART          / ACC = CHARACTER
     14   2001 0260              AND UC3        / BIT 0 TO 3 = 0
     15   2002 7421              MQL
     16   2003 3043              DCA 43         / CLEAR MEMORY DUMP ON FLAG
     17   2004 7501              MQA
     18                  / PAPER TAPE READ BRANCH.
     19   2005 7200      UTREAD, CLA
     20   2006 1041              TAD 41         / UART TAPE FLAG
     21   2007 7450              SNA
     22   2010 5263              JMP UNONTP     / GO TO KEYBOARD READ
     23   2011 7701              CLA MQA        / 8 BITS INTO ACC.
     24   2012 1254              TAD UTR1       / 0 IF LEADER OR TRAILER
     25   2013 7440              SZA
     26   2014 5223              JMP UNOTLT     / GO TO NOT LEADER-TRAILER
     27   2015 1044              TAD 44         / LEADER-TRAILER FLAG
     28   2016 7450              SNA
     29   2017 5432              JMP I RPTOUX   / IGNORE LEADER, END RUPT
     30   2020 7200              CLA            / TRAILER ACTS AS TERMINATOR
     31   2021 3041              DCA 41         / UNSET PAPER TAPE FLAG
     32   2022 5432              JMP I RPTOUX   / END RUPT
     33   2023 7201      UNOTLT, CLA IAC        / HERE IF NOT LEADER- TRAILER
     34   2024 3044              DCA 44         / SET LEADER-TRAILER FLAG
     35   2025 1045              TAD 45         / BYTE FLAG
     36   2026 7440              SZA
     37   2027 5234              JMP UBYTE2
     38   2030 7701              CLA MQA        / BYTE 1
     39   2031 3151              DCA ARG2       / 7 BITS INTO ARG2
     40   2032 2045              ISZ 45         / BYTE FLAG = 1 (I.E. BYTE NO. 2)
     41   2033 5432              JMP I RPTOUX   / END RUPT
     42   2034 7300      UBYTE2, CLA CLL        / BYTE 2
     43   2035 3045              DCA 45         / BYTE FLAG = 0 (I.E. BYTE NO. 1)
     44   2036 7501              MQA
     45   2037 7002              BSW            / SHIFT 7 LEFT
     46   2040 7004              RAL
     47   2041 1151              TAD ARG2       / ADD BYTE 1 (7 BITS)
     48   2042 7006              RTL            / ROTATE 6 LEFT
     49   2043 7006              RTL
     50   2044 7006              RTL
     51   2045 7420              SNL            / LINK = 1 IF ADDRESS

UARTSERV           FCM BETA PROGRAMS, 7/78.

52   2046 5251              JMP .+3
     53   2047 3150              DCA ARG1       / ENTER ADDRESS
     54   2050 5432              JMP I RPTOUX   / END RUPT
     55   2051 3550              DCA I ARG1     / ENTER DATA
     56   2052 2150              ISZ ARG1       / INCREMENT ADDRESS
     57   2053 5432              JMP I RPTOUX   / END
     58   2054 7600      UTR1,   7600           / THIS + LEADER-TRAILER = 0
     59   2055 0100      UTR2,   0100           / BIT 5
     60   2056 3400      UCERR,  3400           / ERROR BITS
     61   2057 0305      UCE,    0305
     62   2060 0377      UC3,    0377
     63   2061 0160      UC1,    160
```

```
 64   2062  0060            UCNUM,  60
 65                    / END OF PAPER TAPE READ BRANCH.
 66   2063  7701       UNONTP, CLA MQA         / GO HERE IF KEYBOARD CHARACTER
 67   2064  4100            UCALL
 68   2065  6600            PRINT             / ECHO
 69   2066  7701            CLA MQA
 70   2067  0261            AND UC1           / BITS 0,1,2,3,4,8,9,10,11 = 0
 71   2070  7041            CIA               / TEST TO SEE IF NUMERIC
 72   2071  1262            TAD UCNUM         / CHARACTER
 73   2072  5673            JMP I .+1         / GO TO NEXT PAGE
 74   2073  2200            2200
 75         2200       *2200                  / PAGE 11 (OCTAL)
 76   2200  7440            SZA               / SKIP IF NUMBER
 77   2201  5223            JMP U1            / SKIP NUMBER ENTERING
 78   2202  7346            CLL CLA CMA RTL   / SET LOOP COUNTER TO -3
 79   2203  3061            DCA UCOUNT
 80   2204  7100            CLL
 81   2205  1151            TAD 0151          / ROTATE ARGUMENT WORDS 3 LEFT--
 82   2206  7004            RAL
 83   2207  3151            DCA 0151
 84   2210  1150            TAD 0150
 85   2211  7004            RAL
 86   2212  3150            DCA 0150
 87   2213  7100            CLL
 88   2214  2061            ISZ UCOUNT
 89   2215  5205            JMP .-10          / OCTAL
 90   2216  7501            MQA               / CHAR. INTO ACC.
 91   2217  0353            AND UC2           / LEFT HAND 9 BITS = 0
 92   2220  1151            TAD 0151          / ADD TO ARGUMENT REGISTER
 93   2221  3151            DCA 0151          /         ON PAGE 0
 94   2222  5333            JMP UEND          / RETURN
 95   2223  7701       U1,  CLA MQA
 96   2224  1374            TAD BLANK
 97   2225  7450            SNA
 98   2226  5333            JMP UEND
 99   2227  7200            CLA
100   2230  1372            TAD CRGRET        / CARRIAGE RETURN
101   2231  4100            UCALL
102   2232  6600            PRINT
103   2233  7200            CLA
104   2234  1373            TAD LINFED        / LINE FEED
105   2235  4100            UCALL
106   2236  6600            PRINT
107   2237  7701            CLA MQA           / START OF COMMAND SKIP CHAIN
108   2240  1337            TAD UCM
109   2241  7450            SNA
110   2242  5755            JMP I UCMA
111   2243  7701            CLA MQA
112   2244  1340            TAD UCW
113   2245  7450            SNA
114   2246  5756            JMP I UCWA
115   2247  7701            CLA MQA
116   2250  1341            TAD UCZ
117   2251  7450            SNA
118   2252  5757            JMP I UCZA
119   2253  7701            CLA MQA
120   2254  1342            TAD UCA
121   2255  7450            SNA
122   2256  5760            JMP I UCAA
123   2257  7701            CLA MQA
124   2260  1343            TAD UCS
125   2261  7450            SNA
126   2262  5761            JMP I UCSA
127   2263  7701            CLA MQA
128   2264  1344            TAD UCB
129   2265  7450            SNA
130   2266  5762            JMP I UCBA
131   2267  7701            CLA MQA
132   2270  1345            TAD UCK
133   2271  7450            SNA
134   2272  5763            JMP I UCKA
135   2273  7701            CLA MQA
136   2274  1346            TAD UCY
137   2275  7450            SNA
138   2276  5764            JMP I UCYA
139   2277  7701            CLA MQA
140   2300  1347            TAD UCT
141   2301  7450            SNA
142   2302  5765            JMP I UCTA
143   2303  7701            CLA MQA
144   2304  1350            TAD UCG
145   2305  7450            SNA
146   2306  5766            JMP I UCGA
147   2307  7701            CLA MQA
148   2310  1351            TAD UCP
149   2311  7450            SNA
150   2312  5767            JMP I UCPA
151   2313  7701            CLA MQA
152   2314  1352            TAD UCD
153   2315  7450            SNA
154   2316  5770            JMP I UCDA
155   2317  5330            JMP URETN2
156   2320  7200       URETN, CLA             / UART COMMAND RETURNS TO HERE
157   2321  1372            TAD CRGRET
158   2322  4100            UCALL
159   2323  6600            PRINT
160   2324  7200            CLA
161   2325  1373            TAD LINFED
162   2326  4100            UCALL
163   2327  6600            PRINT
164   2330  7200       URETN2, CLA
165   2331  3150            DCA 0150          / CLEAR UART ARGUMENT REGISTERS
```

```
166  2332  3151           DCA 0151
167  2333  1042   UEND,   TAD 42          / TBRE OFF FLAG
168  2334  7450           SNA
169  2335  5432           JMP I RPTOUX
170  2336  5771           JMP I UTBRE     / GO TO TBRE SERVICE IF TBRE IS OFF
171  2337  7663   UCM,    -0115
172  2340  7451   UCW,    -0327
173  2341  7646   UCZ,    -0132
174  2342  7677   UCA,    -0101
175  2343  7655   UCS,    -0123
176  2344  7676   UCB,    -0102
177  2345  7665   UCK,    -0113
178  2346  7647   UCY,    -0131
179  2347  7454   UCT,    -0324
180  2350  7671   UCG,    -0107
181  2351  7660   UCP,    -0120
182  2352  7674   UCD,    -0104
183  2353  0007   UC2,    0007
184  2354  0100   UBIT5,  0100
185  2355  2625   UCMA,   2625            / COMMAND ADDRESSES--
186  2356  2621   UCWA,   2621
187  2357  2614   UCZA,   2614
188  2360  2722   UCAA,   2722
189  2361  2600   UCSA,   2600
190  2362  2641   UCBA,   2641
191  2363  2752   UCKA,   2752
192  2364  6300   UCYA,   6300
193  2365  2330   UCTA,   URETN2          / PUT 2646 OCTAL HERE TO ACTIVATE PAPER
194  2366  2635   UCGA,   2635            /   TAPE READ COMMAND.
195  2367  2653   UCFA,   2653
196  2370  2711   UCDA,   2711
197  2371  2400   UTBRE,  2400            / ADDRESS OF TBRE ROUTINE
198  2372  0215   CRGRET, 0215            / CARRIAGE RETURN BITS (ASCII)
199  2373  0012   LINFED, 0012            / LINE FEED BITS (ASCII)
200  2374  7540   BLANK,  -0240           / SPACE BITS (ASCII)
201                       /

END OF PASS 2

0 ERRORS DETECTED
1SYMBOL TABLE

ARG1    0150    ARG2    0151    BLANK   2374    CRGRET  2372    LINFED  2373    PRINT   6600    RPTOUX  0032    RUART   6110
UARTS   2000    UBIT5   2354    UBYTE2  2034    UCA     2342    UCAA    2360    UCALL   4100    UCB     2344    UCBA    2362
UCD     2352    UCDA    2370    UCE     2057    UCEPP   2056    UCG     2350    UCGA    2366    UCK     2345    UCKA    2363
UCM     2337    UCMA    2355    UCNUM   2062    UCOUNT  0061    UCP     2351    UCPA    2367    UCS     2343    UCSA    2361
UCT     2347    UCTA    2365    UCW     2340    UCWA    2356    UCY     2346    UCYA    2364    UCZ     2341    UCZA    2357
UC1     2061    UC2     2353    UC3     2060    UEND    2333    UNONTP  2063    UNOTLT  2023    URETN   2320    URETN2  2330
UTBRE   2371    UTREAD  2005    UTR1    2054    UTR2    2055    U1      2223

******** END OF MEMBER UARTSERV   220 RECORDS ********
```

```
1BEGIN PASS 1

END OF PASS 1
1BEGIN PASS 2

1                     / ROUTINE TO SERVICE TBRE INTERRUPT.
  2                     /
  3        0062         *62                     / PAGE 0
  4  0062  0000  TBCNT, 0
  5  0063  0000  TB1,   0
  6  0064  0000  TB2,   0
  7        2400         *2400
  8        4100         UCALL=JMS 100
  9        6111         WRUART=6111
 10        0032         RPTOUX=32              / LOC. OF ADD. OF RUPT SERVICE EXIT
 11        6600         FPRINT=6600            / BUFFER WRITE ROUTINE
 12        0146         BUFWAD=0146            / BUFFER WRITE ADDRESS
 13        6612         UTYPE=6612
 14        2156         RPTOUT=2156
 15                     /
 16  2400  7300  TBREA, CLA CLL
 17  2401  1146         TAD BUFWAD
 18  2402  7041         CIA
 19  2403  1301         TAD BUFSRT             / 0 IF BUFFER EMPTY
 20  2404  7440         SZA
 21  2405  5245         JMP TBRE1              / IF BUFFER NOT EMPTY
 22  2406  1043         TAD 43                 / GO HERE IF BUFFER EMPTY
 23  2407  7440         SZA                    / MEMORY DUMP FLAG
 24  2410  5214         JMP .+4
 25  2411  7001         IAC                    / GO HERE IF NO MEMORY DUMP
 26  2412  3042         DCA 42                 / SET TBRE OFF FLAG
 27  2413  5432         JMP I RPTOUX           / RETURN
 28  2414  7300         CLA CLL                / GO HERE IF MEMORY DUMP
 29  2415  1151         TAD 0151               / ADDRESS INTO ACCUMULATOR
 30  2416  4100         UCALL                  / CALL UTYPE, WRITE ADDRESS INTO BUFFER
 31  2417  6612         UTYPE
 32  2420  7200         CLA
 33  2421  4100         UCALL
 34  2422  6600         PRINT                  / WRITE BLANK INTO BUFFER
 35  2423  7200         CLA
 36  2424  1551         TAD I 0151             / DATA INTO ACC.
 37  2425  4100         UCALL                  / CALL UTYPE, WRITE DATA INTO BUFFER
 38  2426  6612         UTYPE
 39  2427  7200         CLA
```

```
40  2430  1302            TAD CRGRET    / CARRIAGE RETURN INTO BUFFER
41  2431  4100            UCALL
42  2432  6600            PRINT
43  2433  7200            CLA
44  2434  1303            TAD LINFED    / LINE FEED INTO BUFFER
45  2435  4100            UCALL
46  2436  6600            PRINT
47  2437  2151            ISZ 0151
48  2440  2150            ISZ 0150      / SKIP IF END OF MEMORY DUMP
49  2441  5245            JMP .+4
50  2442  7200            CLA
51  2443  3043            DCA 43        / TURN OFF MEMORY DUMP FLAG
```

UARTTBRE          PCM BETA PROGRAMS, 7/78.                              DAY=221  19:00  08/09/78   PAGE 78

```
52  2444  3151            DCA 151       / CLEAR ARGUMENT REGISTER
53  2445  7200    TBPE1,  CLA           / GO HERE IF BUFFER NOT EMPTY
54  2446  1701            TAD I BUFSRT  / SEND NEXT CHAR. FROM BUFFER TO UART
55  2447  6111            WRUART
56                  / SHIFT BUFFER LEFT-
57  2450  7200            CLA
58  2451  1146            TAD BUFWAD    / GET: -(NO. OF BUF. WORDS OCCUPIED - 1)
59  2452  7041            CIA
60  2453  7001            IAC
61  2454  1301            TAD BUFSRT
62  2455  7440            SZA           / BUFFER EMPTY?
63  2456  5262            JMP .+4       / NO, PROCEED
64  2457  1301            TAD BUFSRT    / YES, RESET POINTER AND RETURN
65  2460  3146            DCA BUFWAD
66  2461  5432            JMP I RPTOUX
67  2462  3062            DCA TBCNT     / LOAD COUNTER
68  2463  1301            TAD BUFSRT
69  2464  3063            DCA TB1       / TEMPORARY ADDRESS
70  2465  1301            TAD BUFSRT
71  2466  7001            IAC
72  2467  3064            DCA TB2       /  DITTO
73  2470  1464            TAD I TB2     / SHIFT
74  2471  3463            DCA I TB1
75  2472  2063            ISZ TB1
76  2473  2064            ISZ TB2
77  2474  2062            ISZ TBCNT
78  2475  5270            JMP .-5
79  2476  1063            TAD TB1
80  2477  3146            DCA BUFWAD    / BUFWAD = BUFWAD - 1
81  2500  5432            JMP I RPTOUX  / RETURN
82  2501  0200    BUFSRT, 0200          / BUFFER START ADDRESS
83  2502  0215    CRGRET, 0215          / ASCII CARRIAGE RETURN
84  2503  0212    LINFED, 0212          / ASCII LINE FEED
85                        /
```

END OF PASS 2

0 ERRORS DETECTED
1SYMBOL TABLE

BUFSRT 2501    BUFWAD 0146    CRGPET 2502    LINFED 2503    PRINT 6600    RPTOUT 2156    RPTOUX 0032    TBCNT 0062
TCREA  2400    TBRE1  2445    TB1    0063    TB2    0064    UCALL 4100    UTYPE  6612    WRUART 6111

****** END OF MEMBER UARTTBRE    99 RECORDS ******

UMOFF             PCM BETA PROGRAMS, 7/78.                              DAY=221  19:00  08/09/78   PAGE 79

1BEGIN PASS 1

END OF PASS 1
1BEGIN PASS 2

```
 1                  / ROUTINE TO TURN MOTOR OFF AND APPLY LATCH; FOR RUPTS ONLY.
 2                  /
 3          4100    UCALL=JMS 100
 4          5503    URET=JMP I 103
 5          6747    UDELAY=6747
 6          6311    WMOTOR=6311
 7          6101    WEXR=6101
 8                  /
 9          2100    *2100
10  2100  7301    UMOFF,  CLL CLA IAC
11  2101  6101            WEXR
12  2102  6311            WMOTOR        / MOTOR OFF, BRAKES ON
13  2103  7346            CLA CLL CMA RTL  / -3
14  2104  1167            TAD 167       / MOTOR FLAG
15  2105  7440            SZA           / UP ?
16  2106  5311            JMP MDOWN     / NO
17  2107  7000            NOP           / YES
18  2110  7000            NOP
19  2111  4100    MDOWN,  UCALL
20  2112  6747            UDELAY        / 100 MS
21  2113  7000            NOP
22  2114  7000            NOP
23  2115  4100            UCALL
24  2116  6747            UDELAY
25  2117  7000            NOP
26  2120  7000            NOP
27  2121  7307            CLA CLL IAC RTL   / 4
28  2122  7001            IAC           / 5
29  2123  6101            WEXR
```

```
30  2124  6311            WMOTOR      / MOTOR STILL OFF, BRAKES STILL ON, LATCH SOL. ON
31  2125  4100            UCALL
32  2126  6747            UDELAY
33  2127  4100            UCALL
34  2130  6747            UDELAY
35  2131  4100            UCALL
36  2132  6747            UDELAY
37  2133  4100            UCALL
38  2134  6747            UDELAY
39  2135  7200            CLA
40  2136  6101            WEXR
41  2137  6311            WMOTOR      / ALL OFF
42  2140  3167            DCA 167     / ZERO INTO MOTOR FLAG
43  2141  7001            IAC
44  2142  3107            DCA 107     / DELTA B DAMPING FLAG = +1
45  2143  3077            DCA 77      / LAUNCH FLAG = 0
46  2144  5503            URET

END OF PASS 2

0 ERRORS DETECTED
1SYMBOL TABLE
```

UMOFF          PCM BETA PROGRAMS, 7/78.                                                    DAY=221  19:00  08/09/78  PAGE 80

MDOWN 2111   UCALL 4100   UDELAY 6747   UMOFF 2100   URET 5503   WEXR 6101   WMOTOR 6311

\*\*\*\*\*\*\*\* END OF MEMBER UMOFF      59 RECORDS \*\*\*\*\*\*\*\*

USUBS          PCM BETA PROGRAMS, 7/78.                                                    DAY=221  19:00  08/09/78  PAGE 81

1BEGIN PASS 1

END OF PASS 1
1BEGIN PASS 2

```
 1                       / THIS FILE CONTAINS SUBROUTINES IN ROM, CALLED
 2                       /    TO BY THE UART SERVICE ROUTINES.  THESE
 3                       /    SUBROUTINES ARE NOT ACCESSED BY THE NORMAL
 4                       /    (BACKGROUND) SUBROUTINE CALLS.
 5                       /
 6                       /
 7                       / ROUTINE TO WRITE A WORD IN THE UART TTY BUFFER.
 8                       /    CHECKS ARE MADE TO AVOID OVERFLOW.
 9                       /
10        3546           WRBUF=DCA I 0146
11        0146           BUFWAD=0146
12        4100           UCALL=JMS 100
13        5503           URET=JMP I 103
14        0050           *0050                / PAGE 0
15  0050  0000           GRACNT,  0000
16  0051  0000           UMCNT,   0000
17  0052  0000           UAPFRX,  0000
18  0053  0000           ULCOP,   0000
19        6600           *6600                / PAGE 2 (RAM)
20  6600  3546           UBUFW,   WRBUF
21  6601  7300                    CLA CLL
22  6602  1146                    TAD BUFWAD   / BUFFER WRITE ADDRESS
23  6603  7041                    CIA
24  6604  1211                    TAD BUFLIM   / BUFLIM - BUFWAD (ZERO IF
25  6605  7510                    SPA          /     BUFFER FULL)
26  6606  5503                    URET         / RETURN WITHOUT INCREMENTING POINTER
27  6607  2146                    ISZ BUFWAD
28  6610  5503                    URET
29  6611  0377           BUFLIM,  0377         / BUFFER ADDRESS UPPER LIMIT
30                       /
31                       /
32                       /
33                       / ROUTINE TO WRITE A 12 BIT WORD ON TTY AS 4 OCTAL CHARACTERS.
34                       /
35  6612  7100           UTYPE,   CLL
36  6613  7004                    RAL          / ROTATE 3 LEFT--
37  6614  7430                    SZL
38  6615  7101                    CLL IAC
39  6616  7004                    RAL
40  6617  7430                    SZL
41  6620  7101                    CLL IAC
42  6621  7004                    RAL
43  6622  7430                    SZL
44  6623  7101                    CLL IAC
45  6624  7421                    MQL
46  6625  7501                    MQA
47  6626  0264                    AND UMC2     / LEFT HAND 9 BITS = 0
48  6627  1263                    TAD UMC1     / LEFT HAND 9 BITS = 026
49  6630  4100                    UCALL
50  6631  6600                    UBUFW
51  6632  7345                    CLA CLL CMA RTL  / -3 INTO ACC.
```

```
 52   6633  3051              DCA UMCNT      / ACC. INTO LOOP COUNTER
 53   6634  7701    STARL,    CLA MQA
 54   6635  7104              CLL RAL
 55   6636  7430              SZL
 56   6637  7101              CLL IAC
 57   6640  7004              RAL
 58   6641  7430              SZL
 59   6642  7101              CLL IAC
 60   6643  7004              RAL
 61   6644  7430              SZL
 62   6645  7101              CLL IAC
 63   6646  7421              MQL
 64   6647  7501              MQA
 65   6650  0264              AND UMC2
 66   6651  1263              TAD UMC1
 67   6652  4100              UCALL
 68   6653  6600              UEUFW
 69   6654  2051              ISZ UMCNT
 70   6655  5234              JMP STARL
 71   6656  7200              CLA
 72   6657  1265              TAD USPACE
 73   6660  4100              UCALL          / WRITE BLANK
 74   6661  6600              UEUFW
 75   6662  5503              URET           / RETURN
 76   6663  0260    UMC1,     0260
 77   6664  0007    UMC2,     0007
 78   6665  0240    USPACE,   240            / ASCII SPACE
 79                 /
 80                 /
 81                 / GRAY CODE TRANSLATE ROUTINE FOR INTERRUPTS.
 82                 /
 83   6666  7421    GRAYR,    MQL            / SAVE INPUT
 84   6667  1304              TAD GRAY1
 85   6670  3050              DCA GRACNT     / LOOP COUNTER
 86   6671  7501              MQA
 87   6672  7040              CMA            / COMPLEMENT, SINCE ENCODER
 88   6673  7004    GLOOP,    RAL
 89   6674  2050              ISZ GRACNT     / DONE?
 90   6675  5277              JMP GTEST      / NO
 91   6676  5503              URET           / YES
 92   6677  7420    GTEST,    SNL            / L = 0 ?
 93   6700  5273              JMP GLOOP
 94   6701  7004              RAL            / YES, JUST ROTATE AND
 95   6702  7020              CML            /          INVERT
 96   6703  5274              JMP GLOOP+1
 97   6704  7763    GRAY1,    -15
 98                 /
 99                 /
100                 / SUCCESSIVE APPROX. A TO D FOR INTERRUPTS.
101                 /   LEAVES OFFSET BINARY VALUE OF SELECTED INPUT IN
102                 /   ACCUMULATOR AND OFFSET BINARY VALUE IN UAPPRX.
103                 /
104   6705  6101    UATOD,    WEXR
105   6706  6301              INPUT          / SELECT ANALOG INPUT
106   6707  0363              AND BITS
107   6710  7450              SNA            / BATTERY MONITOR?
108   6711  5316              JMP NBM        / NO
109   6712  7300              CLL CLA        / YES
110   6713  4100              UCALL
111   6714  6751              UDEL2          / WAIT 10 MS
112   6715  7000              NOP
113   6716  4100    NBM,      UCALL
114   6717  6752              UDEL3          / WAIT 10 MS
115   6720  7330              CLA CLL CML RAR / 4000 INTO ACC.
116   6721  7421              MQL
117   6722  3052              DCA UAPPRX     / 0 INTO UAPPRX
118   6723  1052    UADLP,    TAD UAPPRX
119   6724  7501              MQA
120   6725  6101              WEXR
121   6726  6211              WDAC
122   6727  7200              CLA
123   6730  1052              TAD UAPPRX     / RECOVER UAPPRX AND KILL TIME
124   6731  6312              SKIPDH         / DAC TOO HIGH?
125   6732  7501              MQA            / NO.  OR IN BITPOS
126   6733  3052              DCA UAPPRX     /         AND PUT BACK
127   6734  7701              CLA MQA
128   6735  7110              CLL RAR        / UPDATE BITPOSITION
129   6736  7450              SNA            / DONE?
130   6737  5342              JMP UADOUT     / YES
131   6740  7421              MQL            / NO.  CONTINUE
132   6741  5323              JMP UADLP
133   6742  7300    UADOUT,   CLA CLL
134   6743  6101              WEXR
135   6744  6211              WDAC           / CLEAR DAC
136   6745  1052              TAD UAPPRX     / OFFSET BINARY INTO ACC.
137   6746  5503              URET           / RETURN
138                 /
139                 /
140                 /
141         6101    WEXR=6101
142         6301    INPUT=6301
143         6211    WDAC=6211
144         6312    SKIPDH=6312
145                 /
146                 / ROUTINE TO DELAY EITHER .01 OR .1 OR .02 SECONDS.
147                 /
```

```
149  6747  7300   UDELAY,  CLA CLL
149  6750  1360            TAD UP84
150  6751  1361   UDEL2,   TAD UP11
151  6752  1362   UDEL3,   TAD UP5
152  6753  3053            DCA ULOOP
153  6754  2053            ISZ ULOOP
154  6755  5354            JMP .-1
155  6756  7100            CLL
156  6757  5503            URET
157  6760  5100   UP84,    -2700
158  6761  7550   UP11,    -0230
159  6762  7550   UP5,     -0230
160  6763  0700   BITS,    0700

END OF PASS 2

0 ERRORS DETECTED
$SYMBOL TABLE
```

USUBS                PCM BETA PROGRAMS, 7/78.                                                      DAY=221  19:00  08/09/78   PAGE 84

```
BITS   6763   BUFLIN 6611   BUFWAD 0146   GLOOP  6673   GRACNT 0050   GRAYR  6666   GRAY1  6704   GTEST  6677
INPUT  6301   NBM    6716   SKIFDH 6312   STARL  6634   UADLP  6723   UADOUT 6742   UAPPRX 0052   UATOD  6705
UBUFW  6600   UCALL  4100   UDELAY 6747   UDEL2  6751   UDEL3  6752   ULOOP  0053   UMCNT  0051   UMC1   6663
UMC2   6664   UF11   6761   UF5    6762   UP84   6760   URET   5503   USPACE 6665   UTYPE  6612   WDAC   6211
WEXR   6101   WBBUF  3546
```

****** END OF MEMBER USUBS     177 RECORDS ******

VMAGET               PCM BETA PROGRAMS, 7/78.                                                      DAY=221  19:00  08/09/78   PAGE 85

$BEGIN PASS 1

END OF PASS 1
$BEGIN PASS 2

```
  1                       / ROUTINE TO GET CURRENT MAGNITUDE AND LEAVE IT IN 127,
  2                       /    SCALED DOWN BY 2  (I.E. LSB = .39 CM/SEC.).
  3                       / ASSUMES VX AND VY SENSORS HAVE BEEN POWERED UP
  4                       /    PREVIOUSLY.
  5                       /
  6           4140        CALL=JMS 140
  7           5543        RETURN=JMP I 143
  8           6301        INPUT=6301
  9           0030        APPROX=30
 10           3400        ATOD=3400
 11           7320             SQRT=7320
 12           6101        WEXR=6101
 13           3600        MULT=3600
 14           3700        *3700
 15  3700  7301   VMAGET, CLA CLL IAC
 16  3701  4140           CALL
 17  3702  3400           ATOD
 18  3703  7330           CLA CLL CML RAR    / CONVERT TO 2'S COMPLEMENT
 19  3704  1030           TAD APPROX
 20  3705  7510           SPA                / VX NEGATIVE?
 21  3706  7041           CIA                / YES, INVERT
 22  3707  7110           CLL RAR            / NO, DIVIDE BY 2
 23  3710  7421           MQL
 24  3711  7501           MQA
 25  3712  4140           CALL
 26  3713  3600           MULT               / VX SQUARED
 27  3714  1132           TAD 132
 28  3715  3122           DCA 122
 29  3716  1133           TAD 133
 30  3717  3123           DCA 123            / SAVE
 31  3720  7105           CLL IAC RAL
 32  3721  4140           CALL
 33  3722  3400           ATOD               / VY
 34  3723  7300           CLL CLA
 35  3724  1371           TAD K30
 36  3725  6101           WEXR
 37  3726  6301           INPUT              / ANSEL = 30 TO SAVE POWER.
 38  3727  7330           CLA CLL CML RAR
 39  3730  1030           TAD APPROX         / CONVERT TO 2'S COMPLEMENT
 40  3731  7510           SPA                / VY NEGATIVE?
 41  3732  7041           CIA                / YES, INVERT
 42  3733  7110           CLL RAR            / NO, DIVIDE BY 2
 43  3734  7421           MQL
 44  3735  7501           MQA
 45  3736  4140           CALL
 46  3737  3600           MULT               / VY SQUARED
 47  3740  7100           CLL
 48  3741  1123           TAD 123            / ADD TO VX SQUARED
 49  3742  1133           TAD 133
 50  3743  3123           DCA 123
 51  3744  7004           RAL
```

VMAGET          PCM BETA PROGRAMS, 7/78.                                        DAY=221 19:00 08/09/78 PAGE 86

```
52   3745  1122           TAD 122
53   3746  1132           TAD 132
54   3747  3122           DCA 122
55   3750  4140           CALL
56   3751  7320           SQRT
57   3752  7110           CLL RAR       / NOW, UPDATA WEIGHTED AVG. IN 127
58   3753  7110           CLL RAR
59   3754  7110           CLL RAR       / DIVIDE BY 8
60   3755  7421           MQL           / SAVE
61   3756  1127           TAD 127       / OLD V MAGNITUDE
62   3757  7110           CLL RAR
63   3760  7110           CLL RAR
64   3761  7110           CLL RAR       / DIVIDE BY 8
65   3762  7041           CIA
66   3763  1127           TAD 127       / 7/8 OLD V MAG.
67   3764  3127           DCA 127
68   3765  7701           CLA MQA
69   3766  1127           TAD 127
70   3767  3127           DCA 127       / 7/8 OLD VMAG + 1/8 NEW VMAG
71   3770  5543           RETURN
72   3771  0030    K30,   30
```

END OF PASS 2

0 ERRORS DETECTED
1SYMBOL TABLE

APPROX 0030    ATOD  3400   CALL  4140   INPUT 6301   K30   3771   MULT  3600   RETURN 5543   SQRT  7320
VMAGET 3700    WEXR  6101

****** END OF MEMBER VMAGET     86 RECORDS ******

WRITE           PCM BETA PROGRAMS, 7/78.                                        DAY=221 19:00 08/09/78 PAGE 87

1BEGIN PASS 1

END OF PASS 1
1BEGIN PASS 2

```
 1                  / WRITES DATA ON SEA DATA TAPE RECORDER.
 2                  /   ACC. CONTAINS ADDRESS OF DATA DESCRIPTOR LIST:
 3                  /   0XXX = INPUT SELECT CODE (ANSEL)
 4                  /   0000 = ZERO
 5                  /   1000 = ENCODER
 6                  /   2XXX = XXX ADDRESS ON PAGE 0
 7                  /   3000 = LEFT BITS OF T0 PLUS RIGHT BITS OF T1 (TIME)
 8                  /   50AB = CLOSE LAST FRAME IF REQUIRED.  ENTER NEW FORMAT
 9                  /          CODE AB
10                  /   6000 = STATUS (MODE ID, MOTOR FLAG, LAUNCH FLAG, DELTA B
11                  /          DAMPING FLAG)
12                  /   7777 = TERMINATOR OF LIST
13                  /
14         0013     DATA=13
15         0022     T0=22
16         0021     T1=21
17         4140     CALL=JMS 140
18         5543     RETURN=JMP I 143
19         6140     ENCGET=6140
20         3400     ATOD=3400
21         3160     RBEGIN=3160
22         7360     DELAY=7360
23         6301     INPUT=6301
24         6101     WEXR=6101
25                  /
26         6400     *6400
27   6400  7041     WRITE,  CMA IAC
28   6401  7040             CMA             / SUBTRACT 1 FROM DATA LIST ADDRESS, SINCE INDIRECT
29   6402  3013             DCA 13          /   REFERENCE INCREMENTS IT BEFORE FETCHING
30   6403  7300             CLL CLA
31   6404  1413             TAD I 13        / DATA DESCRIPTER
32   6405  7421             MQL             / SAVE
33   6406  7501             MQA
34   6407  1356             TAD KSTAT
35   6410  7440             SZA             / STATUS?
36   6411  5230             JMP X1          / NO
37   6412  1177             TAD 177         / YES; MODE ID
38   6413  7106             CLL RTL
39   6414  7004             RAL
40   6415  1167             TAD 167         / MOTOR FLAG
41   6416  7006             RTL
42   6417  7004             RAL
43   6420  1077             TAD 77          / LAUNCH FLAG
44   6421  7004             RAL
45   6422  1107             TAD 107         / DELTA B DAMPING TIME FLAG
46   6423  7006             RTL
47   6424  1147             TAD 147         / PSTOP FLAG
48   6425  3410             DCA I 10        / WORD INTO BUFFER
49   6426  3147             DCA 147         / CLEAR PSTOP FLAG
50   6427  5344             JMP ENDL
51   6430  7701     X1,     CLA MQA
```

```
 52   6431  7001              IAC
 53   6432  7450              SNA          / TERMINATOR
 54   6433  5543              RETURN       / YES; DONE
 55   6434  7701              CLA MQA      / NO
 56   6435  7440              SZA          / ZERO?
 57   6436  5241              JMP X2       / NO
 58   6437  3410              DCA I 10     / YES; ZERO INTO BUFFER
 59   6440  5344              JMP ENDL
 60   6441  0365    X2,       AND K9       / BITS 3 - 11 = 0
 61   6442  1367              TAD KPAGE
 62   6443  7440              SZA          / PAGE 0 REFERENCE?
 63   6444  5253              JMP X3       / NO
 64   6445  7701              CLA MQA      / YES
 65   6446  0364              AND K3       / PAGE 0 ADDRESS
 66   6447  3124              DCA 124      / DEPOSIT FOR INDIRECT REFERENCE
 67   6450  1524              TAD I 124
 68   6451  3410              DCA I 10     / PAGE 0 ADDRESS CONTENTS INTO BUF
 69   6452  5344              JMP ENDL
 70   6453  7701    X3,       CLA MQA
 71   6454  0365              AND K9
 72   6455  1370              TAD KCODE    / BITS 3 - 11 = 0
 73   6456  7440              SZA          / FORMAT CODE?
 74   6457  5307              JMP X4       / NO
 75   6460  1010    BUFEMT,   TAD 10       / YES; GET BUFFER POINTER
 76   6461  1372              TAD RCM
 77   6462  7450              SNA          / BUFFER EMPTY?
 78   6463  5272              JMP Y1       / YES
 79   6464  1373              TAD M12      / NO
 80   6465  7440              SZA          / ONE SPACE LEFT IN BUFFER??
 81   6466  5276              JMP Y2       / NO
 82   6467  1056              TAD 56       / YES; GET OLD FORMAT CODE
 83   6470  7000              NOP
 84   6471  3410              DCA I 10     / CODE INTO BUFFER
 85   6472  7701    Y1,       CLA MQA      / HERE IF BUFFER EMPTY
 86   6473  0364              AND K3
 87   6474  3056              DCA 56       / NEW CODE INTO 56
 88   6475  5344              JMP ENDL
 89   6476  7701    Y2,       CLA MQA      / HERE IF MORE THAN ONE SPACE LEFT
 90                                        /    IN BUFFER
 91   6477  0364              AND K3       / FORMAT CODE
 92   6500  7041              CIA
 93   6501  1056              TAD 56       / OLD CODE
 94   6502  7450              SNA          / EQUAL?
 95   6503  5344              JMP ENDL     / YES; DO NOTHING
 96   6504  7200              CLA          / NO
 97   6505  3410              DCA I 10     / 0 INTO BUFFER
 98   6506  5260              JMP BUFEMT   / GO BACK TO FILL REST OF FRAME
 99   6507  7701    X4,       CLA MQA
100   6510  1374              TAD KTIME
101   6511  7440              SZA          / TIME?
102   6512  5325              JMP X5       / NO
103   6513  1022              TAD T0       / YES
104   6514  7002              BSW
105   6515  0363              AND K6       / GET LH BITS AT PH
106   6516  3125              DCA 125
107   6517  1021              TAD T1
108   6520  0363              AND K6

109   6521  7002              BSW
110   6522  1125              TAD 125      / COMPOSITE TIME
111   6523  3410              DCA I 10     / INTO BUFFER
112   6524  5344              JMP ENDL
113   6525  7701    X5,       CLA MQA
114   6526  1375              TAD KENC
115   6527  7440              SZA          / ENCODER?
116   6530  5335              JMP X6       / NO
117   6531  4140              CALL         / YES
118   6532  6140              ENCGET
119   6533  3410              DCA I 10     / ENCODER INTO BUFFER
120   6534  5344              JMP ENDL
121   6535  7701    X6,       CLA MQA      / ANALOG INPUT SELECT CODE
122   6536  4140              CALL
123   6537  3400              ATOD
124   6540  3410              DCA I 10
125   6541  1376              TAD K30
126   6542  6101              WEXR
127   6543  6301              INPUT        / ANSEL POWER OFF
128   6544  7200    ENDL,     CLA
129   6545  1010              TAD 10       / BUFFER POINTER
130   6546  1377              TAD RCFULL
131   6547  7440              SZA          / BUFFER FULL?
132   6550  5203              JMP WRITE+3  / NO; RELOOP
133   6551  4140              CALL         / YES; BEGIN RECORD CYCLE
134   6552  3160              BEGIN
135   6553  4140              CALL
136   6554  7360              DELAY        / WAIT .2 SEC.
137   6555  4140              CALL
138   6556  7360              DELAY
139   6557  7200              CLA
140   6560  1371              TAD RC
141   6561  3010              DCA 10       / RESET BUFFER ADDRESS POINTER
142   6562  5203              JMP WRITE+3  / RELOOP
143   6563  0077    K6,       0077
144   6564  0777    K3,       0777
145   6565  7000    K9,       7000
146   6566  2000    KSTAT,    -6000
```

```
147  6567 6000   KPAGE,   -2000
148  6570 3000   KCODE,   -5000
149  6571 0620   RC,      620
150  6572 7160   RCM,     -620
151  6573 7764   M12,     -14
152  6574 5000   KTIME,   -3000
153  6575 7000   KENC,    -1000
154  6576 0030   K30,     30
155  6577 7143   RCFULL,  -635
```

END OF PASS 2

0 ERRORS DETECTED
1SYMBOL TABLE

| ATOD | 3400 | BUFEMT | 6460 | CALL | 4140 | DATA | 0013 | DELAY | 7360 | ENCGET | 6140 | ENDL | 6544 | INPUT | 6301 |
|---|---|---|---|---|---|---|---|---|---|---|---|---|---|---|---|
| KCODE | 6570 | KENC | 6575 | KPAGE | 6567 | KSTAT | 6566 | KTIME | 6574 | K3 | 6564 | K30 | 6576 | K6 | 6563 |
| K9 | 6565 | M12 | 6573 | RBEGIN | 3160 | RC | 6571 | RCFULL | 6577 | RCM | 6572 | RETURN | 5543 | T0 | 0022 |
| T1 | 0021 | WEXR | 6101 | WRITE | 6400 | X1 | 6430 | X2 | 6441 | X3 | 6453 | X4 | 6507 | X5 | 6525 |

WRITE            PCM BETA PROGRAMS, 7/78.                                                  DAY=221  19:00  08/09/78  PAGE 90

X6    6535    Y1    6472    Y2    6476

\*\*\*\*\*\*\*\* END OF MEMBER WRITE    172 RECORDS \*\*\*\*\*\*\*\*

ZDGET            PCM BETA PROGRAMS, 7/78.                                                  DAY=221  19:00  08/09/78  PAGE 91

1BEGIN PASS 1

END OF PASS 1
1BEGIN PASS 2

```
  1              / ROUTINE TO GET Z DOT IN MM/SEC, AND LEAVE IT 175.
  2              /    OLDP (137) IS UPDATED.
  3              /
  4       6140   ENCGET=6140
  5       3160   RBEGIN=3160
  6       4500   TFGET=4500
  7       3400   ATOD=3400
  8       6301   INPUT=6301
  9       3600   MULT=3600
 10       7140   ABVAL=7140
 11       4140   CALL=JMS 140
 12       5543   RETURN=JMP I 143
 13       6200   TAVE64=6200
 14              /
 15       0155   *155
 16  0155 5670   ZDTI,    5670          / 30 SEC.
 17       4300   *4300
 18  4300 7300   ZDGET,   CLL CLA
 19  4301 3131            DCA 131       / CLEAR SIGN FLAG
 20  4302 4140            CALL          / EXTERNAL PRESSURE INTO 136 (64 POINT AVERAGE)
 21  4303 6200            TAVE64
 22  4304 7041            CIA
 23  4305 1137            TAD 137       / OLD P
 24  4306 7041            CIA           / P - OLD P
 25  4307 4140            CALL
 26  4310 7140            ABVAL
 27  4311 7421            MQL
 28  4312 1327            TAD ZDCON     / FACTOR TO GET MM/.5SEC.
 29  4313 4140            CALL
 30  4314 3600            MULT
 31  4315 1132            TAD 132       / HIGH ORDER PRODUCT
 32  4316 7104            CLL RAL       / MM./SEC.
 33  4317 2131            ISZ 131       / SIGN FLAG FROM ABVAL
 34  4320 5322            JMP .+2
 35  4321 7041            CIA
 36  4322 3175            DCA 175       / SAVE ZDOT
 37  4323 1136            TAD 136
 38  4324 3137            DCA 137       / UPDATE OLDP
 39  4325 3023            DCA 23        / ZERO Z DOT STOPWATCH
 40  4326 5543            RETURN
 41  4327 7446   ZDCON,   7446          / .5 X (MM/SEC PER PRESSURE COUNT IN 30 SEC)
 42                                     / THIS IS 6520 OCTAL FOR 1 BIT PRESSURE = 5 CM.
 43                                     / IT IS 7446 OCTAL FOR 1 BIT PRESSURE = 5.69 CM.
```

END OF PASS 2

0 ERRORS DETECTED
1SYMBOL TABLE

| ABVAL | 7140 | ATOD | 3400 | CALL | 4140 | ENCGET | 6140 | INPUT | 6301 | MULT | 3600 | RBEGIN | 3160 | RETURN | 5543 |
|---|---|---|---|---|---|---|---|---|---|---|---|---|---|---|---|
| TAVE64 | 6200 | TFGET | 4500 | ZDCON | 4327 | ZDGET | 4300 | ZDTI | 0155 | | | | | | |

We claim:

1. A control system for an ocean characteristic measuring system including a platform and control means to controllably move said platform between two vertically displaced underwater points, said control means comprising:
   A. one or more sensors for generating sensor signals representative of water characteristics outside said platform,
   B. storage means for storing predetermined operating programs,
   C. operation control means including: means for selecting one or more of said sensor signals, and means for selecting one or more of said operating programs,
   D. BCS generating means responsive to said selected sensor signals and said selected operator program for generating buoyancy control signals representative of desired buoyancy for said platform, and
   E. means for varying the buoyancy of said platform in response to said buoyancy control signals.

2. A control system according to claim 1 wherein at least one of said sensors generates a sensor signal representative of the pressure of said water outside said platform.

3. A control system according to claim 1 wherein at least one of said sensors generates a sensor signal representative of the temperature of said water outside said platform.

4. A control system according to claim 1 wherein at least one of said sensors generates a sensor signal representative of the salinity of said water outside said platform.

5. A control system according to claim 1 wherein at least one of said sensors generates a sensor signal representative of acoustic characteristics of said water outside said platform.

6. A control system according to claim 1 wherein said generating means generates said control signals at selected times.

7. A control system according to claim 1 wherein said generating means includes a programmed microprocessor.

8. A control system according to claim 1 wherein one of said operating programs is adapted to control said BCS generating means so that said buoyancy control signals control said buoyancy varying means whereby the vertical speed of said platform is a predetermined function of time.

* * * * *